US008547534B2

(12) United States Patent
Kunigami et al.

(10) Patent No.: US 8,547,534 B2
(45) Date of Patent: Oct. 1, 2013

(54) OPTICAL FIBER SENSOR, PRESSURE SENSOR, END EFFECTOR AND SENSOR SIGNAL PROCESSOR

(75) Inventors: Masaki Kunigami, Tochigi-ken (JP); Nobuhiro Fueki, Utsunomiya (JP); Masatoshi Kobayashi, Utsunomiya (JP); Makoto Furukawa, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 12/873,812

(22) Filed: Sep. 1, 2010

(65) Prior Publication Data

US 2011/0051123 A1 Mar. 3, 2011

(30) Foreign Application Priority Data

| Sep. 3, 2009 | (JP) | 2009-203804 |
| Nov. 2, 2009 | (JP) | 2009-252049 |
| Nov. 5, 2009 | (JP) | 2009-253587 |
| Feb. 10, 2010 | (JP) | 2010-027301 |
| Feb. 10, 2010 | (JP) | 2010-027302 |
| Feb. 10, 2010 | (JP) | 2010-027303 |
| May 10, 2010 | (JP) | 2010-108024 |

(51) Int. Cl.
*G01B 11/16* (2006.01)
(52) U.S. Cl.
CPC .................... *G01B 11/16* (2013.01)
USPC ........................................ 356/32
(58) Field of Classification Search
CPC ..................................... G01B 11/16
USPC .................................. 356/32–36
See application file for complete search history.

(56) References Cited

U.S. PATENT DOCUMENTS

| 7,154,081 | B1 * | 12/2006 | Friedersdorf et al. ... 250/227.14 |
| 7,295,724 | B2 * | 11/2007 | Wang et al. ................... 385/13 |
| 2005/0075704 | A1 * | 4/2005 | Tu et al. ...................... 607/88 |
| 2005/0077455 | A1 * | 4/2005 | Townley-Smith et al. .............. 250/227.27 |
| 2005/0232532 | A1 * | 10/2005 | Wang et al. ................... 385/13 |
| 2006/0081772 | A1 * | 4/2006 | Williams et al. .......... 250/227.14 |
| 2007/0116402 | A1 * | 5/2007 | Slade et al. .................... 385/12 |
| 2007/0258674 | A1 * | 11/2007 | Wang et al. ................... 385/13 |
| 2008/0011943 | A1 * | 1/2008 | Swart et al. ................... 250/224 |

FOREIGN PATENT DOCUMENTS

| JP | 58-056938 | 4/1983 |
| JP | 3-128833 | 12/1991 |
| JP | 05-151869 | 6/1993 |
| JP | 07-198513 | 8/1995 |

(Continued)

OTHER PUBLICATIONS

Corresponding Japanese Patent Application No. 2009-252049 mailed Nov. 27, 2012.

(Continued)

*Primary Examiner* — Michael P Stafira
(74) *Attorney, Agent, or Firm* — Arent Fox LLP

(57) ABSTRACT

An FBG (Fiber Bragg Grating) sensor is equipped with a plurality of stress detection sensors made up from optical fibers in which gratings that reflect light of a specified wavelength are arrayed, and a stress direction converter that converts stresses applied from the exterior into stresses of a direction in which the gratings are arrayed, and which transmits the stresses to each of the gratings. Consequently, the stress direction converter can transmit stresses, which are applied from a body, to a plurality of gratings.

19 Claims, 52 Drawing Sheets

(56) References Cited

FOREIGN PATENT DOCUMENTS

| | | |
|---|---|---|
| JP | 11-295167 | 10/1999 |
| JP | 2000-028456 | 1/2000 |
| JP | 2002-071323 A | 3/2002 |
| JP | 2002-131023 A | 5/2002 |
| JP | 2003-287469 | 10/2003 |
| JP | 2009-068988 A | 4/2009 |

OTHER PUBLICATIONS

Corresponding Japanese Patent Application No. 2009-253587 mailed Nov. 27, 2012.

* cited by examiner

OPTICAL FIBER SENSOR, PRESSURE SENSOR, END EFFECTOR AND SENSOR SIGNAL PROCESSOR

CROSS-REFERENCE TO RELATED APPLICATION

This application is based upon and claims the benefit of priority from Japanese Patent Applications No. 2009-203804 filed on Sep. 3, 2009, No. 2009-252049 filed on Nov. 2, 2009, No. 2009-253587 filed on Nov. 5, 2009, No. 2010-027301 filed on Feb. 10, 2010, No. 2010-027302 filed on Feb. 10, 2010, No. 2010-027303 filed on Feb. 10, 2010 and No. 2010-108024 filed on May 10, 2010, of which the contents are incorporated herein by reference.

BACKGROUND OF THE INVENTION

1. Field of the Invention

The present invention relates to an optical fiber sensor including an optical fiber in which gratings that reflect a specified wavelength of light are arrayed, a pressure sensor made up of a plurality of optical fiber sensors arranged in a sheet, an end effector on which a pressure sensor is mounted, and a sensor signal processor for calculating stresses at a location where an optical fiber sensor is arranged, based on a wavelength shift amount of reflected light from gratings, which is output from a pressure sensor.

2. Description of the Related Art

Heretofore, a pressure sensor (distribution type pressure sensor) has been known in which a plurality of optical fibers that serves as a sensor are arranged in a sheet, and by detecting strains in the optical fibers at a time when pressure (stress) is applied to the sheet from a body, the pressure at a location where the optical fibers are disposed is detected (see, Japanese Patent No. 3871874 and Japanese Laid-Open Patent Publication No. 2002-071323).

On the other hand, another type of pressure sensor is known that makes use of MEMS (Micro Electromechanical Systems) technology to detect as electrical signals pressures (normal stresses, horizontal stresses) that are applied in both normal and horizontal directions (see Japanese Laid-Open Patent Publication No. 2009-068988).

However, there are concerns that the following problems may be brought about in cases where the pressure sensors disclosed in Japanese Patent No. 3871874, Japanese Laid-Open Patent Publication No. 2002-071323, and Japanese Laid-Open Patent Publication No. 2009-068988 are applied to an end effector of a machine tool used in FA (Factory Automation) for carrying out complex assembly operations, for detecting the gripped state of an object held by the end effector, and for performing feedback controls with respect to the end effector based on pressures detected by the pressure sensors.

In the case that the pressure sensors of Japanese Patent No. 3871874 and Japanese Laid-Open Patent Publication No. 2002-071323 are applied to an end effector, while it is possible to detect the size and orientation of pressures (stresses) that are applied by the body, it is difficult to segregate and detect stresses in components having a plurality of directions, and further, there is a fear that such stresses cannot be detected with sufficient precision. In cases where shapes of the gripped body or the gripping angle thereof, etc., differ, stresses tend to act unequally with respect to the optical fibers. In this case, in the pressure sensor, there is a possibility that stresses applied from the body will be detected while the distribution state of the stresses remains inaccurate. Consequently, since the state at which the body is gripped by the end effector cannot be known, the body may drop out from the end effector, and whether or not a desired assembly operation was carried out effectively cannot be confirmed.

Further, in the case that the pressure sensor of Japanese Laid-Open Patent Publication No. 2009-068988 is applied to an end effector, because the substrate that constitutes the pressure sensor is made from a silicon wafer, it is difficult for this type of pressure sensor to be attached on a curved surface region of an end effector having a curved surface. Furthermore, in case it is necessary to mold the silicon wafer in order to protect the silicon wafer from excessive stresses, as well as to protect the electric signals converted from stresses from electromagnetic noise and various surges (e.g., static electric surges caused by human bodies or by static electricity from various types of machines), there are problems in that manufacturing costs rise. Still further, when one attempts to segregate the stresses applied by the body into a plurality of directional components and detect such stresses, the structure of the pressure sensor becomes complicated, and together therewith, signal processing carried out with respect to electrical signals converted from such stresses is made troublesome.

Accordingly, the pressure sensor disclosed in Japanese Laid-Open Patent Publication No. 2009-068988 tends to be complicated in structure and large in scale, and of high cost, and therefore it is not easy to mount such a pressure sensor onto an end effector. Assuming that such a pressure sensor was attached to an end effector, there also is a concern that the end effector as a whole would inevitably become undesirably large in size.

SUMMARY OF THE INVENTION

Taking into consideration the aforementioned problems, the present invention has the object of providing an optical fiber sensor, a pressure sensor, an end effector, and a sensor signal processor, which with a simple structure, can enable precision and accuracy in detection of stresses applied from a body to be easily improved, can avoid dropping out of the body from the end effector, and can enable assembly processes to be carried out reliably, while also being applied at a low cost and with a small scale.

An optical fiber sensor according to the present invention comprises a plurality of stress detection sensors made up from optical fibers in which gratings are arrayed that reflect light of a specified wavelength, and a stress direction converter for converting external stresses applied from the exterior into stresses of a direction at which the gratings are arrayed, and transmitting the stresses to each of the gratings.

In accordance with the aforementioned structure, when stresses are imposed on the optical fiber sensor, the stress direction converter transmits the stresses to a plurality of stress detection sensors, and the stresses can be detected by the plurality of stress detection sensors. More specifically, with a comparatively simple structure, stresses applied from a body can be detected by the plurality of stress detection sensors, whereby detection accuracy can easily be improved.

Further, preferably, the stress direction converter is made up from an elastic body.

Owing thereto, when normal stresses are applied to the optical fiber sensor from a body, by action of the elastic body, since lattice spacings of each of the gratings are made to change along the longitudinal direction of the optical fibers easily by lengths responsive only to the stresses after conversion thereof, the stresses after conversion are capable of being detected highly accurately.

Further, the plurality of stress detection sensors may include a first stress detection sensor disposed parallel to a direction of application of a horizontal stress and along a plane perpendicular to a direction of application of a normal stress and having a first optical fiber in which first gratings are arrayed, and a second stress detection sensor that extends in a direction different from a longitudinal direction of the first optical fiber and having a second optical fiber in which second gratings are arrayed, wherein the stress direction converter converts the normal stress into a stress of a direction along the plane.

In accordance with such a structure, by generation of strains in the first gratings and the second gratings as a result of horizontal stresses, the wavelength (reflected wavelength) of light reflected by each of the gratings changes. Accordingly, by detecting a shift amount in the reflected wavelength of each of the gratings, horizontal stresses that are applied to the optical fiber sensor from the body are capable of being segregated and detected respectively into components along the longitudinal direction of the first optical fiber, and into components along the longitudinal direction of the second optical fiber.

Further, the stress direction converter converts normal stresses applied to the optical fiber sensor from the body into stresses of a direction along the plane, and transmits the stresses to each of the gratings. In this case as well, by generation of strains in the first gratings and the second gratings as a result of such stresses after conversion thereof, the reflected wavelength at each of the gratings changes. Accordingly, a shift amount in the reflected wavelength of each of the gratings of the optical fibers is detected, and the stresses after conversion thereof are segregated and detected respectively into components along the longitudinal direction of the first optical fiber, and into components along the longitudinal direction of the second optical fiber, whereby normal stresses (stress components along a direction normal to the plane) can be detected based on the converted stresses.

Accordingly, by means of the aforementioned optical fiber sensor, with a comparatively simple structure, stresses (normal stresses, horizontal stresses) applied from a body are capable of being segregated into multiple directions (normal direction, horizontal direction) and detected.

Further, in the case that the optical fiber sensor is mounted on an end effector of a manipulator or the like and the end effectors grips a body, because the optical fiber sensor segregates the external forces (normal stresses, horizontal stresses) applied to the end effector from the body into multiple directional components and detects such forces, the manner in which such external forces behave within spatial coordinates of the end effector can easily be grasped.

Owing thereto, while the end effector is gripping the body, slippage and falling out of the body from the end effector can reliably be avoided. Further, by mounting the optical fiber sensor on the end effector, the present invention is effective at enabling automization of assembly processes, such as used in assembly operations like application of external forces between assembled parts, which have been problematic in the conventional art.

Further, because stresses are detected using optical fibers, no adverse influence is imparted to the optical fiber sensor as a result of exposure to electromagnetic noise or various type of electrical surges or the like. As a result, even if used in inferior environments such as factories or outside locations, the influence of the aforementioned types of noise can be avoided.

When viewed in plan, the first optical fiber and the second optical fiber may be arranged respectively so that the first gratings and the second gratings are perpendicular to each other, at mutually different heights along a direction of application of the normal stress.

Owing thereto, assuming that among the first optical fiber and the second optical fiber, a longitudinal direction of one of the optical fibers is taken as an X-direction, the longitudinal direction of the other of the optical fibers is taken as a Y-direction and the direction of application of the normal stress (i.e., a direction perpendicular to the plane) is taken as a Z-direction, respective X, Y, Z directional components of stresses at a location where the optical fiber sensor is arranged can be segregated and detected.

Further, the stress direction converter may include a flat portion extending in a direction along the plane, a first stress transmitting section that bridges from the flat portion to the first optical fiber, and a second stress transmitting section that bridges from the flat portion to the second optical fiber.

Owing thereto, normal stresses can be converted efficiently into stresses of a direction along the plane and transmitted to each of the gratings.

Furthermore, the optical fiber sensor may be constructed such that each of the stress detection sensors and the stress direction converter are disposed in a measurement area that receives the external stresses. The plurality of stress detection sensors may comprise first stress detection sensors which, as viewed in plan, are disposed so as to be surrounded by the stress direction converter, and in which the gratings are made to expand and retract by stresses transmitted from the stress direction converter, and second stress detection sensors, which are disposed externally of the stress direction converter within the measurement area.

As a result of the aforementioned structure, the first stress detection sensors are arranged so as to surround the stress direction converter, whereas the second stress detection sensors are arranged externally of the stress direction converter. Owing thereto, in the case that a horizontal stress as an external stress is applied from the body in the measurement area, the gratings of the first stress detection sensor are expanded and contracted in response to the horizontal stress. On the other hand, because the gratings of the second stress detection sensor are disposed externally of the stress direction converter, the gratings exhibit expansions and contractions, which differ from those of the first stress detection sensor.

Consequently, between the gratings of the first stress detection sensor and the gratings of the second stress detection sensor, a size results at which the strain amount of the gratings or the shift amount of the reflected wavelengths mutually differ from each other, and thus the difference in the strain amounts or the difference in the shift amounts are clear differences of a degree enabling detection of the horizontal stresses. As a result, even if horizontal stresses are applied over the entire measurement area, the position, size and direction of the applied horizontal stresses can be detected.

In this manner, within the measurement area, by arranging the first stress detection sensors so as to be surrounded by the stress direction converter, whereas the second stress detection sensors are arranged externally of the stress direction converter, even in a case where the body contacts the entire measurement area that makes up a contact surface with the body and horizontal stresses are applied thereby, the horizontal stresses can be detected.

The optical fiber may be arranged along the measurement area so as to penetrate through the stress direction converter, and the first stress detection sensors may include first gratings that are disposed in the optical fiber, while the second stress detection sensors may include second gratings that are disposed in the optical fiber.

As a result, when horizontal stresses are applied to the measurement area, simultaneously with expansion and contraction of the first gratings caused by the horizontal stresses, since the second gratings also expand and contract, detection of such horizontal stresses can be performed with good accuracy.

Further, the stress direction converter may include a flat portion extending in a direction along the measurement area, a first stress transmitting section that bridges from the flat portion to one end side of the first gratings in the optical fiber, and a second stress transmitting section that bridges from the flat portion to another end side of the first gratings in the optical fiber.

As a result, horizontal stresses can be transmitted efficiently to the first gratings.

The second gratings may be disposed in the vicinity of the first stress transmitting section or in the vicinity of the second stress transmitting section in the optical fiber.

Consequently, because the direction in which the first gratings are arrayed and the direction in which the second gratings are arrayed can be made to substantially coincide, when horizontal stresses are applied to the measurement area, the first gratings and the second gratings are capable of being subjected to strains respectively on a common axis. Accordingly, horizontals stresses can easily be calculated from the strain amounts and reflected wavelength shift amounts of the first gratings and the second gratings.

Further, the optical fiber sensor may have a structure in which a first optical fiber is disposed along the measurement area so as to penetrate through the stress direction converter, a second optical fiber is disposed along the measurement area so as to penetrate through the stress direction converter while also being arranged perpendicular to the first optical fiber when viewed in plan, the first gratings are arranged respectively in the first optical fiber and the second optical fiber, and the second gratings are arranged in at least one of the first optical fiber and the second optical fiber.

As a result, for example, if the first optical fiber is disposed in the X-direction along the measurement area and the second optical fiber is disposed in the Y-direction along the measurement area, the horizontal stresses can be segregated into X-direction and Y-direction components and detected.

The plurality of stress detection sensors may be arranged in surrounding fashion to the stress direction converter.

In this manner, by disposing the plurality of stress detection sensors to surround the stress direction converter, when stresses are applied from a body with respect to the optical fiber sensor, the stress direction converter converts the applied stresses into stresses of a direction in which the gratings of each of the stress detection sensors are arrayed, and then transmits the stresses after conversion thereof to each of the stress detection sensors. As a result, strains are generated in the gratings of each of the stress detection sensors by means of the converted stresses, whereupon the wavelengths (reflected wavelengths) of light reflected by each of the gratings change respectively. Accordingly, the stresses applied to the optical fiber sensor are capable of being detected by detecting shift amounts in the reflected wavelengths of each of the gratings.

Next, explanations shall be given in greater detail concerning the detection of components in a normal direction (normal stresses) or detection of components in a horizontal direction (horizontal stresses) at a time when stresses are applied to the stress direction converter.

First, an explanation shall be made concerning detection of normal stresses for a case in which the stress direction converter and each of the stress detection sensors are disposed on the same plane, and when such normal stresses are applied to the stress direction converter.

The stress direction converter converts such normal stresses into stresses of a direction in which the respective gratings are arrayed (i.e., a direction along the plane), and then transmits the stresses, after conversion thereof, to each of the stress detection sensors. Owing thereto, each of the gratings is subjected to strains of substantially the same amount, and together therewith, shift amounts of the reflected wavelengths of each of the gratings also are changed by substantially the same amount.

Accordingly, if a shift amount of any one of the stress detection sensors from among each of the stress detection sensors is detected, the normal stresses can be calculated based on the detected shift amount. Stated otherwise, in the case that normal stresses are applied to the stress direction converter, such normal stresses can be calculated based on an OR operation of the shift amounts of each of the gratings.

Next, an explanation shall be made concerning detection of horizontal stresses for a case in which the stress direction converter and each of the stress detection sensors are disposed on the same plane, and when such horizontal stresses are applied to the stress direction converter.

In this case, because the direction of application of horizontal stresses and the direction along the plane (i.e., the direction in which each of the gratings are arranged) are substantially the same, the horizontal stresses are transmitted without change to each of the stress detection sensors. At that time, owing to the directions of application of the horizontal stresses with respect to the stress direction converter and the positions at which each of the stress detection sensors are disposed, each of the gratings are subjected to strains of mutually differing amounts, and together therewith, the shift amounts of the reflected wavelengths of each of the gratings also have mutually differing values.

Consequently, if shift amounts of two respective stress detection sensors having mutually different shift amounts of the gratings are detected from among each of the stress detection sensors that are arranged to surround the stress direction converter, the horizontal stresses can be calculated based on the difference in the two detected shift amounts. Stated otherwise, in the case that horizontal stresses are applied to the stress direction converter, such horizontal stresses can be calculated based on an exclusive OR operation of the shift amounts of each of the two gratings.

In this manner, in accordance with the above-described structure, by disposing the plurality of stress detection sensors so as to surround the stress direction converter, with a comparatively simple structure, stresses applied from a body can be segregated into stresses of multiple directions (normal stresses, horizontal stresses) and detected.

A first stress detection sensor and a second stress detection sensor may be arranged along a first direction that passes through the stress direction converter while sandwiching the stress direction converter therebetween, and a third stress detection sensor and a fourth stress detection sensor may be arranged along a second direction that passes through the stress direction converter and which differs from the first direction while sandwiching the stress direction converter therebetween.

In the case that the first direction and the second direction are disposed on the plane, which is substantially perpendicular to the normal stresses, when such normal stresses are applied to the stress direction converter, the shift amounts of the gratings in the first through fourth stress detection sensors are mutually at the same amount, and therefore, by detecting the shift amount of any one of the gratings, the normal stresses can be calculated reliably and efficiently.

Further, in the case that the first direction and the second direction are disposed on the plane that lies along the direction of the horizontal stresses, when such horizontal stresses are applied to the stress direction converter, the shift amounts of the gratings of the first stress detection sensor and the second stress detection sensor are of mutually different sizes, and together therewith, the shift amounts of the gratings of the third stress detection sensor and the fourth stress detection sensor also are of mutually different sizes. Accordingly, by detecting either the shift amounts of the gratings of the first stress detection sensor and the second stress detection sensor, which are arranged on a common axis along the first direction, or the shift amounts of the gratings of the third stress detection sensor and the fourth stress detection sensor, which are arranged on a common axis along the second direction, and by carrying out an exclusive OR calculation on the detected two shift amounts, the horizontal stresses can be calculated reliably and efficiently.

In this manner, by arranging the first through fourth stress detection sensor to surround the stress direction converter, normal and/or horizontal stresses can be calculated (detected) reliably and efficiently, and together therewith, stresses (the aforementioned horizontal stresses) that are applied to the stress direction converter can be detected in the form of components along the first direction and components along the second direction.

Further, preferably, the first stress detection sensor and the second stress detection sensor are bridged by a first optical fiber that extends along the first direction, whereas the third stress detection sensor and the fourth stress detection sensor are bridged by a second optical fiber that extends along the second direction.

In this case, the gratings of the first stress detection sensor and the gratings of the second stress detection sensor are arrayed along the same axis, and together therewith, the gratings of the third stress detection sensor and the gratings of the fourth stress detection sensor also are arrayed along the same axis. Owing thereto, when stresses are applied to the stress direction converter, the stress direction converter transmits the stresses, after conversion thereof, to the first optical fiber and the second optical fiber, and can thereby cause strains to be exerted on each of the gratings. As a result, detection of stresses in the first through fourth stress detection sensors can be performed with greater accuracy.

Further, the stress direction converter may include a flat portion to which stresses are applied from the exterior, a first stress transmitting section that bridges from the flat portion to the first optical fiber, and a second stress transmitting section that bridges from the flat portion to the second optical fiber.

As a result, stresses, which are applied to the flat portion from the body are converted effectively into stresses of a direction along which each of the gratings are arrayed, and the stresses, after conversion thereof, can be transmitted efficiently to the first optical fiber via the first stress transmitting section, and can also be transmitted efficiently to the second optical fiber via the second stress transmitting section.

Further, in the case that the flat portion receives normal stresses imparted thereto from the exterior, a position of the flat portion along a direction of application of the normal stresses is at a position lower than a position at which the first optical fiber is supported and/or fixed on the first stress transmitting section, and lower than a position at which the second optical fiber is supported and/or fixed on the second stress transmitting section.

Owing thereto, when stresses (normal stresses, horizontal stresses) are applied to the flat portion, overall, the stress direction converter is easily deformed in the direction along which each of the gratings are arrayed, and therefore, the strains or shift amounts of each of the gratings can be made even greater. As a result, detection sensitivity and detection accuracy of such stresses can be enhanced.

Still further, a structure may be provided in which:

the plurality of stress detection sensors includes a first stress detection sensor having a first optical fiber in which first gratings are arrayed, and a second stress detection sensor having a second optical fiber in which second gratings are arrayed;

the stress direction converter includes a first converter section for converting stresses, which are applied in a direction different from the arrayed direction of the first gratings, into stresses in the arrayed direction, and transmitting the stresses to the first gratings, and a second converter section for converting stresses, which are applied in a direction different from the arrayed direction of the second gratings, into stresses in the arrayed direction, and transmitting the stresses to the second gratings;

the first and second converter sections share a common flat portion; and the first converter section is disposed on the flat portion while being directed in a first normal direction perpendicular to the flat portion, and the second converter section is disposed on the flat portion while being directed in a second normal direction perpendicular to the flat portion and which is opposite to the first normal direction.

According to the above structure, the first stress direction converter section is disposed on the flat portion while being directed in a first normal direction (e.g., any one direction selected from among a positive Z-direction and a negative Z-direction), and the second stress direction converter section is disposed on the flat portion while being directed in a second normal direction which is opposite to the first normal direction (i.e., the other direction, which is opposite to the one selected direction).

In this manner, first and second stress direction converter sections share the same common flat portion, and are disposed and oriented in directions that are opposite to each other. Accordingly, the first and second stress direction converter sections do not mutually interfere with each other inside of the optical fiber sensor, and as a result, they can be structured as elements having the same size and shape.

Owing thereto, even in the case that normal stresses are applied to the optical fiber sensor from the exterior, differences in the shift amounts of reflected waves in the gratings of the first and second optical fibers can be mitigated, and without carrying out corrective processing with respect to each of the shift amounts, detection (calculation) of such normal stresses is enabled.

The flat portion may be arranged along a direction in which the first and second gratings of the first and second stress detection sensors are arrayed. The first optical fiber may be disposed at a location separated from the flat portion along the first normal direction, and the second optical fiber may be disposed at a location separated from the flat portion along the second normal direction. The first and second converter sections may be disposed substantially perpendicular to each other when viewed in plan, and comprise, respectively, the flat portion, and stress transmitting sections, which are bridged from the flat portion to the first and second optical fibers.

In accordance therewith, because the first and second stress direction converter sections can easily be constructed as elements having the same size and shape, differences in the shift amounts of reflected waves in the gratings of the first and second optical fibers can be even further mitigated. Further, the stress transmitting sections bridge between the flat portion and the first and second optical fibers, whereby normal stresses can be converted efficiently into stresses of directions along the direction in which the gratings are arrayed, and be transmitted to each of the gratings.

Further, the stress direction converter may include a first flat portion that extends in a direction parallel to a longitudinal direction of the optical fiber, and to which stresses are applied in a direction different from the longitudinal direction of the optical fiber, a second flat portion having a plane that differs in height from a plane of the first flat portion, a first stress transmitting section, which is bridged from the first flat portion to the second flat portion, and a second stress transmitting section, which is bridged from the second flat portion to the optical fiber.

By being structured in this manner, in the case that stresses (normal stresses) of a direction that differs from the longitudinal direction of the optical fiber are applied from the body to the stress direction converter, such normal stresses are applied respectively to the first flat portion and the second flat portion. Owing thereto, the stress direction converter is greatly deformed over its entirety by normal stresses applied to the first and second flat portions, and by normal stresses applied to the flat portion.

Further, normal stresses that are applied respectively to the first and second flat portions are converted by the stress direction converter into stresses of a direction parallel to the longitudinal direction, and following conversion thereof, the stresses are transmitted via the stress transmitting sections to the gratings.

Owing thereto, because large strains are generated in the gratings and the wavelength (reflected wavelength) of light reflected by the gratings changes significantly, it is possible to easily detect the normal stresses by detecting a shift amount of the reflected wavelength caused by the gratings.

By forming the first and second flat portions in this manner, the amount at which the stress direction converter is deformed can be made large, together with causing the strains at the gratings to be made large. As a result, the shift amount of the reflected wavelength increases significantly, thus enabling the detection sensitivity of normal stresses to easily be enhanced.

Further, the stress direction converter may include a flat portion to which stresses are applied from the exterior, and a stress transmitting section, which is bridged from the flat portion to the optical fiber, wherein at least one of projections and grooves are formed on the flat portion.

In this manner, by providing projections and/or grooves on the flat portion to which horizontal stresses are applied, compared to a case in which such projections and/or grooves are not provided, the detection area and the deformation amount on the detection surface (reaction surface) for the horizontal stresses, which is perpendicular to the direction (direction along the flat portion, direction in which the gratings are arrayed) at which the horizontal stresses are applied, can easily be made larger. As a result, the detection sensitivity of the horizontal stresses can be enhanced, and the detection accuracy of horizontal stresses can be raised.

The at least one of projections and grooves may be columnar shaped. Further, in the case that the at least one of projections and grooves are columnar shaped, the at least one of projections and grooves may be formed along a direction that is substantially perpendicular to a direction in which the gratings are arrayed.

In the case that the direction in which the horizontal stresses are applied to the stress direction converter is already known beforehand, by providing the at least one of projections and the grooves with the aforementioned shapes, the detection area or deformation amount of the horizontal stresses can be made even greater, and the detection sensitivity and detection accuracy of the horizontal stresses can be further enhanced.

In the optical fiber sensor, the at least one of projections and the grooves may be shaped as points.

In this manner, owing to the point-like shapes, with respect to all of the horizontal directions (e.g., X-direction, Y-direction), it becomes possible to increase the detection area and deformation amount of the horizontal stresses, whereby the detection sensitivity and detection accuracy of such horizontal stresses can be enhanced.

Furthermore, by providing the at least one of projections and grooves in a plurality on the flat portion, the detection area and deformation amount of the horizontal stresses can be made even greater.

Further, an optical fiber sensor according to the present invention is characterized by a plurality of stress detection sensors made up from optical fibers in which gratings are arrayed that reflect light of a specified wavelength, and a plurality of stress direction converters, which are disposed at locations different from locations where each of the gratings are arrayed, and which are disposed at both ends of each of the gratings so as to sandwich each of the gratings therebetween, for thereby converting external stresses applied from the exterior into stresses of a direction at which each of the gratings are arrayed, and transmitting the stresses to each of the gratings.

In this case as well, when stresses (normal stresses) are applied from a body with respect to the optical fiber sensor, the stress direction converter converts the applied stresses into stresses of a direction parallel to the longitudinal direction of the optical fiber, and then transmits the stresses after conversion thereof to the gratings. As a result, strains are generated in the gratings by means of the stresses after conversion thereof, whereupon the wavelength (reflected wavelength) of light reflected by the gratings changes. Accordingly, normal stresses are capable of being detected by detecting a shift amount in the reflected wavelength of the gratings.

Additionally, a small number of individual optical fiber sensors can be attached to an end effector, whereby a gripping force (normal stress) of a body gripped by the end effector can easily be detected, together with lowering the cost of the end effector, and realizing a reduction in the computational processing burden and computational costs related to detection of the gripping force.

Moreover, an optical fiber sensor according to the present invention is characterized by one stress detection sensor made up from an optical fiber in which gratings are arrayed that reflect light of a specified wavelength, and two stress direction converters, which are disposed at locations different from a location where the gratings are arrayed, and which are disposed at both ends of the gratings so as to sandwich the gratings therebetween, for converting external stresses applied from the exterior into stresses of a direction at which the gratings are arrayed, and transmitting the stresses to the gratings.

In this case, because the optical fiber sensor can easily be constructed from one stress detection sensor and two stress direction converters, if an individual optical fiber sensor is attached to a gripping surface where a body is gripped on an end effector, a normal stress (gripping force) imposed on the gripping surface can be detected more conveniently. As a result, costs for the end effector, as well as the computational processing burden and computational costs related to detection of the normal stresses can be reduced.

More specifically, because normal stresses are capable of being detected using an individual optical fiber sensor, there are advantages in terms of cost, compared to a structure in which plural optical fiber sensors are disposed on a gripping surface to detect a gripping force. Further, by using only a signal optical fiber sensor, the amount of signals needed for processing in order to detect normal stresses become fewer, and as a result, the load and computational costs related to processing such signals can be reduced.

A pressure sensor according to the present invention is characterized by a flexible sheet and an optical fiber sensor. The optical fiber sensor includes a plurality of stress detection sensors made up from optical fibers in which gratings are arrayed that reflect light of a specified wavelength, and a stress direction converter for converting external stresses applied from the exterior into stresses of a direction at which the gratings are arrayed, or into stresses of a direction opposite to the direction at which the gratings are arrayed, and transmitting the stresses to each of the gratings.

In accordance with the aforementioned structure, when stresses are applied to the pressure sensor, the stress direction converter transmits the stresses to a plurality of stress detection sensors, whereby the stresses are detected by multiple stress detection sensors. More specifically, with a comparatively simple structure, stresses applied from a body can be detected by the plurality of stress detection sensors, whereby detection accuracy can easily be improved.

The pressure sensor may be constructed such that the optical fiber sensors are disposed in a plurality in the sheet. The plurality of stress detection sensors of the optical fiber sensors may include a first stress detection sensor disposed parallel to a direction of application of a horizontal stress and along a plane perpendicular to a direction of application of a normal stress and having a first optical fiber in which first gratings are arrayed, and a second stress detection sensor that extends in a direction different from a longitudinal direction of the first optical fiber and having a second optical fiber in which second gratings are arrayed, wherein the stress direction converter converts the normal stress into a stress having a direction along the plane.

With this structure, by arranging the optical fiber sensors in a plurality in the sheet, horizontal stresses, which are applied at locations where each of the optical fiber sensors are disposed, can be segregated and detected respectively as components along the longitudinal direction of the first optical fiber, and as components along the longitudinal direction of the second optical fiber.

Further, concerning each of normal stresses, which are applied at locations where each of the optical fiber sensors are disposed, by segregation and detection of the stresses after conversion thereof as components along the longitudinal direction of the first optical fiber, and as components along the longitudinal direction of the second optical fiber, each of the normal stresses (stress components along directions perpendicular to the sheet) are capable of being detected.

Thus, according to the above pressure sensor, with a comparatively simple structure, each of stresses (normal stresses, horizontal stresses), which are applied from the body at locations where each of the optical fiber sensors are disposed, can be segregated and detected respectively in multiple directions (normal direction, horizontal direction).

Further, if the pressure sensor is mounted on an end effector of a manipulator or the like, the manner in which external forces (normal stresses, horizontal stresses), which are imposed on the end effector from the body, act in spatial coordinates of the end effector can easily be grasped, and while the body is being gripped by the end effector, slippage and falling out of the body can reliably be avoided. Further, by mounting the pressure sensor on the end effector, the present invention is effective at enabling automization of assembly processes, such as used in assembly operations, like application of external forces between assembled parts, which have been problematic in the conventional art.

Further, in the pressure sensor, because an optical fiber sensor is provided, no adverse influence is imparted to the optical fiber sensor as a result of exposure to electromagnetic noise or various types of electrical surges or the like. As a result, even if used in inferior environments such as factories or outside locations, the influence of the aforementioned types of noise can be avoided.

Further, the first optical fiber and the second optical fiber of each of the optical fiber sensors may be constituted respectively by disposing a single optical fiber cable, in which a plurality of gratings with lattice spacings different from each other are formed, in the sheet.

By utilizing the single optical fiber cable, since all of the gratings are disposed in the sheet, the number of light sources needed to supply light to the gratings is only one, thus enabling the cost of the overall apparatus to be inexpensive. Further, because the lattice spacings differ mutually from each other, the reflected wavelengths therefrom are also mutually different, and as a result, mistaken detection of reflected wavelengths can be prevented assuredly.

Plural stress detection sensors may be arranged in surrounding fashion to the stress direction converter.

In this manner, by disposing multiple stress detection sensors around the stress direction converter, when stresses are applied from a body with respect to the pressure sensor, the stress direction converter converts the applied stresses into directions along which the gratings of each of the stress detection sensors are arrayed, and the stresses after conversion thereof are transmitted to each of the stress detection sensors. Owing thereto, strains are generated in the gratings of each of the stress detection sensors by the converted stresses, and the wavelengths (reflected wavelengths) of light reflected by each of the gratings change respectively. Accordingly, by detecting shift amounts of the reflected wavelengths at each of the gratings, stresses applied to the optical fiber sensor can be detected.

The stress direction converter may include a first flat portion that extends in a direction parallel to a longitudinal direction of the optical fiber, and to which stresses are applied in a direction different from the longitudinal direction of the optical fiber, a second flat portion having a plane that differs in height from a plane of the first flat portion, a first stress converter, which is bridged from the first flat portion to the second flat portion, and a second stress converter, which is bridged from the second flat portion to the optical fiber.

By forming the first and second flat portions in this manner, in the pressure sensor, the amount of deformation of the stress direction converter can be increased, and strains at the gratings can be made larger. As a result, the reflected wavelength shift amount can be increased significantly, and the detection sensitivity of normal stresses can easily be enhanced.

Further, the stress direction converter may include a flat portion to which stresses are applied from the body, and a stress transmitting section, which is bridged from the flat portion to the optical fiber, and at least one of projections and grooves may be formed on the flat portion.

In this manner, by providing projections and/or grooves on the flat portion to which horizontal stresses are applied, compared to a case in which such projections and/or grooves are not provided, the detection area and the deformation amount on the detection surface (reaction surface) for the horizontal stresses, which is perpendicular to the direction (direction along the flat portion, direction in which the gratings are arrayed) at which the horizontal stresses are applied can easily be made larger. As a result, the detection sensitivity of such horizontal stresses can be enhanced, and the detection accuracy of horizontal stresses can be made higher.

A pressure sensor according to the present invention is characterized by a flexible sheet and an optical fiber sensor. The optical fiber sensor comprises a plurality of stress detection sensors made up from optical fibers in which gratings are arrayed that reflect light of a specified wavelength, and a plurality of stress direction converters, which are disposed at locations different from a location where each of the gratings are arrayed, and which are disposed at both ends of each of the gratings so as to sandwich each of the gratings therebetween, for converting external stresses applied from the exterior into stresses of a direction at which each of the gratings are arrayed, and transmitting the stresses to each of the gratings.

In this case as well, when stresses (normal stresses) are applied from a body with respect to the pressure sensor, the stress direction converter converts the applied stresses into stresses of a direction parallel to the longitudinal direction of the optical fiber, and then transmits the stresses after conversion thereof to the gratings. As a result, strains are generated in the gratings by means of the converted stresses, whereupon the wavelength (reflected wavelength) of light reflected by the gratings changes. Accordingly, normal stresses are capable of being detected by detecting a shift amount in the reflected wavelength of the gratings.

Additionally, pressure sensors with a small number of optical fibers can be attached to an end effector, whereby a gripping force (normal stress) of a body gripped by the end effector can easily be detected, together with lowering the cost of the end effector, and realizing a reduction in the computational processing burden and computational costs related to detection of the gripping force.

A pressure sensor according to the present invention is characterized by an optical fiber sensor comprising one stress detection sensor made up from an optical fiber in which gratings are arrayed that reflect light of a specified wavelength, and two stress direction converters, which are disposed at locations different from a location where the gratings are arrayed, and which are disposed at both ends of the gratings so as to sandwich the gratings therebetween, for converting external stresses applied from the exterior into stresses of a direction at which the gratings are arrayed, and transmitting the stresses to the gratings.

In this case, because the pressure sensor can easily be constructed from one stress detection sensor and two stress direction converters, if the pressure sensor equipped with an individual optical fiber sensor is attached to a gripping surface where a body is gripped on an end effector, a normal stress (gripping force) imposed on the gripping surface can be detected more conveniently. As a result, costs for the end effector, as well as the computational processing burden and computational costs related to detection of normal stresses can be reduced.

An end effector according to the present invention is characterized by a pressure sensor, the pressure sensor being equipped with a flexible sheet, and an optical fiber sensor having a stress detection sensor made up from optical fibers in which gratings are arrayed that reflect light of a specified wavelength, and a stress direction converter for converting stresses applied from a body in contact with the sheet into stresses of a direction at which the gratings are arrayed, and transmitting the stresses to the gratings. The end effector further includes a gripping member for gripping the body.

In accordance with the above structure, when stresses are applied to a gripping member of the end effector, the stress direction converter transmits stresses to a plurality of stress detection sensors, whereupon such stresses can be detected by multiple stress detection sensors. More specifically, with a comparatively simple structure, stresses applied from a body can be detected by the plurality of stress detection sensors, whereby detection accuracy can easily be improved.

Further, in the gripping member, the pressure sensor may be disposed at a contact location with the body, and a plurality of stress detection sensors may be arranged in surrounding fashion to the stress direction converter.

In this manner, by arranging multiple stress detection sensors so as to surround the stress direction converter, when stresses are applied from a body with respect to the end effector, the stress direction converter can convert the applied stresses into stresses of a direction along which the gratings of each of the stress detection sensors are arrayed, and transmit the converted stresses to each of the stress detection sensors. As a result of such converted stresses, strains are generated in the gratings of the stress detection sensors, and the wavelength (reflected wavelength) of light at each of the gratings is changed, respectively. Accordingly, by detecting shift amounts of the reflected wavelengths at each of the gratings, stresses applied to the optical fiber sensor can be detected.

Further, in the gripping member, the pressure sensor may be disposed at a contact location with the body. The stress direction converter may include a flat portion which extends in a direction parallel to a longitudinal direction of the optical fiber, and to which stresses are applied in a direction different from the longitudinal direction of the optical fiber, and a stress transmitting section, which is bridged from the flat portion to the optical fiber, and wherein at least one of projections and grooves are formed on the flat portion.

In this manner, in the end effector equipped with the optical fiber sensor as well, by providing projections and/or grooves on the flat portion to which horizontal stresses are applied, compared to a case in which such projections and/or grooves are not provided, the detection area and the deformation amount on the detection surface (reaction surface) for the horizontal stresses, which is perpendicular to the direction (direction along the flat portion, direction in which the gratings are arrayed) at which the horizontal stresses are applied, can easily be made larger. As a result, the detection sensitivity of such horizontal stresses can be enhanced, and the detection accuracy of horizontal stresses can be raised.

Further, according to the present invention, an end effector may comprise a pressure sensor, the pressure sensor being equipped with a flexible sheet, and an optical fiber sensor, the optical fiber sensor having one stress detection sensor made up from an optical fiber in which gratings are arrayed that reflect light of a specified wavelength, and two stress direction converters, which are disposed at locations different from a location where the gratings are arrayed, and which are disposed at both ends of the gratings so as to sandwich the gratings therebetween, for converting external stresses applied from the exterior into stresses of a direction at which the gratings are arrayed, and transmitting the stresses to the gratings. The pressure sensor further comprises a gripping member for gripping a body, wherein in the gripping member the pressure sensor is disposed at a contact location with the body.

In this manner, because normal stresses can easily be detected, merely by providing an individual pressure sensor (optical fiber sensor) having one stress detection sensor and two stress direction converters, even when external pressures work on the end effector when a body is being gripped thereby, slippage and falling out of the body from the end effector can reliably be avoided. Owing thereto, the present invention is effective at enabling automization of assembly processes, such as used in assembly operations, and process steps at which external forces work between assembled parts, which have been problematic in the conventional art.

In the case that the end effector includes a plurality of claws thereon, and a gripping surface for the body is formed on each of the claws, since the pressure sensor is disposed in only one of the gripping surfaces, normal stresses at each of the gripping surfaces are not detected separately. However, the aforementioned effects can be brought about in particular with respect to controlling gripping forces imposed on a body, in a simple end effector that grips predetermined bodies (parts).

A sensor signal processor according to the present invention includes an optical fiber sensor comprising a plurality of stress detection sensors made up from optical fibers in which gratings are arrayed that reflect light of a specified wavelength, and a stress direction converter for converting external stresses applied from the exterior into stresses of a direction at which the gratings are arrayed, and transmitting the stresses to each of the gratings, and a signal processor for calculating at least one of horizontal stresses and normal stresses based on a change in wavelength of reflected light caused by strains generated in the gratings as a result of application of stresses from the exterior. The plurality of stress detection sensors include a first stress detection sensor having a first optical fiber in which first gratings are arrayed, and a second stress detection sensor having a second optical fiber in which second gratings are arrayed. In the case that a wavelength shift amount of reflected light in the first gratings coincides substantially with a wavelength shift amount of reflected light in the second gratings, the signal processor judges that horizontal stresses are not being applied from the exterior to the optical fiber sensor, and the signal processor calculates the normal stresses based on each of the shift amounts.

With this structure, because stresses are detected by the optical fiber sensor, stresses that are applied at a location where the optical fiber sensor is disposed can be segregated and detected respectively as components (horizontal stresses) along a longitudinal direction of the first optical fiber and as components along a longitudinal direction of the second optical fiber, and as components (normal stresses) along a direction perpendicular to the plane.

Further, with the signal processor, in the case that the wavelength shift amount of the reflected light at the first gratings and the wavelength shift amount of the reflected light at the second gratings coincide with each other, since it is judged that horizontal stresses are not being applied to the optical fiber sensor from the body, it is possible to determine easily whether or not horizontal and/or normal stresses are currently being applied to the optical fiber sensor from the body, and together therewith, mistaken detection of stresses that are currently being applied can be avoided.

Accordingly, with the sensor signal output apparatus according to the present invention, with a comparatively simple structure, each of stresses (normal stresses, horizontal stresses), which are applied from the body at a location where the optical fiber sensor is disposed, can be segregated and detected respectively in multiple directions (normal direction, horizontal direction). Together therewith, it can easily be determined whether or not the stresses currently being applied from the body to the optical fiber sensor are horizontal stresses and/or normal stresses.

The sensor signal processor may further comprise a pressure sensor in which a plurality of optical fiber sensors are disposed along a surface of a flexible sheet in contact with a body, wherein, concerning each of the optical fibers, in the case that a wavelength shift amount of reflected light in the first gratings coincides substantially with a wavelength shift amount of reflected light in the second gratings, the signal processor judges that horizontal stresses are not being applied from the body to each of the optical fiber sensors, and the signal processor calculates the normal stresses respectively at locations where each of the optical fibers are disposed, based on each of the shift amounts.

Owing thereto, it can be judged at each of the optical fiber sensors whether or not the stresses applied at locations where each of the optical fiber sensors are disposed are horizontal stresses and/or normal stresses.

In this case, each of the first optical fibers are arrayed mutually along the same direction, and each of the second optical fibers are arrayed mutually along the same direction. In the case that a wavelength shift amount of reflected light in the first gratings does not coincide with a wavelength shift amount of reflected light in the second gratings, the signal processor judges that the horizontal stresses and the normal stresses are being applied from the body respectively to each of the optical fiber sensors. Based on a wavelength interval of reflected light between first gratings and a wavelength interval of reflected light between second gratings of two adjacent optical fiber sensors, the signal processor calculates horizontal stresses applied to the two optical fiber sensors. Also, based on a wavelength interval of reflected light between the first gratings and a wavelength shift amount of reflected light in the first gratings, or based on a wavelength interval of reflected light between the second gratings and a wavelength shift amount of reflected light in the second gratings, the signal processor calculates normal stresses applied to the optical fiber sensors.

Accordingly, stresses that are applied between the two optical fiber sensors can be segregated into a plurality of directional components (normal stresses, horizontal stresses) and detected (calculated) respectively.

As described above, according to the present invention, with a relatively simple structure, accuracy in detecting stresses that are applied from a body can easily be improved. Owing thereto, a small scale and low cost optical fiber sensor, pressure sensor, end effector, and signal processing apparatus are offered, in which dropping and falling out of the body from an end effector can be avoided, and assembly processes can be carried out more reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An optical fiber sensor, a pressure sensor including such an optical fiber sensor, and an end effector including the pressure sensor, and a sensor signal processing apparatus including such an end effector (first through seventh embodiments)

according to the present invention shall be described with reference to FIGS. 1 through 52 of the accompanying drawings.

Outline of Stress Detection Principles Using the Optical Fiber Sensor:

Prior to explanations of the respective embodiments, outline principles for detection of stresses using an FBG sensor (Fiber Bragg Grating Sensor) as an optical fiber sensor shall be explained with reference to FIGS. 1A through 1D.

Figure 1A:
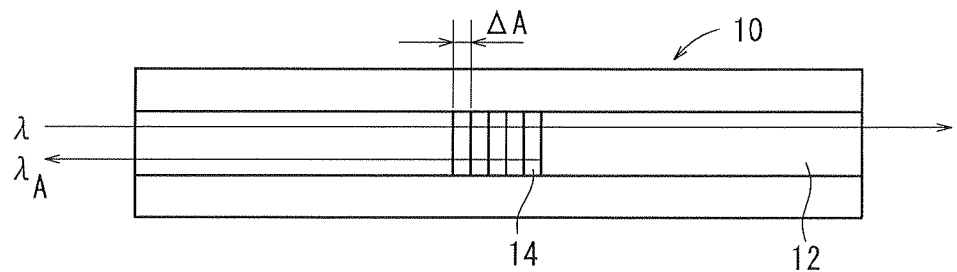
FIG. 1A is an outline explanatory view of an FBG sensor.

The FBG sensor is constructed by irradiating, with ultraviolet rays, a portion of a core 12 to which Ge has been added in an optical fiber 10 thereby to form gratings 14. In FIG. 1A, the period (lattice spacing) of the gratings 14 is shown by $\Delta_A$.

Figure 1B:
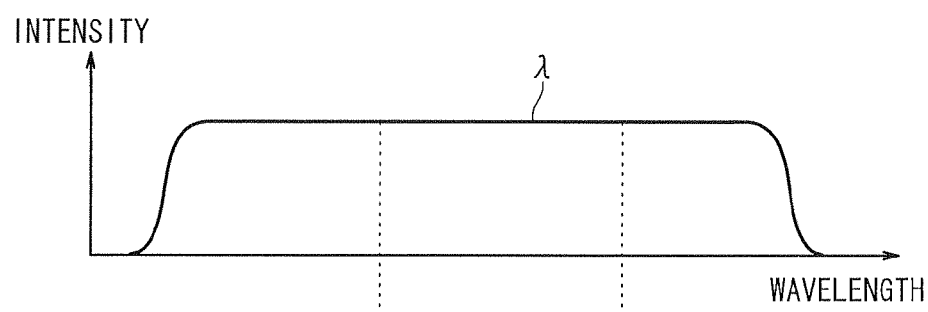
FIG. 1B is an explanatory view showing a relationship between the wavelength and intensity of light incident on the FBG sensor.

In a condition where stresses are not applied to the optical fiber 10, in the case that light having wavelengths and intensity as shown in FIG. 1B is incident on the core 12, the gratings 14 reflect light (reflected light) of a specific wavelength $\lambda_A$ (see FIG. 1C) from among the wavelengths $\lambda$ shown in FIG. 1B.

Figure 1C:
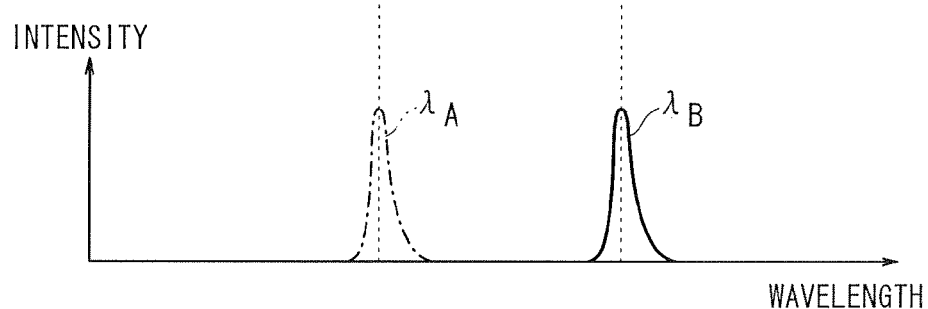
FIG. 1C is an explanatory view showing a relationship between the wavelength and intensity of light reflected by gratings.
Figure 1D:
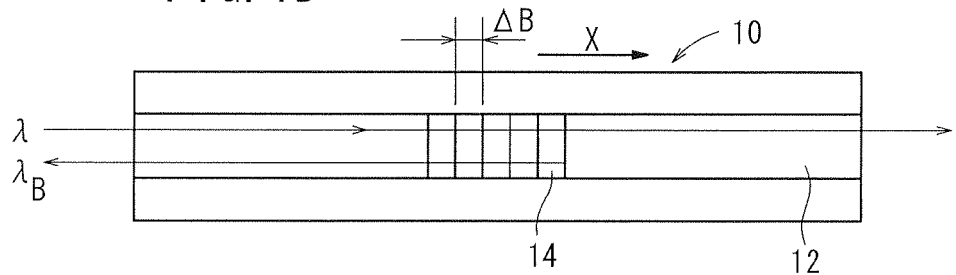
FIG. 1D is an outline explanatory view of an FBG sensor in which gratings thereof are expanded.

On the other hand, as shown in FIG. 1D, when stresses are applied to the optical fiber 10, the grating lattice spacing changes from $\Delta_A$ to $\Delta_B$ ($\Delta_A < \Delta_B$), and the wavelength (reflected wavelength) of the reflected light shifts from $\lambda_A$ to $\lambda_B$ (see FIG. 1C).

The reflected wavelength $\lambda_A$ prior to application of stresses and the reflected wavelength $\lambda_B$ when stresses are applied, taking $n_{eff}$ to be the effective refractive index of the core 12, is represented by the following equations (1) and (2).

$$\lambda_A = 2 \times n_{eff} \times \Delta_A \quad (1)$$

$$\lambda_B = 2 \times n_{eff} \times \Delta_B \quad (2)$$

In this manner, the reflected wavelengths $\lambda_A$, $\lambda_B$ are determined by the grating lattice spacing $\Delta_A$, $\Delta_B$. Further, the initial lattice spacing $\Delta_A$ prior to application of stresses is set optionally corresponding to system specifications and intended usage.

Accordingly, using the FBG sensor, based on the shift amount ($\lambda_B - \lambda_A$) of the reflected wavelengths from $\lambda_A$ to $\lambda_B$, stresses applied to the optical fiber 10 can be detected, and the presence or absence of stresses can be determined.

First Embodiment

Next, with reference to FIGS. 2 through 10, explanations shall be given concerning a pressure sensor (distribution type pressure sensor) 16 according to a first embodiment of the present invention, and an FBG sensor 22 incorporated into the pressure sensor 16.

Figure 2:
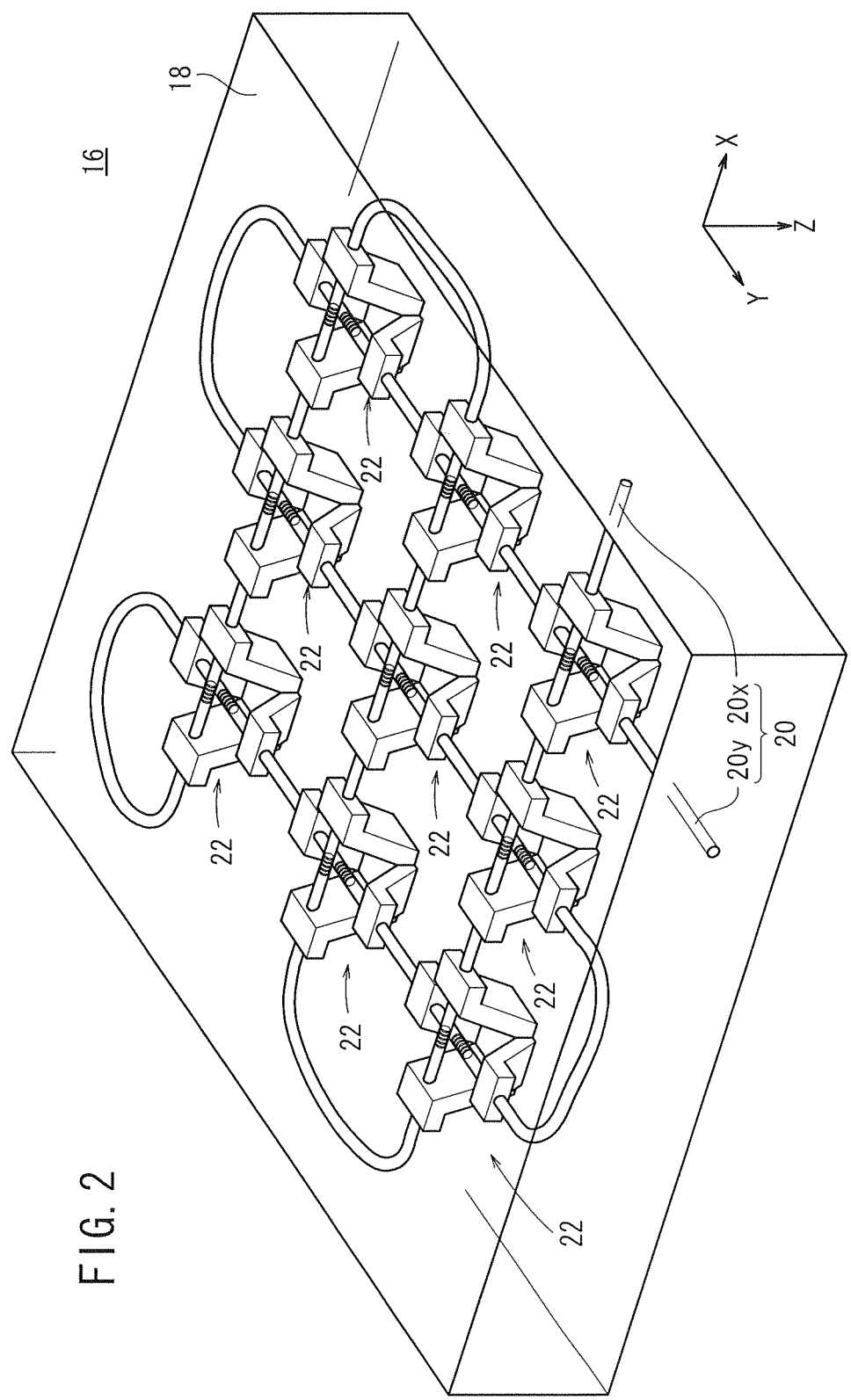
FIG. 2 is a perspective view of a pressure sensor, in which a plurality of FBG sensors according to a first embodiment are disposed in a sheet.

As shown in FIG. 2, the pressure sensor 16 is constituted by embedding a single optical fiber cable 20 in a flexible sheet 18 along a surface direction (X-Y plane direction) of the sheet 18, and by disposing (arraying) in a matrix form along the optical fiber cable 20 a plurality of FBG sensors 22, which are made into addresses (i.e., respective addresses are assigned thereto).

More specifically, the optical fiber cable 20 is constituted from an optical fiber (first optical fiber) 20x the longitudinal direction of which is aligned in an X-direction by arranging the optical fiber cable 20 in a serpentine form along the Y-direction, and an optical fiber (second optical fiber) 20y the longitudinal direction of which is aligned in a 1-direction by arranging the optical fiber cable 20 in a serpentine form along the X-direction. In this case, the optical fiber 20x and the optical fiber 20y are arranged in a serpentine fashion at mutually different heights (see FIGS. 2 to 4), whereas, as viewed in plan, the FBG sensors 22 are disposed at locations where the optical fiber 20x and the optical fiber 20y intersect at right angle (see FIG. 7). Accordingly, the sheet 18 is formed by molding a material such as plastic or the like having a certain flexibility, such that the optical fiber cable 20 and the FBG sensors 22 are embedded therein.

In FIG. 2, although it is shown that nine individual FBG sensors 22 are arranged and assigned addresses in a 3×3 matrix form, the number of FBG sensors 22 embedded in the sheet 18 is not limited to nine, and this number may be greater or lesser. In either case, in the first embodiment, in the interior of the sheet 18, the respective FBG sensors 22 may be arrayed and disposed in a matrix form along the surface direction (X-Y plane direction) of the sheet 18.

Figure 3:
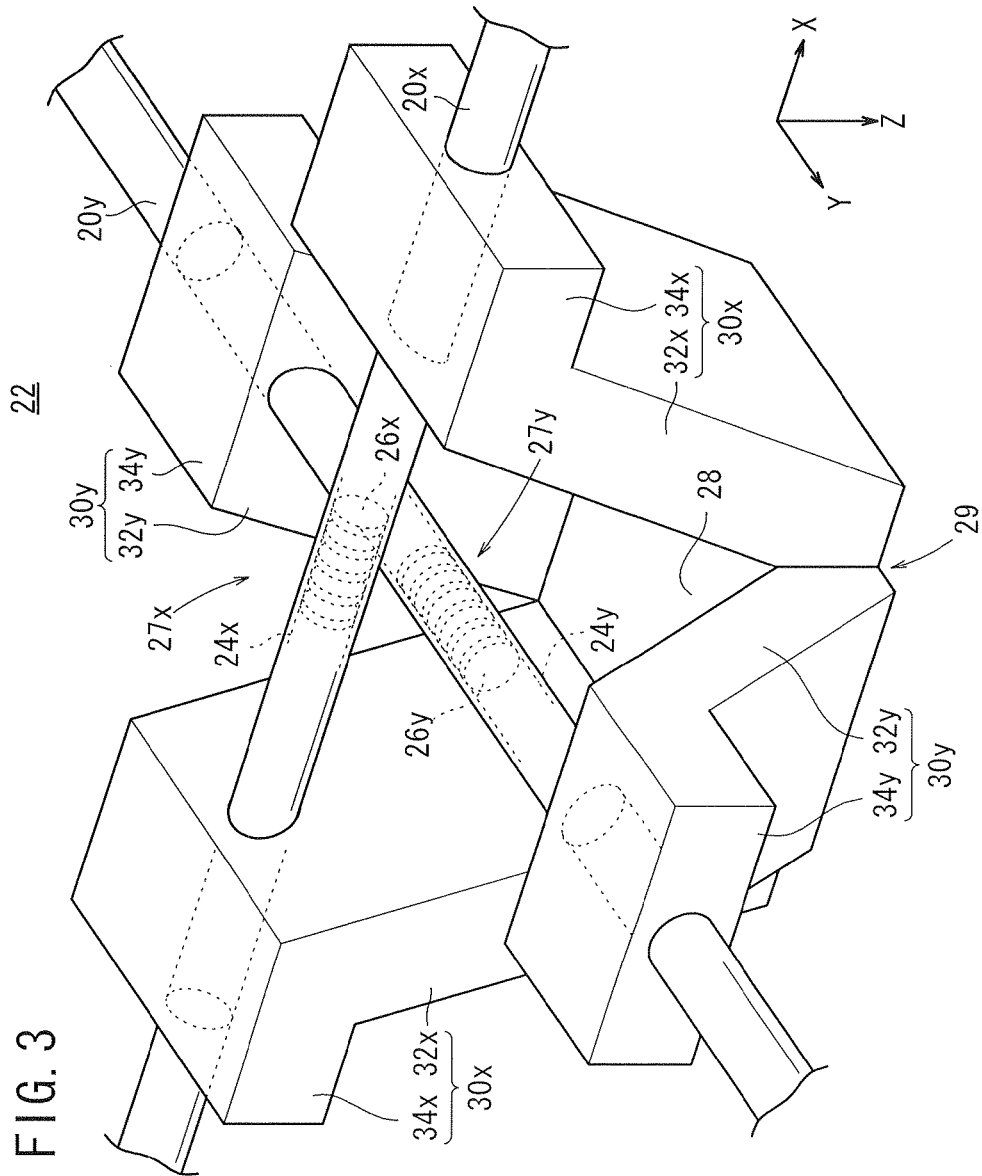
FIG. 3 is an enlarged perspective view of one of the FBG sensors shown in FIG. 2.
Figure 4:
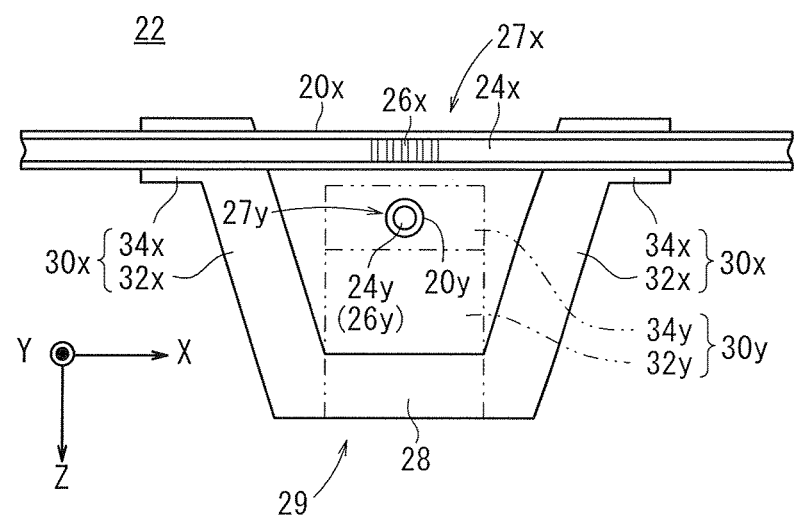
FIG. 4 is an outline explanatory view of the FBG sensor shown in FIG. 3.

Further, in FIGS. 2 to 4, although a case is illustrated in which the optical fiber 20x is disposed higher in position than the optical fiber 20y, it goes without saying that the optical fiber 20x may be disposed lower in position than the optical fiber 20y.

As shown in FIGS. 2 to 4 and 7, at locations where the optical fiber 20x and the optical fiber 20y intersect at right angle, gratings (first gratings) 26x are formed in the core 24x in the X-direction of the optical fiber cable 20, whereas other gratings (second gratings) 26y are formed in the core 24y in the Y-direction of the optical fiber cable 20. In this case, all of the gratings 26x, 26y have mutually different lattice spacings and reflected wavelengths.

More specifically, in the cores 24x, 24y of a single optical fiber cable 20, a plurality of gratings 26x, 26y are formed having mutually different lattice spacings and reflected wavelengths. In the first embodiment, the optical fiber cable is embedded inside the sheet 18 so that, at locations where the FBG sensors are disposed, one grating 26x and one grating 26y are made to intersect as viewed in plan.

The FBG sensor 22 according to the first embodiment shall now be explained in greater detail with reference to FIGS. 2 through 4.

The FBG sensor 22 comprises a first stress detection sensor 27x having an optical fiber 20x in which gratings 26x are arrayed, a second stress detection sensor 27y made up from an optical fiber 20y in which gratings 26y are arrayed, and a stress direction converter 29 for converting stresses (normal stresses) applied in the Z-direction into stresses (components) along the X-direction and the Y-direction, and transmitting the converted stresses to the optical fibers 20x, 20y.

In this case, the stress direction converter 29 includes a rectangular shaped flat portion 28 that extends parallel to the X-Y direction, stress transmitting sections 30x that are bridged from two opposite sides of the flat portion 28 to respective ends of the gratings 26x, and other stress transmitting sections 30y that are bridged from two other opposite sides of the flat portion 28 to respective ends of the gratings 26y.

Two stress transmitting sections 30x, which are formed in mutual confronting relation, each include an inclined section 32x, which is joined to the flat portion 28 and is inclined toward the optical fiber 20x, and a joint section 34x that is joined to the inclined section 32x and partially surrounds an outer peripheral surface of the optical fiber 20x. In this case, as shown in FIGS. 4 and 5, the angles formed by each of the inclined sections 32x and the joint sections 34x are set mutually equal to one another.

On the other hand, in the same manner as the stress transmitting section 30x, two stress transmitting sections 30y, which are formed in mutual confronting relation, each include an inclined section 32y, which is joined to the flat portion 28 and is inclined toward the optical fiber 20y, and a joint section 34y that is joined to the inclined section 32y and partially surrounds an outer peripheral surface of the optical fiber 20y. In this case, the angles formed by each of the inclined sections 32y and the joint sections 34y are set mutually equal to one another.

As stated above, inside the sheet 18, the optical fibers 20y are disposed at a position lower than the optical fibers 20x (see FIGS. 2 to 4). Therefore, upper surfaces of the joint sections 34y are set at positions lower than upper surfaces of the joint sections 34x.

Figure 5:
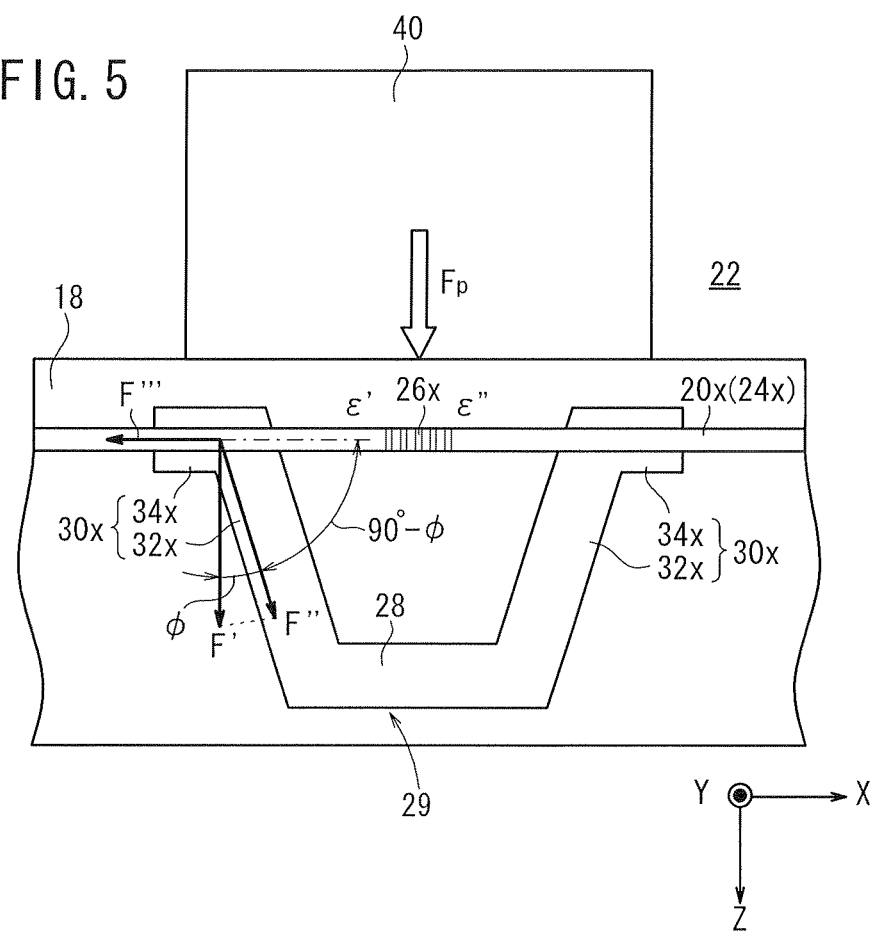
FIG. 5 is a view for explaining detection principles of normal stresses by the FBG sensor of FIGS. 2 and 3.
Figure 6:
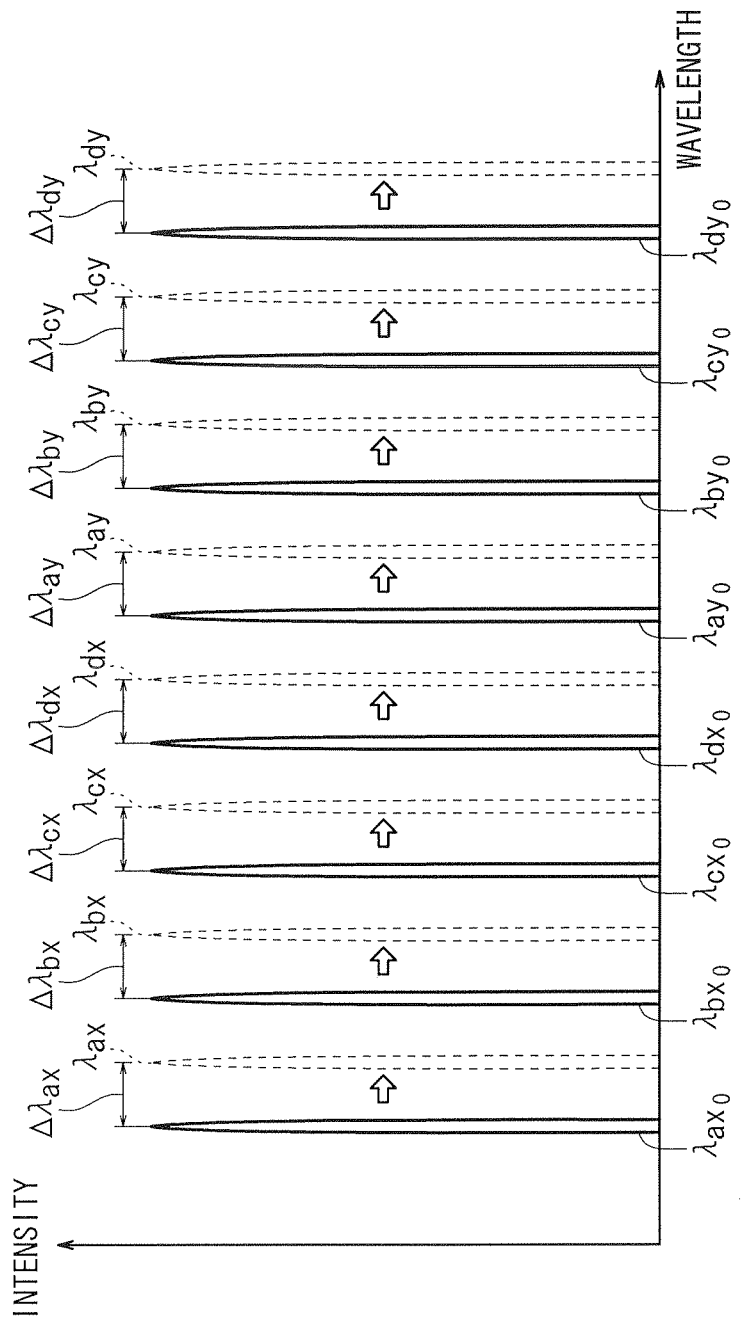
FIG. 6 is an explanatory view showing a relationship between the wavelength and intensity of light reflected by the gratings.
Figure 7:
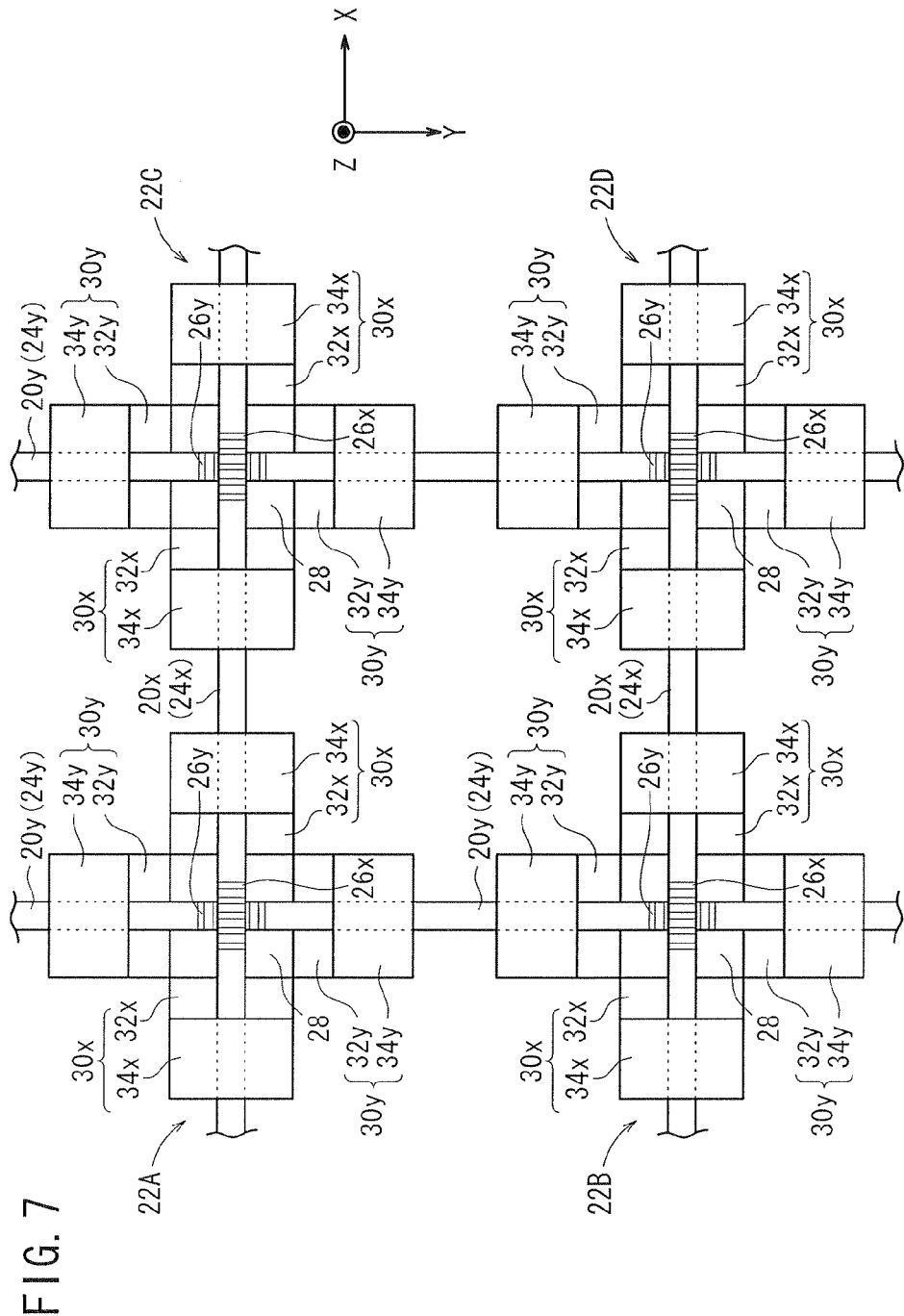
FIG. 7 is an enlarged plan view of the plurality of FBG sensors shown in FIG. 2.

Next, with reference to FIGS. 5 through 7, explanations shall be made concerning a method of detecting normal stresses when a body 40 comes into contact with a surface of the sheet 18 above the FBG sensors 22 and thereby applies such normal stresses (stresses along the Z-direction) to the gratings 26x, 26y, and a method of judging that horizontal stresses (stresses along the X-Y direction, i.e., shear stresses) are not being applied but only normal stresses are applied.

At a time when a normal stress $F_p$ is applied along the Z-direction from the body 40 to the sheet 18, a stress F' is applied along the Z-direction of the stress transmitting sections 30x.

Because four stress transmitting sections 30x, 30y exist in one FBG sensor 22, the stress F' that is applied to one of the stress transmitting sections 30x, 30y is represented ideally by the following equation (3).

$$F' = F_p/4 \quad (3)$$

A component (force) F" of the stress F' in a direction along the inclined section 32x, assuming that the angle formed by the Z-direction (stress F') and the inclined section 32x is given by $\phi$, is represented by the following equation (4).

$$F'' = F' \cos\phi = (F_p/4) \times \cos\phi \quad (4)$$

Further, because the angle formed by the force F" and the longitudinal direction (X-direction) of the optical fiber 20x is defined by (90°−$\phi$), the force F''' which is applied to the optical fiber 20x and the joint section 34x is represented by the following equation (5).

$$F''' = F'' \cos(90°-\phi) = F'' \sin\phi = (F_p/4) \times \cos\phi \times \sin\phi \quad (5)$$

By application of the force F''' to the optical fiber 20x, strains (stretching) are generated in the X-direction of the gratings 26 such that the lattice spacing of the gratings 26 changes (increases).

The strain $\epsilon$ in the gratings 26 generated along the X-direction by the force F''' attains a value ($\epsilon = \epsilon' + \epsilon''$) as a result of adding the strain $\epsilon'$ in the gratings 26x on the left side of FIG. 5 together with the strain $\epsilon''$ on the right side of FIG. 5.

Because, as shown in FIG. 5, the FBG sensor 22 is constructed with left-right (lateral) symmetry and thus the same force F''' acts on both left and right sides of the gratings 26x, with the result that $\epsilon' = \epsilon''$.

Further, if the Young's modulus of the core 24x of the optical fiber 20x is given by E, the strains $\epsilon$, $\epsilon'$, $\epsilon''$ are represented respectively by the following equations (6), (7) and (8).

$$\epsilon' = (1/E) \times F''' = \{1/(4 \times E)\} \times F_p \cdot \cos\phi \times \sin\phi \quad (6)$$

$$\epsilon'' = \epsilon' = (1/E) \times F''' = \{1/(4 \times E)\} \times F_p \cdot \cos\phi \times \sin\phi \quad (7)$$

$$\epsilon = \epsilon' + \epsilon'' = \{1/(2 \times E)\} \times F_p \cdot \cos\phi \times \sin\phi \quad (8)$$

Furthermore, at a time when the grating number of the gratings 26x is given by N, by application of the normal stress $F_p$, the additive portion $\Delta$ to the lattice spacing of the gratings 26x is represented by the following equation (9).

$$\Delta = \epsilon/(N-1) = (F_p \times \cos\phi \times \sin\phi)/\{2 \times E \times (N-1)\} \quad (9)$$

On the other hand, based on equation (1), assuming that the lattice spacing of the gratings 26x prior to application of the normal stress $F_p$ is given by $\Delta_{0ax}$, the reflected wavelength $\lambda_{ax0}$ (see FIG. 6) before application of the force F is represented by the following equation (10), in which the subscript a indicates a code relating to the FBG sensor 22A shown in FIG. 7.

$$\lambda_{ax0} = 2 \times n_{eff} \times \Delta_{0ax} \quad (10)$$

Further, the reflected wavelength $\lambda_{ax}$ at the gratings 26x after application of the normal stress $F_p$, taking into consideration the additive portion $\Delta$ given by equation (9), is represented by the following equation (11).

$$\lambda_{ax} = 2 \times n_{eff} \times (\Delta + \Delta_{0ax}) = 2 \times n_{eff} \times [(F \times \cos\phi \times \sin\phi)/\{2 \times E \times (N-1)\} + \Delta_{0ax}] \quad (11)$$

Accordingly, after application of the normal stress $F_p$, the peak change amount $\Delta\lambda_{ax}$ in the reflected wavelength of the gratings 26x is represented by the following equation (12).

$$\Delta\lambda_{ax} = \lambda_{ax} - \lambda_{ax0} = 2 \times n_{eff} \times [(F_p \times \cos\phi \times \sin\phi)/\{2 \times E \times (N-1)\} + \Delta_{0ax}] - 2 \times n_{eff} \times \Delta_{0ax} = n_{eff} \times [(F_p \times \cos\phi \times \sin\phi)/\{E \times (N-1)\}] \quad (12)$$

Similar to equation (12), the peak change amount $\Delta\lambda_{ay}$ in the reflected wavelength of the gratings 26y is represented by the following equation (13). In equation (13), the subscript y indicates a code (a code relating to the gratings 26y), which concerns the Y-direction.

$$\Delta\lambda_{ay} = \lambda_{ay} - \lambda_{ay0} = 2 \times n_{eff} \times [(F_p \times \cos\phi \times \sin\phi)/\{2 \times E \times (N-1)\} + \Delta_{0ay}] - 2 \times n_{eff} \times \Delta_{0ay} = n_{eff} \times [(F_p \times \cos\phi \times \sin\phi)/\{E \times (N-1)\}] \quad (13)$$

Accordingly, if horizontal stresses (stresses applied along the X-direction and the Y-direction) along the surface of the sheet 18 are not generated, and in the case that only normal stresses $F_p$ are applied, in one of the FBG sensors 22, by the aforementioned equations (12) and (13), the peak change amount $\Delta\lambda_{ax}$ of the reflected wavelength of the gratings 26x and the peak change amount $\Delta\lambda_{ay}$ of the reflected wavelength of the gratings 26y become mutually equal to each other, as shown by the following equation (14).

$$\Delta\lambda_{ax} = \Delta\lambda_{ay} \quad (14)$$

Furthermore, as shown in FIGS. 6 and 7, in the adjacent FBG sensors 22A to 22D, if, without generating horizontal stresses, only normal stresses $F_p$ are applied, concerning the other FBG sensors 22B to 22D as well, similar to equation (14), the relationships shown by the following equations (15) to (17) hold, in which the subscripts b to d thereof indicate codes pertaining to the FBG sensors 22B through 22D.

$$\Delta\lambda_{bx} = \Delta\lambda_{by} \quad (15)$$

$$\Delta\lambda_{cx} = \Delta\lambda_{cy} \quad (16)$$

$$\Delta\lambda_{dx} = \Delta\lambda_{dy} \quad (17)$$

Accordingly, if the above equations (14) to (17) hold, then based on the wavelength shift amounts (change amounts) $\Delta\lambda_{ax}$, $\Delta\lambda_{ay}$, $\Delta\lambda_{bx}$, $\Delta\lambda_{by}$, $\Delta\lambda_{cx}$, $\Delta\lambda_{cy}$, $\Delta\lambda_{dx}$, $\Delta\lambda_{dy}$, the normal stress $F_p$ applied to the FBG sensors 22A to 22D can be detected (calculated).

Specifically, in the case that horizontal stresses are not applied, if proportionality constants of strains on the gratings 26x, 26y of each of the FBG sensors 22A to 22D are given by K, L, M, N, then the normal stresses $F_A$, $F_B$, $F_C$, $F_D$ applied to the FBG sensors 22A to 22D are represented by the following equations (18) through (21).

$$F_A = K \times \Delta\lambda_{ax} = K \times \Delta\lambda_{ay} \tag{18}$$

$$F_B = L \times \Delta\lambda_{bx} = L \times \Delta\lambda_{by} \tag{19}$$

$$F_C = M \times \Delta\lambda_{cx} = M \times \Delta\lambda_{cy} \tag{20}$$

$$F_D = N \times \Delta\lambda_{dx} = N \times \Delta\lambda_{dy} \tag{21}$$

Next, with reference to FIGS. 7 through 10, explanations shall be made concerning principles of detection utilized when a body 50 comes into contact with a surface of the sheet 18 above the FBG sensor 22, and when only horizontal stresses (stresses along the X-direction and the Y-direction, i.e., shear stresses) are applied from the body 50 to the gratings 26x, 26y. More specifically, a case shall be explained in which, while horizontal stresses are applied to each of the gratings 26x, 26y, normal stresses are not applied thereto.

First, concerning the four FBG sensors 22A through 22D, if equations (14) through (17) do not hold, then generation of horizontal stresses in the X-Y plane (in the surface direction of the sheet 18) can be judged. In this case, detection of such horizontal stresses is carried out using two adjacent FBG sensors. Thus, for detecting horizontal stresses, the necessary minimum spatial resolution is the area made up by two FBG sensor portions.

Figure 8:
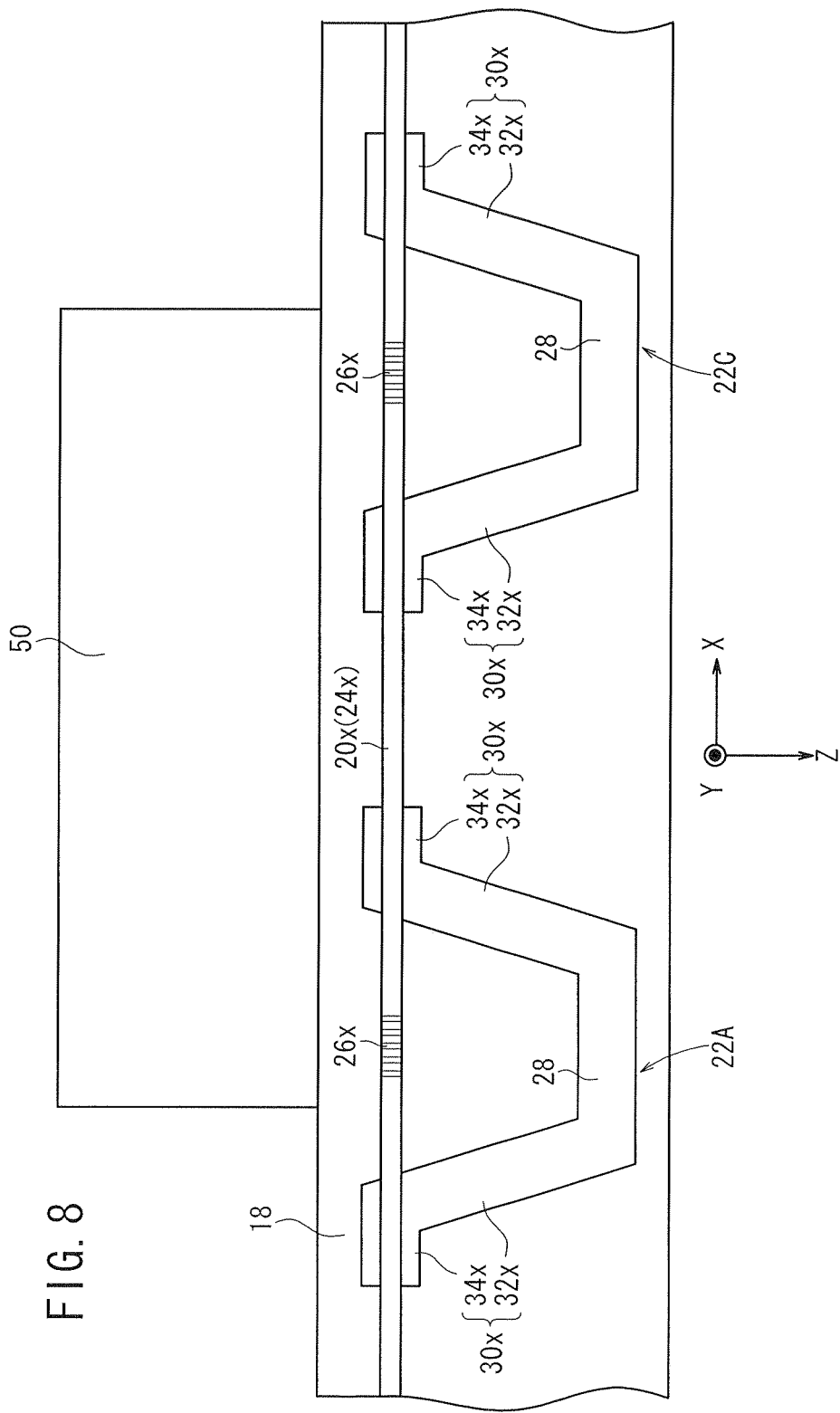
FIG. 8 is an explanatory view for explaining detection principles of normal stresses and horizontal stresses between two of the FBG sensors shown in FIG. 2.
Figure 9:
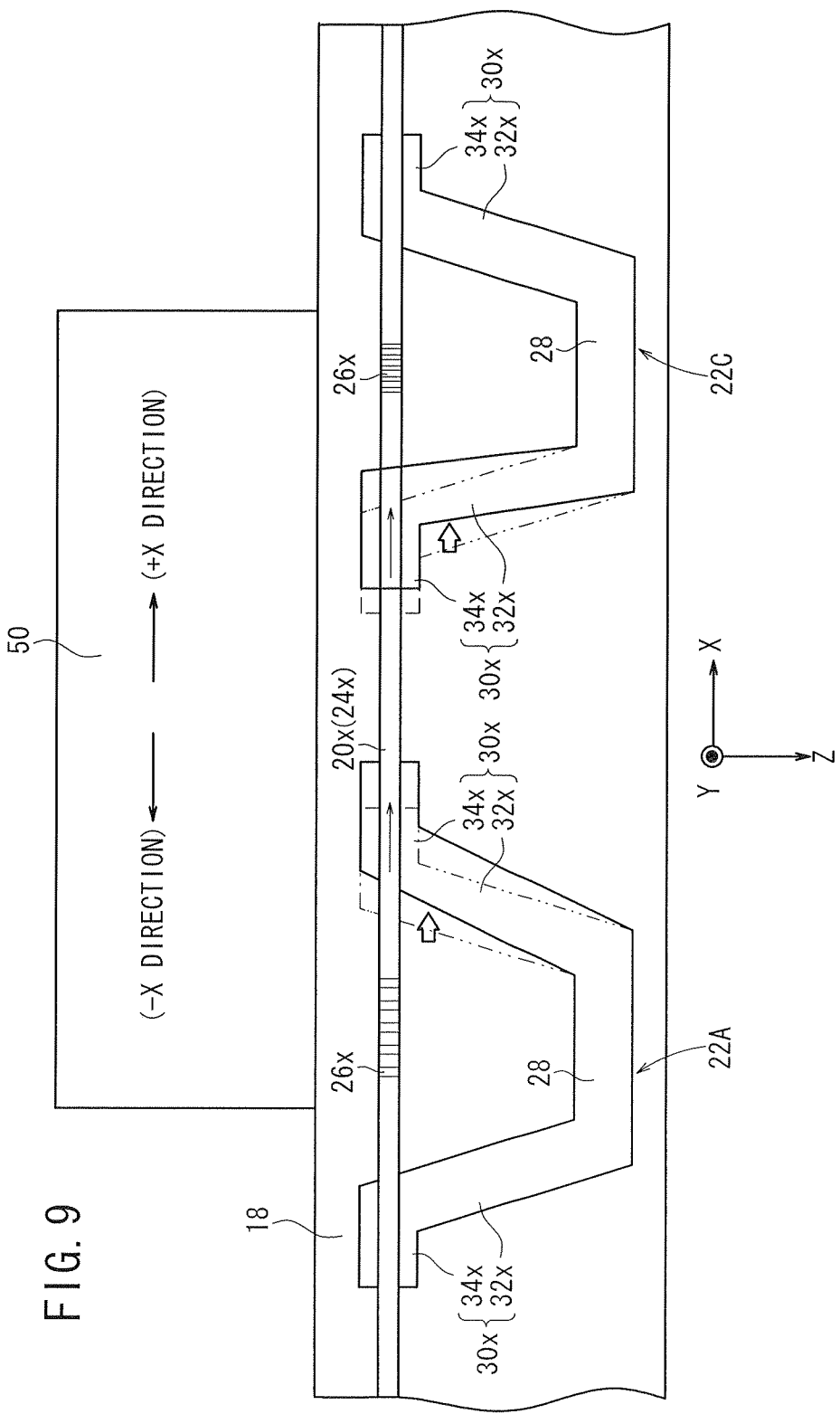
FIG. 9 is an explanatory view for explaining detection principles of normal stresses and horizontal stresses between two of the FBG sensors shown in FIG. 2.

As shown in FIGS. 8 and 9, in the case that the body 50 is in contact with the surface of the sheet 18 so as to straddle over the right side of the FBG sensor 22A and the left side of the FBG sensor 22C, the body 50 applies a horizontal stress along the X-direction with respect to the stress transmitting section 30x on the right side of the FBG sensor 22A and with respect to the stress transmitting section 30x on the left side of the FBG sensor 22C. In FIG. 9, a case is shown in which a horizontal stress along the X-direction (i.e., a horizontal stress in the positive X-direction) is applied.

In this case, the horizontal stress applied to the stress transmitting section 30x on the right side of the FBG sensor 22A acts as a force that causes the lattice spacing of the gratings 26x of the FBG sensor 22A to expand in the X-direction. On the other hand, the horizontal stress applied to the stress transmitting section 30x on the left side of the FBG sensor 22C acts as a force that causes the lattice spacing of the gratings 26x of the FBG sensor 22C to contract in the X-direction.

In FIG. 9, a position (shown by the one-dot-dashed lines) of the stress transmitting section 30x before application of the horizontal stress thereto is shown schematically in combination with the position (shown by solid lines) of the stress transmitting section 30x after application of the horizontal stress. Together therewith, the lattice spacing of the gratings 26x after application of the horizontal stress also is shown.

The reflected wavelength $\lambda_{ax0}$ of the gratings 26x of the FBG sensor 22A prior to application of horizontal stresses is represented by the above-noted equation (10). On the other hand, similar to equation (10), the reflected wavelength $\lambda_{cx0}$ of the gratings 26x of the FBG sensor 22C is represented by the following equation (22).

$$\lambda_{cx0} = 2 \times n_{eff} \times \Delta_{0cx} \tag{22}$$

Figure 10:
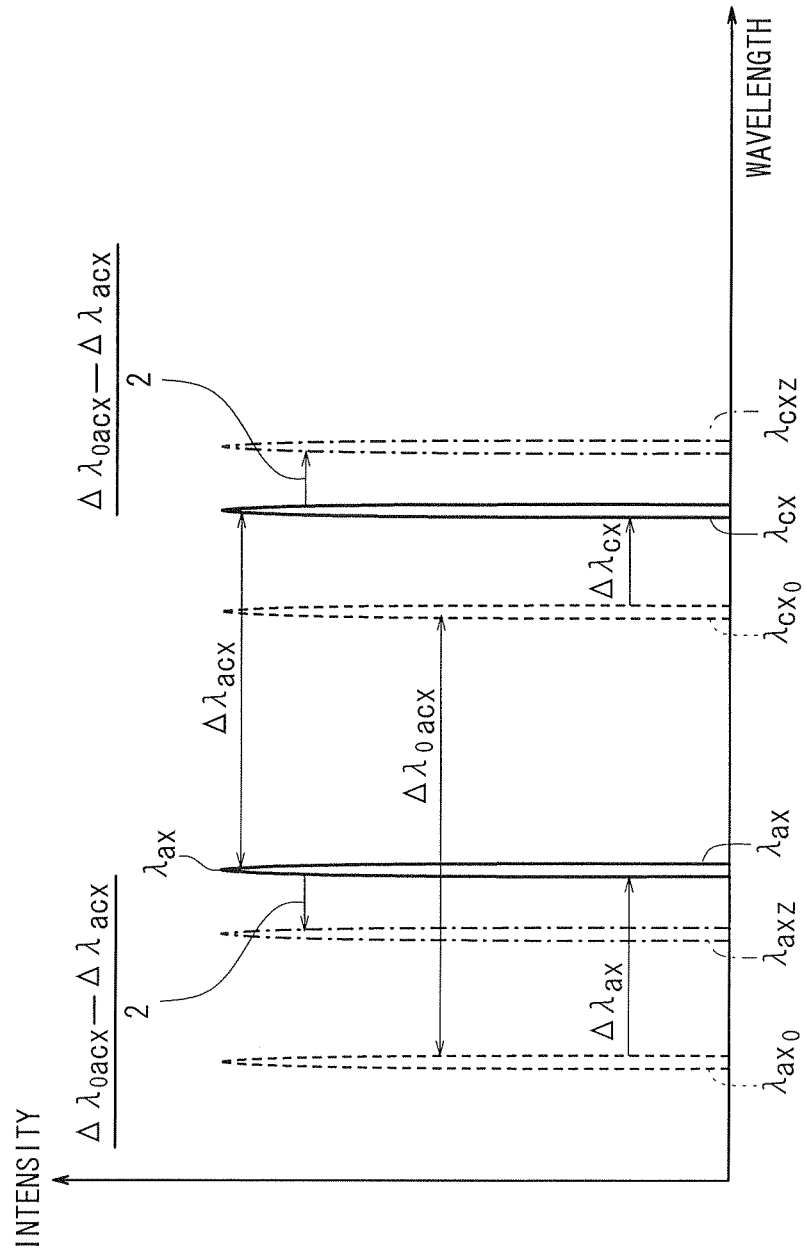
FIG. 10 is an explanatory view showing a relationship between the wavelength and intensity of light reflected by gratings of the FBG sensors shown in FIGS. 8 and 9.

Accordingly, as shown in FIG. 10, the interval $\Delta\lambda_{0acx}$ between $\lambda_{ax0}$ and $\lambda_{cx0}$ is represented uniquely by the following equation (23).

$$\Delta\lambda_{0acx} = \lambda_{cx0} \lambda_{ax0} = 2 \times n_{eff} \times (\Delta_{0cx} - \Delta_{0ax}) \tag{23}$$

Additionally, the reflected wavelength $\lambda_{ax}$ of the gratings 26x of the FBG sensor 22A, after the horizontal stress shown in FIG. 9 has been applied in the X-direction, is represented in the same manner as the above-noted equation (11). On the other hand, similar to equation (11), the reflected wavelength $\lambda_{cx}$ of the gratings 26x of the FBG sensor 22C after application of the horizontal stress is represented by the following equation (24).

$$\lambda_{cx} = 2 \times n_{eff} \times (-\Delta + \Delta_{0cx}) = 2 \times n_{eff} \times [-(F \cos \phi \times \sin \phi)/\{2 \times E \times (N-1)\} + \Delta_{0cx}] \tag{24}$$

In equation (24), the minus sign appended to the Δ symbol implies that the lattice spacing of the gratings 26x of the FBG sensor 22C as a result of application of horizontal stresses is contracted.

In this manner, the reflected wavelength after application of the horizontal stress changes linearly with respect to the applied horizontal stress. Accordingly, as shown in FIG. 10, the interval $\Delta\lambda_{acx}$ between $\lambda_{ax}$ and $\lambda_{cx}$ also changes linearly with respect to the horizontal stress and is represented by the following equation (25).

$$\Delta\lambda_{acx} = \lambda_{cx} - \lambda_{ax} = 2 \times n_{eff} \times \{(-\Delta + \Delta_{0cx}) - (\Delta + \Delta_{0ax})\} \tag{25}$$

By equation (25), the value $F_{acx}$ of the horizontal stress applied to the FBG sensors 22A, 22C is proportional to the difference between the intervals $\Delta\lambda_{0acx}$, $\Delta\lambda_{acx}$ of the reflected wavelengths before and after application of the horizontal stress. Further, the sign of this difference indicates the direction of the horizontal stress.

If the proportionality constant of strains in the X-direction due to the horizontal stress is taken to be O, then the horizontal stress $F_{acx}$ in the X-direction detected at the FBG sensors 22A, 22C is represented by the following equation (26).

$$F_{acx} = O(\Delta\lambda_{0acx} - \Delta\lambda_{acx}) \tag{26}$$

Note that, in equation (26), in the case that horizontal stresses are applied in the positive X-direction (i.e., in a direction from the FBG sensor 22A toward the FBG sensor 22C), then $F_{acx} > 0$. On the other hand, in the case that horizontal stresses are applied in the negative X-direction (i.e., in a direction from the FBG sensor 22C toward the FBG sensor 22A), then $F_{acx} < 0$.

As described above, detection of horizontal stresses between two FBG sensors 22A, 22C has been described. However, horizontal stresses in the X-direction between the FBG sensors 22B, 22D, horizontal stresses in the Y-direction between the FBG sensors 22A, 22B, and horizontal stresses in the Y-direction between the FBG sensors 22C, 22D can also be detected in the same manner.

More specifically, in the case that a proportionality constant of strains in the X-direction caused by horizontal stresses between the FBG sensors 22B, 22D is taken as P, a proportionality constant of strains in the Y-direction caused by horizontal stresses between the FBG sensors 22A, 22B is taken as Q, and a proportionality constant of strains in the Y-direction caused by horizontal stresses between the FBG sensors 22C, 22D is taken as R, the horizontal stresses $F_{bdx}$ in the X-direction detected in the FBG sensors 22B, 22D, the horizontal stresses $F_{aby}$ in the Y-direction detected in the FBG sensors 22A, 22B, and the horizontal stresses $F_{cdy}$ in the Y-direction detected in the FBG sensors 22C, 22D, are represented respectively by the following equations (27) through (29), which are similar to the aforementioned equation (26).

$$F_{bdx} = P(\Delta\lambda_{0bdx} - \Delta\lambda_{bdx}) \tag{27}$$

$$F_{aby} = Q(\Delta\lambda_{0aby} - \Delta\lambda_{aby}) \tag{28}$$

$$F_{cdy} = R(\Delta\lambda_{0cdy} - \Delta\lambda_{cdy}) \tag{29}$$

In equations (27) through (29), the subscripts bd, ab, cd represent codes related to each of the FBG sensors, and the subscripts x, y represent codes related to the X-direction and the Y-direction, respectively. Further, in equations (27) through (29) as well, in the case that horizontal stresses are applied in the positive X-direction and the positive Y-direction, the sizes of the horizontal stresses are positive values, whereas conversely, in the case that horizontal stresses are applied in the negative X-direction and the negative Y-direction, the sizes of the horizontal stresses are negative values.

Next, explanations shall be giving concerning detection of normal stresses in a case where both horizontal stresses and normal stresses are applied. Such explanations shall concern a method in which normal stresses applied to the FBG sensor 22A are detected from horizontal stresses, which are applied in the X-direction.

In FIG. 10, the broken lines indicate reflected waves prior to application of stresses (horizontal stresses and normal stresses), while the solid lines indicate reflected wavelengths after application of horizontal stresses. In this case, when applied together with normal stresses, the reflected wavelengths are shifted from the characteristic shown by the solid lines to the characteristic shown by the one-dot-dashed lines.

More specifically, when stresses are applied to the FBG sensors 22A, 22C, the characteristics of the two one-dot-dashed lines indicate, respectively, the reflected wavelength (one-dot-dashed line on the left side) for a case in which the contribution of normal stresses in the FBG sensor 22A is considered, and the reflected wavelength (one-dot-dashed line on the right side) for a case in which the contribution of normal stresses in the FBG sensor 22C is considered.

In the case that both horizontal and normal stresses are applied, among the totality of stresses that are applied, the contribution of the horizontal stresses can be represented using equation (26) and by the following formula (30).

$$\Delta\lambda_{0acx} - \Delta\lambda_{acx} \quad (30)$$

Further, the length (expanded amount) by which the gratings 26x of the FBG sensor 22A are stretched, and the length (contracted amount) by which the gratings 26x of the FBG sensor 22C are contracted, are substantially equal to each other, and therefore, as to each FBG sensor 22A, 22C, the contribution of horizontal stresses can be represented using equation (30) and by the following formula (31).

$$(\Delta\lambda_{0acx} - \Delta\lambda_{acx})/2 \quad (31)$$

On the other hand, in the gratings 26x of the FBG sensor 22A, the difference in the reflected wavelength between before and after application of stresses can be determined as $\Delta\lambda_{ax}$, as shown in FIG. 10.

In addition, the value received when the contribution of the horizontal stress indicated by formula (31) is subtracted from the difference $\Delta\lambda_{ax}$ becomes the contribution to the reflected wavelength of the normal stress that is applied to the FBG sensor 22A.

The contributory amount is a value that changes (varies) linearly with respect to the applied stresses, and therefore, the normal stresses $F_{az}$ applied to the FBG sensor 22A can be represented by the following equation (32), assuming that S is taken as a proportionality constant of strains in the Z-direction from such normal stresses $F_{az}$.

$$F_{az} = S[\Delta\lambda_{ax} - (\Delta\lambda_{0acx} - \Delta\lambda_{acx})/2] \quad (32)$$

On the other hand, in contrast to the FBG sensor 22A, at the FBG sensor 22C, the value at which the contributory portion of horizontal stresses is added to $\Delta\lambda_{cx}$ becomes a contributory amount to the reflected wavelength of the normal component.

Accordingly, the normal stresses $F_{cz}$ applied to the FBG sensor 22C can be represented by the following equation (33), assuming that U is taken as a proportionality constant of strains in the Z-direction from the normal stresses $F_{cz}$.

$$F_{cz} = U[\Delta\lambda_{cx} + (\Delta\lambda_{0acx}\Delta\lambda_{acx})/2] \quad (33)$$

The normal stresses $F_{bz}$, $F_{dz}$ that are imposed on the FBG sensors 22B, 22D can be also determined from the horizontal stresses applied in the X-direction to the FBG sensors 22B, 22D.

More specifically, taking T and V to be proportionality constants of strains in the Z-direction from the normal stresses $F_{bz}$, $F_{dz}$, the normal stresses $F_{bz}$, $F_{dz}$ can be represented by the following equations (34) and (35).

$$F_{bz} = T[\alpha\lambda_{bx} - (\Delta\lambda_{0bdx} - \Delta\lambda_{bdx})/2] \quad (34)$$

$$F_{dz} = V[\alpha\lambda_{dx} + (\Delta\lambda_{0bdx}\Delta\lambda_{bdx})/2] \quad (35)$$

In equations (34) and (35), the subscripts b and d are representative of codes pertaining to each of the FBG sensors, whereas the subscript x is representative of a code relating to the X-direction.

Further, in accordance with the foregoing explanations, descriptions have been given for cases in which normal stresses in the Z-direction are determined from horizontal stresses imposed in the X-direction. However, normal stresses in the Z-direction could also be determined from horizontal stresses imposed in the Y-direction.

In this case, concerning the pair of FBG sensors 22A, 22B, and the pair of FBG sensors 22C, 22D along the Y-direction, similar to the above equations (32) to (35), the normal stresses in association therewith can be determined. More specifically, normal stresses $F_{az}$, $F_{bz}$, $F_{cz}$, $F_{dz}$ are determined from the following equations (36) to (39).

$$F_{az} = S[\Delta\lambda_{ay} - (\Delta\lambda_{0aby} - \Delta\lambda_{aby})/2] \quad (36)$$

$$F_{bz} = S[\Delta\lambda_{by} - (\Delta\lambda_{0aby} - \Delta\lambda_{aby})/2] \quad (37)$$

$$F_{cz} = S[\Delta\lambda_{cy} - (\Delta\lambda_{0cdy} - \Delta\lambda_{cdy})/2] \quad (38)$$

$$F_{dz} = S[\Delta\lambda_{dy} - (\Delta\lambda_{0cdy} - \Delta\lambda_{cdy})/2] \quad (39)$$

Figure 11:
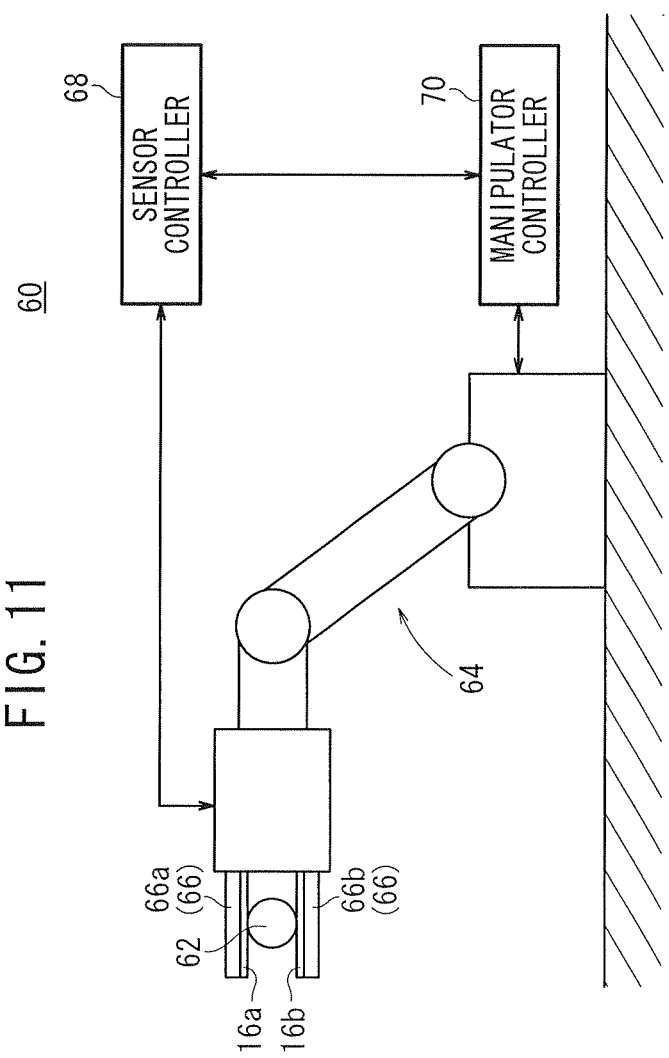
FIG. 11 is a structural view of a robotic system to which the distribution type pressure sensor shown in FIG. 2 is applied.
Figure 12:
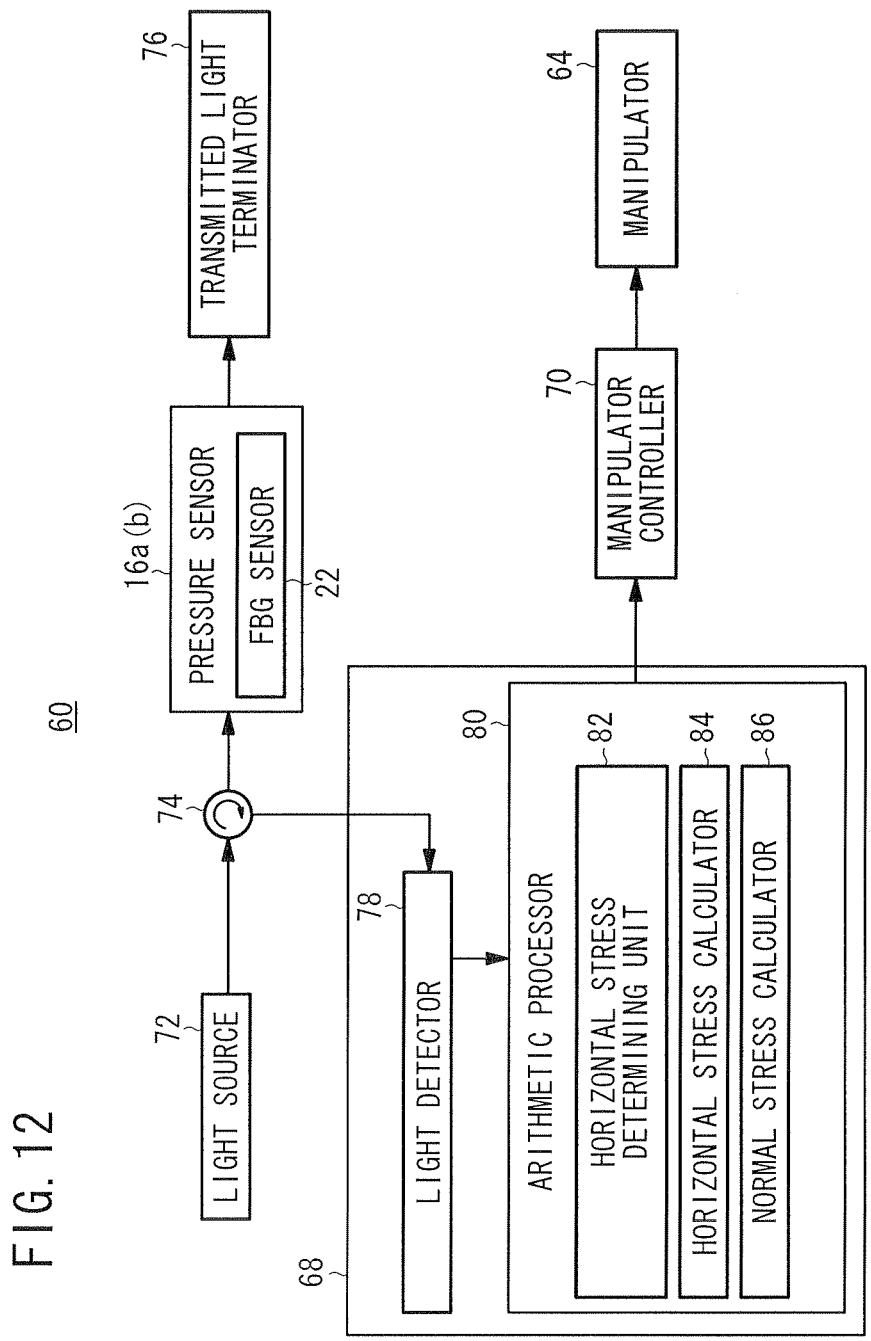
FIG. 12 is a functional block diagram of the robotic system of FIG. 11.

Next, explanations shall be made with reference to FIGS. 11 and 12 concerning an end effector 66 and a robot system (sensor signal processor) 60, on which pressure sensors according to first through seventh embodiments of the present invention are mounted.

The robot system 60 comprises a manipulator 64 for gripping a body 62 and carrying out predetermined processing thereon, pressure sensors 16a, 16b disposed on an end effector 66 (hand members (gripping members) 66a, 66b) of the manipulator 64 for detecting a gripped state of the body 62 by the hand members 66a, 66b with the pressure sensors 16a, 16b in contact with the body 62, a sensor controller 68 for controlling the pressure sensors 16a, 16b and acquiring signals pertaining to horizontal stresses and/or normal stresses that provide information relating to the gripped state of the body 62, and a manipulator controller 70 for controlling the manipulator 64 based on horizontal stress and/or normal stress signals acquired by the sensor controller 68.

In this case, based on horizontal stress signals that are detected by the pressure sensors 16a, 16b while the body 62 is being gripped, the slippage condition of the body 62 with respect to the hand members 66a, 66b can be sensed. Further, based on normal stress signals that are detected by the pressure sensors 16a, 16b while the body 62 is being gripped, the gripping force of the body 62 by the hand members 66a, 66b can be sensed. Accordingly, by controlling the hand members 66a, 66b in accordance with the detected horizontal and/or normal stresses, without causing the body 62 to fall out, the body 62 can be grasped at appropriate gripping force, and operations can be carried out, for example, to move the body to a desired position.

Further, as shown in FIG. 12, in the robot system 60, light that is output from a light source 72 is supplied to optical fiber cables 20 of the pressure sensors 16*a*, 16*b* from a light circulator 74.

From light that incident from one end of the optical fiber cables 20, a portion of the light is reflected by each of the gratings 26*x*, 26*y*, whereas the remaining light, after having passed through the gratings 26*x*, 26*y*, is directed to a transmitted light terminator 76.

Light reflected by each of the gratings 26*x*, 26*y* is directed from the light circulator 74 to a light detector 78 of the sensor controller 68, and the light detector 78 converts the peak value of reflected wavelengths into electrical signals and outputs the same. As noted previously, since the lattice spacing and reflected wavelength in each of the gratings 26*x*, 26*y* differ from each other, even though light is received by the light detector 78 from multiple gratings 26*x*, 26*y*, the sensor controller 68 is capable of discriminating the light from any given one of the gratings 26*x*, 26*y*.

An arithmetic processing unit (signal processor) 80 in the sensor controller 68 includes a horizontal stress determining unit 82, a horizontal stress calculator 84, and a normal stress calculator 86, which are constituted by the CPU of a computer.

Figure 13:
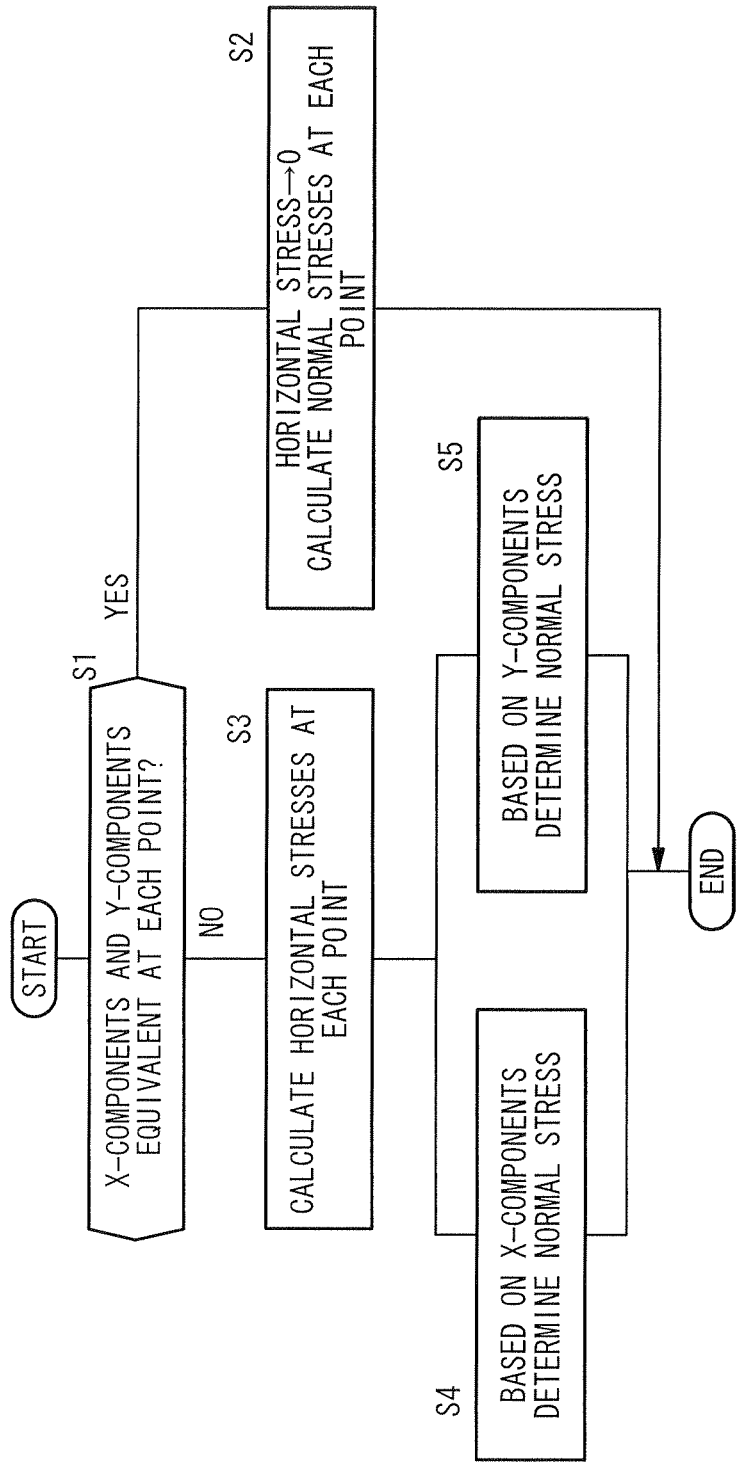
FIG. 13 is a flowchart for explaining processing steps carried out by an arithmetic processing unit shown in FIG. 12.

FIG. 13 is a flowchart for explaining the process flow carried out by the arithmetic processing unit 80.

In step S1, the horizontal stress determining unit 82 determines whether or not equations (14) through (17) have been satisfied concerning changes in the peak wavelength, and more specifically, determines whether or not the X-direction components and Y-direction components of the stresses are equivalent at respective positions of the FBG sensors 22, based on electrical signals from the light detector 78.

In step S1, in the case that the horizontal stress determining unit 82 determines that equations (14) through (17) are satisfied (step S1: YES), then, in step S2, the horizon stress calculator 84 outputs a value of zero (0) for the horizontal stresses at each of the FBG sensors 22, whereas the normal stress calculator 86 calculates normal stresses at each of the FBG sensors 22 using equations (18) through (21).

Further, in step S1, in the case that the horizontal stress determining unit 82 determines that equations (14) through (17) are not satisfied (step S1: NO), then in step S3, the horizontal stress calculator 84 calculates the horizontal stress applied to two of the FBG sensors 22 using equations (26) through (29). Also, the normal stress calculator 86 calculates normal stresses applied to each of the FBG sensors 22 using equations (32) to (35) (step S4), or alternatively, equations (36) to (39) (step S5).

In this manner, by calculating horizontal stress values, the slippage condition of the body 62 in the x-y plane can be detected. Further, by calculating normal stress values, the gripping force of the body 62 with respect to the Z-direction can also be detected.

As described above, in accordance with the FBG sensors 22, 22A to 22D, the pressure sensors 16, 16*a*, 16*b*, the end effector 66 (hand members 66*a*, 66*b*), and the robot system 60 according to the first embodiment, since by generation of strains in the gratings 26*x*, 26*y* due to horizontal stresses changes occur in the reflected wavelengths of each of the gratings 26*x*, 26*y*, by detecting shift amounts in the reflected wavelengths at each of the gratings 26*x*, 26*y*, values pertaining to the horizontal stresses applied to the FBG sensors 22, 22A to 22D from the bodies 40, 50, 62 are capable of being segregated and detected respectively as components along longitudinal directions of the optical fibers 20*x*, 20*y*.

Further, since the stress direction converter 29 converts normal stresses applied to the FBG sensors 22, 22A to 22D from the bodies 40, 50, 62 into stresses along the X-direction and the Y-direction, and transmits such converted stresses to the gratings 26*x*, 26*y*, the reflected wavelengths at each of the gratings 26*x*, 26*y* are changed due to generation of strains in each of the gratings 26*x*, 26*y* caused by the converted stresses. Accordingly, shift amounts of the reflected wavelengths in each of the optical fibers 20*x*, 20*y* are detected, and then the converted stresses are segregated into respective components of the converted stresses along longitudinal directions of each of the optical fibers 20*x*, 20*y* and detected, whereby based on such converted stresses, values pertaining to normal stresses also are capable of being detected.

Accordingly, in the first embodiment, with a comparatively simple structure, stresses (normal stresses, horizontal stresses) applied from a bodies 40, 50, 62 are capable of being segregated into multiple directions (normal direction, horizontal direction) and detected, and the accuracy in detection of stresses applied from the bodies can easily be improved.

Further, in the case that pressure sensors 16, 16*a*, 16*b* including the FBG sensors 22, 22A to 22D therein are mounted on an end effector 66 (hand members 66*a*, 66*b*) of a manipulator 64 or the like and the hand members 66*a*, 66*b* grip the body 62, because the FBG sensors 22, 22A to 22D segregate and detect external forces (normal stresses, horizontal stresses) imposed on the hand members 66*a*, 66*b* from the body 62 into a plurality of directional components, how such external forces act in spatial coordinates of the hand members 66*a*, 66*b* can easily be grasped.

Owing thereto, while the end effector 66 (hand members 66*a*, 66*b*) grips the body 62, slippage and falling of the body 62 from the end effector 66 can reliably be avoided. Further, by mounting the pressure sensors 16, 16*a*, 16*b* on the hand members 66*a*, 66*b*, the present invention is effective at enabling automization of assembly processes, such as used in assembly operations having process steps in which external forces work between assembled parts, which have heretofore been problematic in the conventional art.

Further, because stresses are detected using optical fibers 20*x*, 20*y*, no adverse influence is imparted to the FBG sensors 22, 22A to 22D, even if the sensors are subjected to electromagnetic noise or various types of electrical surges or the like. As a result, even if used in inferior environments such as factories or outside locations, the influence of the aforementioned types of noise can be avoided.

Further, assuming longitudinal directions of the optical fibers 20*x*, 20*y* are taken as an X-direction and a Y-direction respectively, whereas a normal direction at the surface of the sheet 18 is taken as a Z-direction, stresses at locations where the FBG sensors 22, 22A to 22D are arranged can be segregated into respective X, Y, Z directional components and detected.

Further, by constructing the stress direction converter 29 from the flat portion 28 and the stress transmitting sections 30*x*, 30*y*, normal stresses are converted efficiently into stresses along the surface direction of the sheet 18, and can be transmitted to each of the gratings 26*x*, 26*y*.

In this case, if the stress direction converter 29 is made from an elastic body such as rubber, a resin material or the like, when normal stresses are applied to the FBG sensors 22, 22A to 22D from the body 62, by an action of the elastic body, lattice spacings of each of the gratings 26*x*, 26*y* can easily be changed by lengths corresponding to the converted stresses along the longitudinal direction of the optical fibers 20x, 20y and thus the stresses, after conversion thereof, can be detected accurately.

Furthermore, since all of the gratings 26x, 26y are arranged in a sheet 18 using a single optical fiber cable 20, the number of light sources 72 required for supplying light to each of the gratings is simply one, whereby the cost of the apparatus as a whole can be lowered. Further, because the lattice spacings are mutually different, the reflected wavelengths produced thereby also differ mutually from each other, and as a result, mistaken detection of reflected wavelengths by the sensor controller 68 can be prevented assuredly.

Further, because the horizontal stress determining unit 82 of the arithmetic processing unit 80 judges, based on equations (14) through (17), whether or not horizontal stresses are applied to each of the FBG sensors 22, 22A to 22D from the bodies 40, 50, 62, it can easily be determined, for each of the FBG sensors 22, 22A to 22D, respectively, whether stresses currently being applied to the FBG sensors 22, 22A to 22D from the bodies 40, 50, 62 are horizontal stresses and/or normal stresses, and together therewith, mistaken detection of stresses that are currently being applied can be avoided.

Furthermore, by the normal stress calculator 86, normal stress values in each of the FBG sensors 22, 22A to 22D are calculated using equations (18) through (21), or alternatively, normal stress values in each of the FBG sensors 22, 22A to 22D are calculated using equations (32) through (35) or equations (36) through (39). Further, the horizontal stress calculator 84 calculates values of horizontal stresses that are applied to two of the FBG sensors 22, 22A to 22D using equations (26) through (29).

Owing thereto, stresses applied to two of the FBG sensors 22, 22A to 22D can be segregated respectively into components (normal stresses, horizontal stresses) of multiple directions and calculated.

Problems to be Solved by the Second Embodiment

Incidentally, with the FBG sensors 22A to 22D of the first embodiment and the pressure sensor 16 in which the FBG sensors 22A to 22D are incorporated, certain troubles occur when horizontal stresses $F_h$ applied to the overall surface of a measurement area 88 are detected by two adjacent FBG sensors 22A (22B), 22C (22D).

Figure 14:
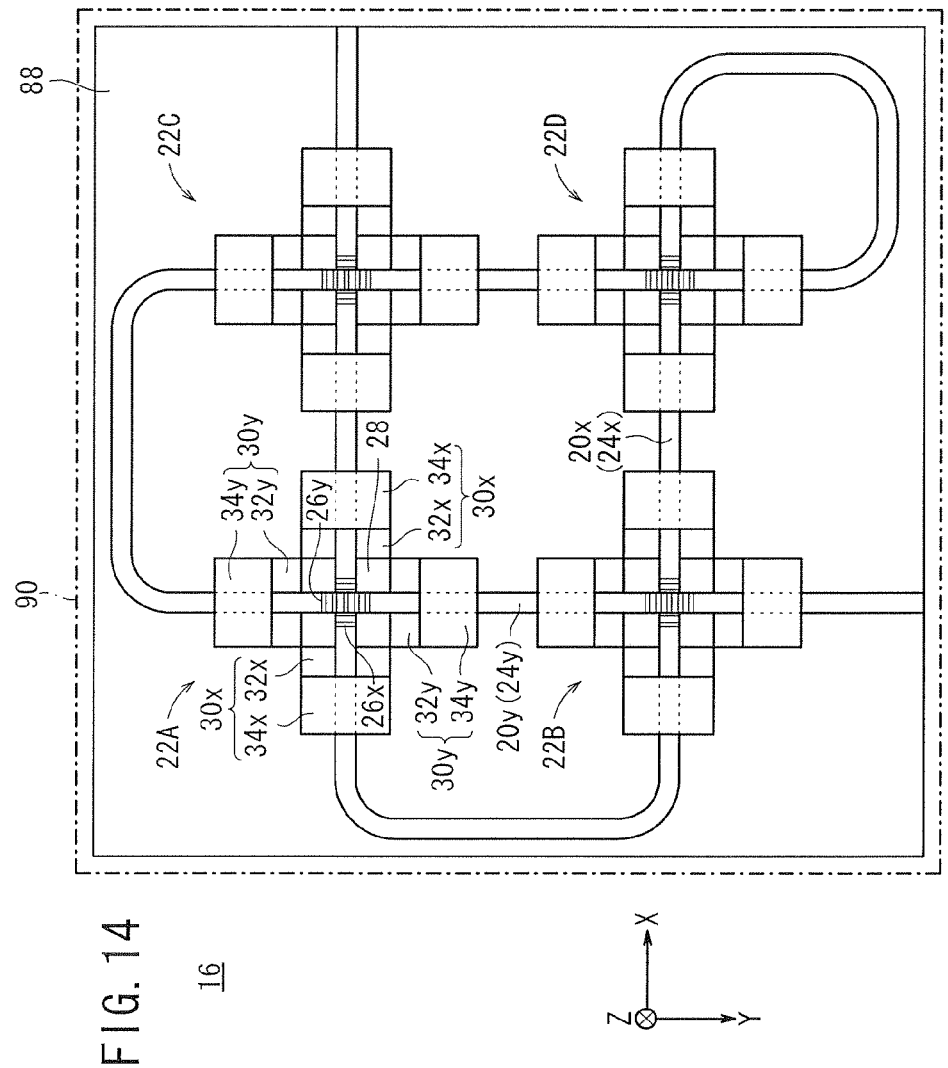
FIG. 14 is a plan view showing a condition in which a body, which is larger than a measurement area of a detection surface, is in contact with the pressure sensor of FIG. 2.
Figure 15:
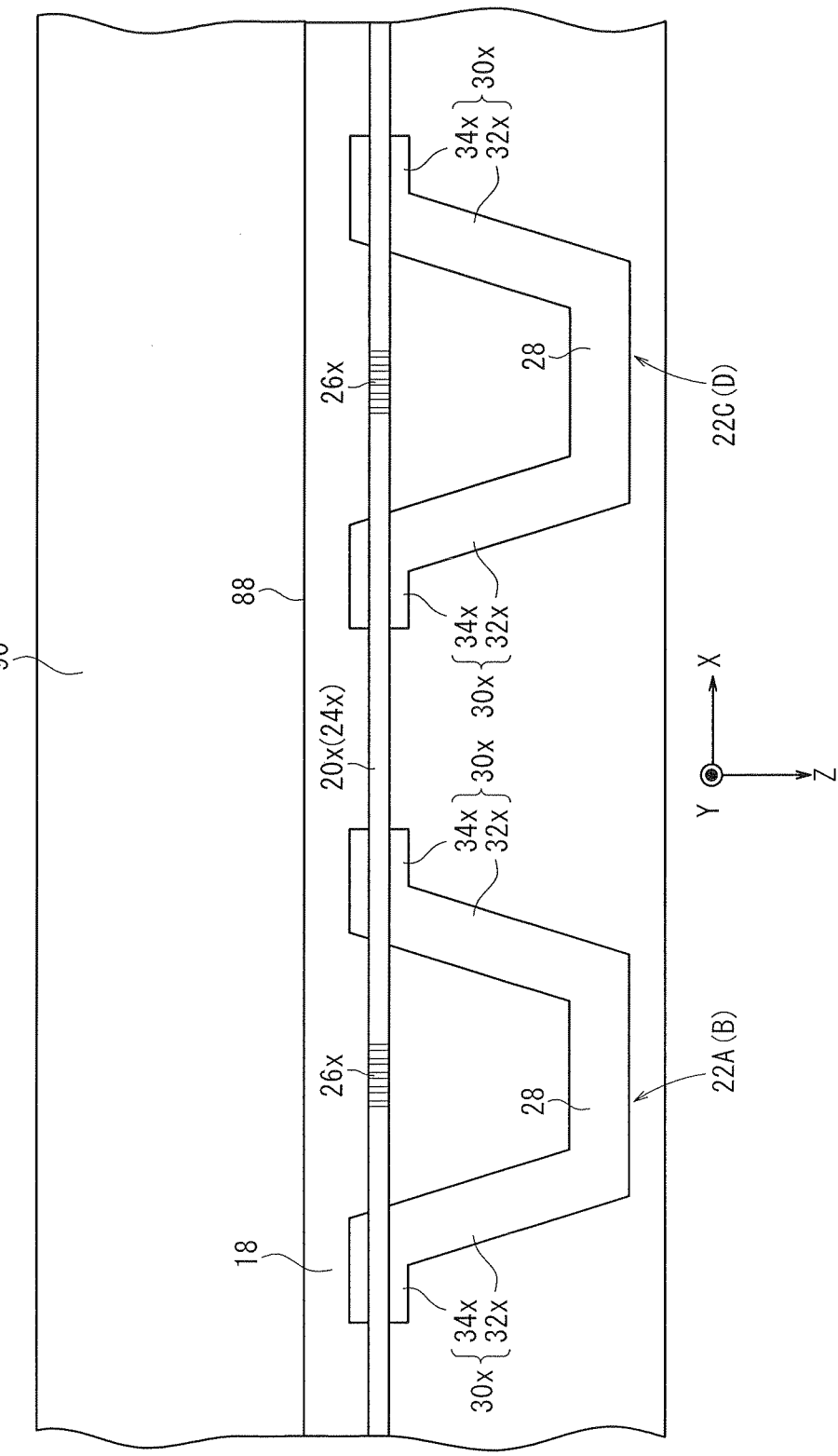
FIG. 15 is an explanatory view of the FBG sensor of FIG. 14 before horizontal stresses are applied thereto.
Figure 16:
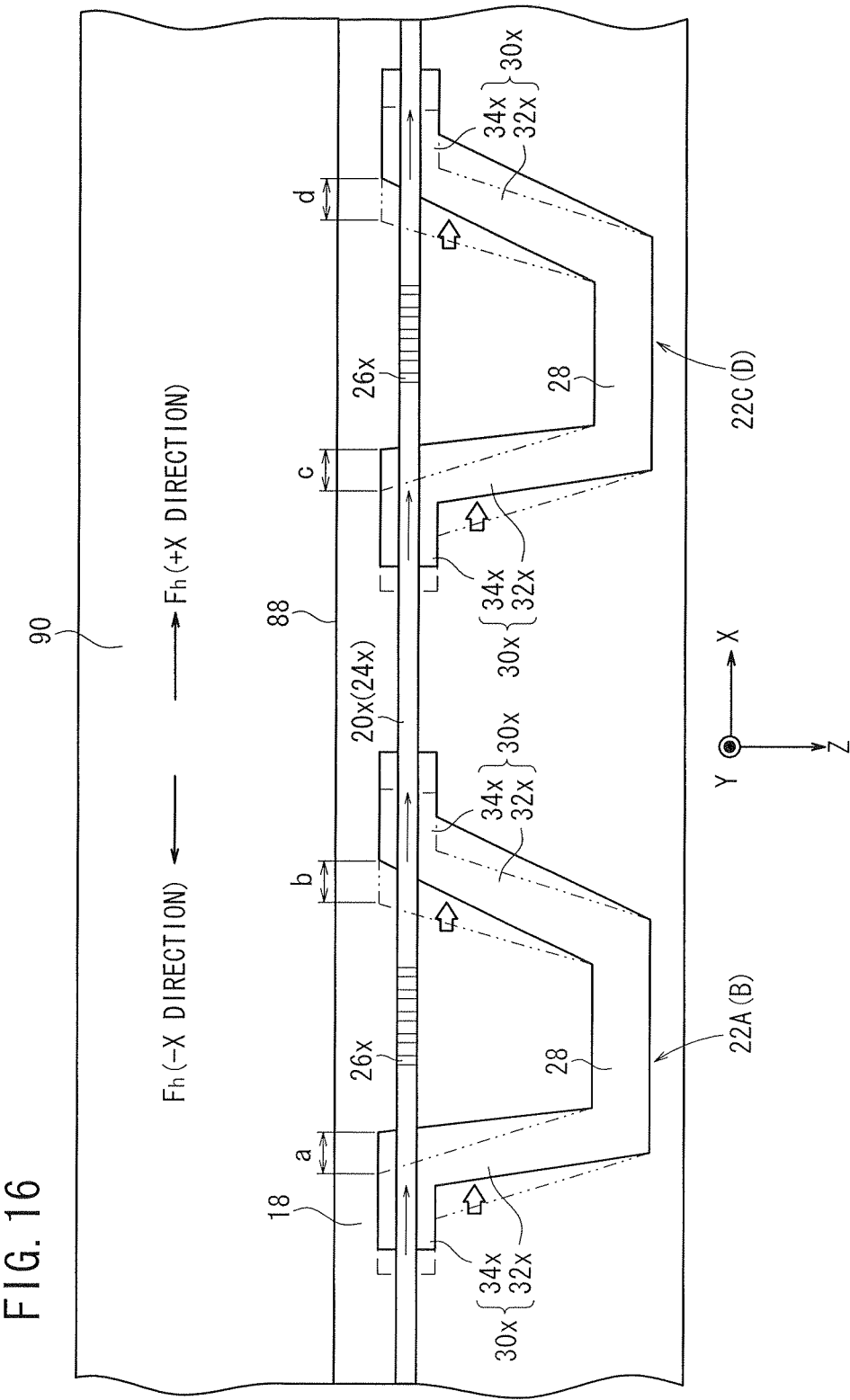
FIG. 16 is an explanatory view showing a state in which horizontal stresses cannot be detected, when the horizontal stresses are applied to a measurement area in the condition shown in FIGS. 14 and 15.

More specifically, as shown in FIGS. 14 through 16, in the case that a body 90 is placed in contact so as to cover the entire measurement area 88, as shown in FIG. 16, when a horizontal stress $F_h$ is applied to the measurement area 88 from the body 90, overall, the pressure sensor 16 exhibits a shape (as shown by the solid line in FIG. 16) deformed in the application direction of the horizontal stress $F_h$, compared to a situation before application of stresses (as shown in FIG. 15 and by the two-dot-dashed lines in FIG. 16).

Each of the stress transmitting sections 30x of the FBG sensors 22A to 22D is moved to the right side of FIG. 15 as a result of the horizontal stress $F_h$. In this case, horizontal stresses $F_h$ are transmitted in the adjoined portions between the joint sections 34x of each of the stress transmitting sections 30x and the optical fiber 20x. As a result thereof, in the gratings 26x of the FBG sensors 22A to 22D, horizontal stresses $F_h$ are applied respectively, and expansion and contraction occurs to the same extent, due to the structural change.

The amount of change in the lattice spacing of each of the gratings 26x due to application of the horizontal stress $F_h$, i.e., the amount of change of each of the joint sections 34x, is represented by the variables a, b, c, d. Further, prior to application of the horizontal stress $F_h$, the lattice spacing of the gratings 26x of the FBG sensor 22A (22B) is taken as $\Delta_0$, and the lattice spacing of the gratings 26x of the FBG sensor 22C (22D) is taken as $\Delta_0'$. Furthermore, the grating number of each of the gratings 26x is represented by N, and the effective refractive index of the core 24x is represented by $n_{eff}$.

In this case, before and after application of the horizontal stress $F_h$, the shift amount $\Delta\lambda$ of the reflected wavelengths in the gratings 26x of the FBG sensor 22A (22B) is represented by the following equation (40), whereas the shift amount $\Delta\lambda$ of the reflected wavelengths in the gratings 26x of the FBG sensor 22C (22D) is represented by the following equation (41).

$$\Delta\lambda = 2 \times n_{eff} \times \{\Delta_0 + (b-a)/N\} \tag{40}$$

$$\Delta\lambda = 2 \times n_{eff} \times \{\Delta_0' + (d-c)/N\} \tag{41}$$

As noted above, because in each of the gratings 26x, the same structural change occurs as a result of the applied horizontal stresses $F_h$, the amounts of change of the lattice spacings (change amount of each of the joint sections 34x) a, b, c, d are mutually the same, as shown by the following equation (42).

$$a = b = c = d \tag{42}$$

Accordingly, when equation (42) is substituted into equations (40) and (41), equation (40) is transformed as shown by the following equation (43), and equation (41) is transformed as shown by the following equation (44).

$$\Delta\lambda = 2 \times n_{eff} \times \{\Delta_0 + (b-a)/N\} = 2 \times n_{eff} \times \Delta_0 \tag{43}$$

$$\Delta\lambda = 2 \times n_{eff} \times \{\Delta_0' + (d-c)/N\} = 2 \times n_{eff} \times \Delta_0' \tag{44}$$

$n_{eff}$, $\Delta_0$, and $\Delta_0'$ are preset values. If each of the lattice spacings $\Delta_0$ and $\Delta_0'$ are set at values that are mutually close to one another, then the differences in shift amounts cannot be made large. Accordingly, with the FBG sensors 22A (22B) and 22C (22D), it is difficult to detect horizontal stresses $F_h$ applied to the overall surface of the measurement area.

Second Embodiment

Consequently, in the pressure sensor 100 according to the second embodiment, even in the case, as discussed above, that the body is brought into contact with the entire measurement area and horizontal stresses are applied to the entire measurement area, such horizontal stresses can be detected. Below, with reference to FIGS. 17 through 22, explanations shall be given concerning the pressure sensor 100.

Figure 17:
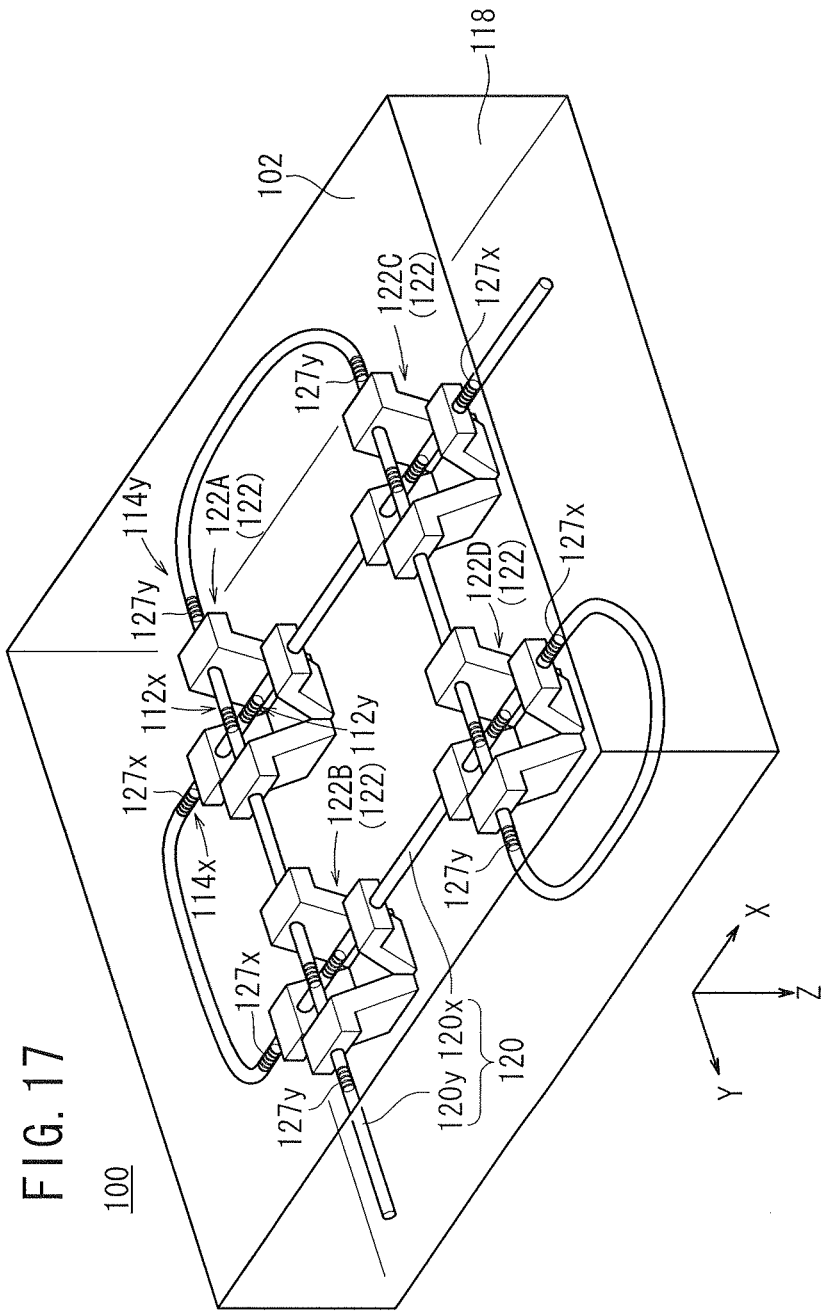
FIG. 17 is a perspective view of a pressure sensor, in which FBG sensors according to a second embodiment are disposed in a sheet.
Figure 18:
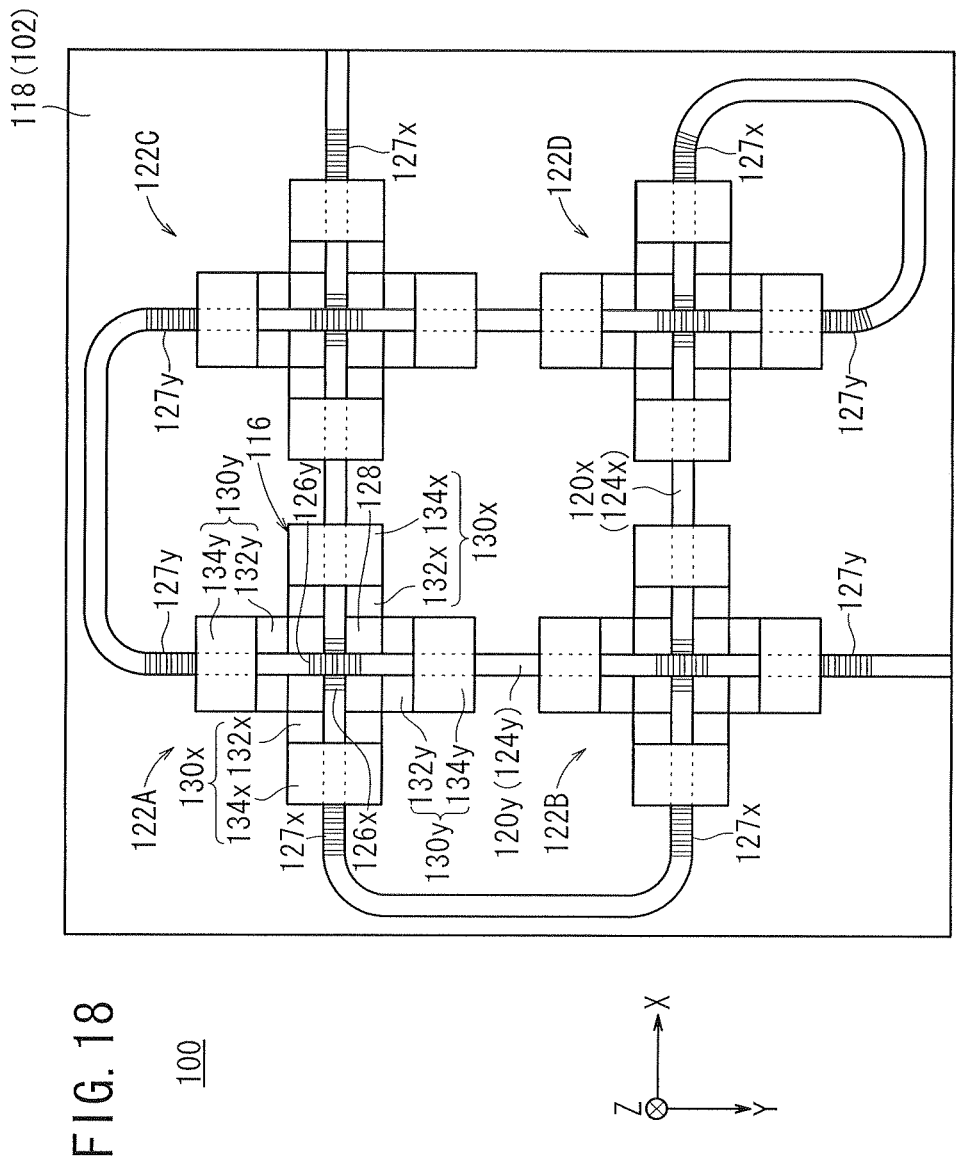
FIG. 18 is a plan view of the pressure sensor shown in FIG. 17.
Figure 19:
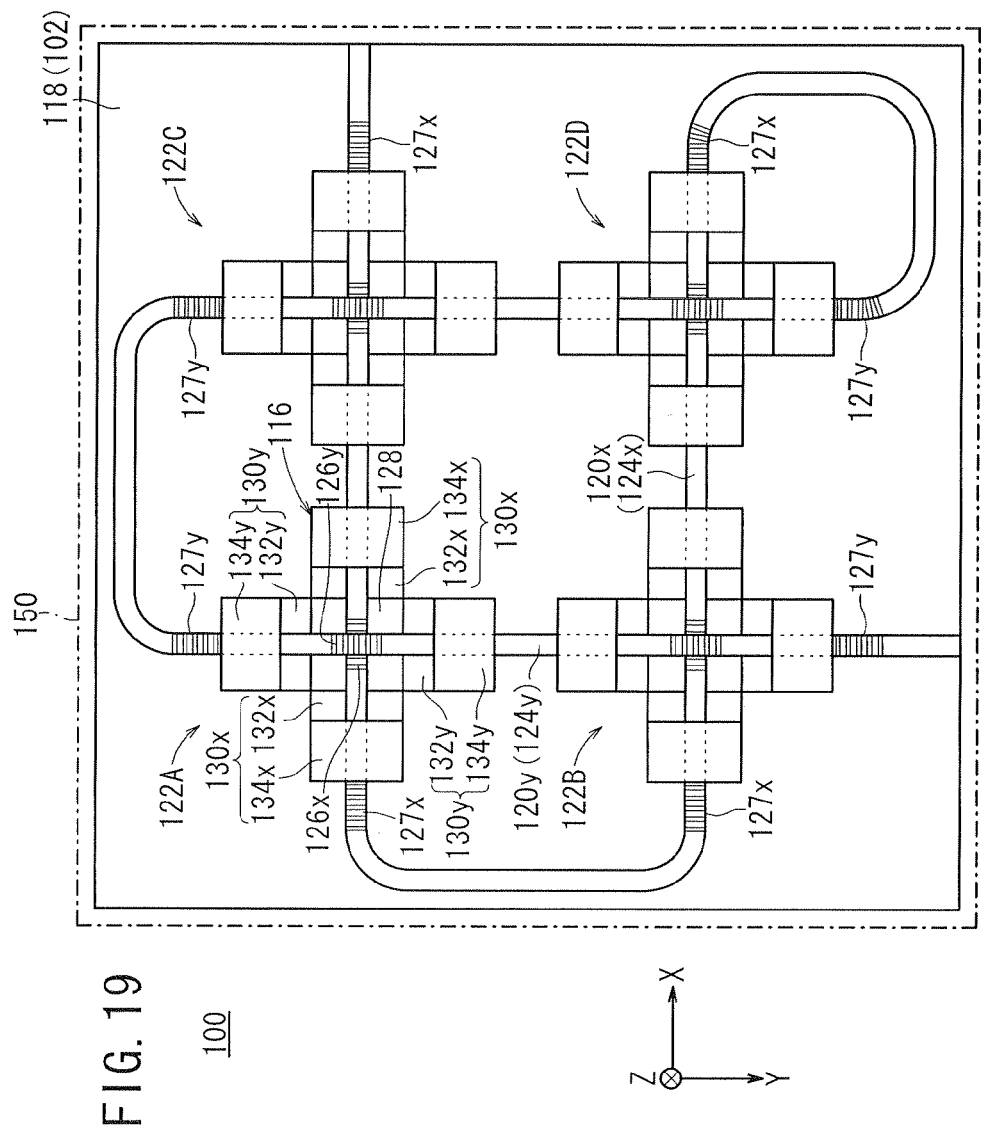
FIG. 19 is a plan view showing a condition in which a body, which is larger than a measurement area, is in contact with the pressure sensor of FIGS. 17 and 18.
Figure 20:
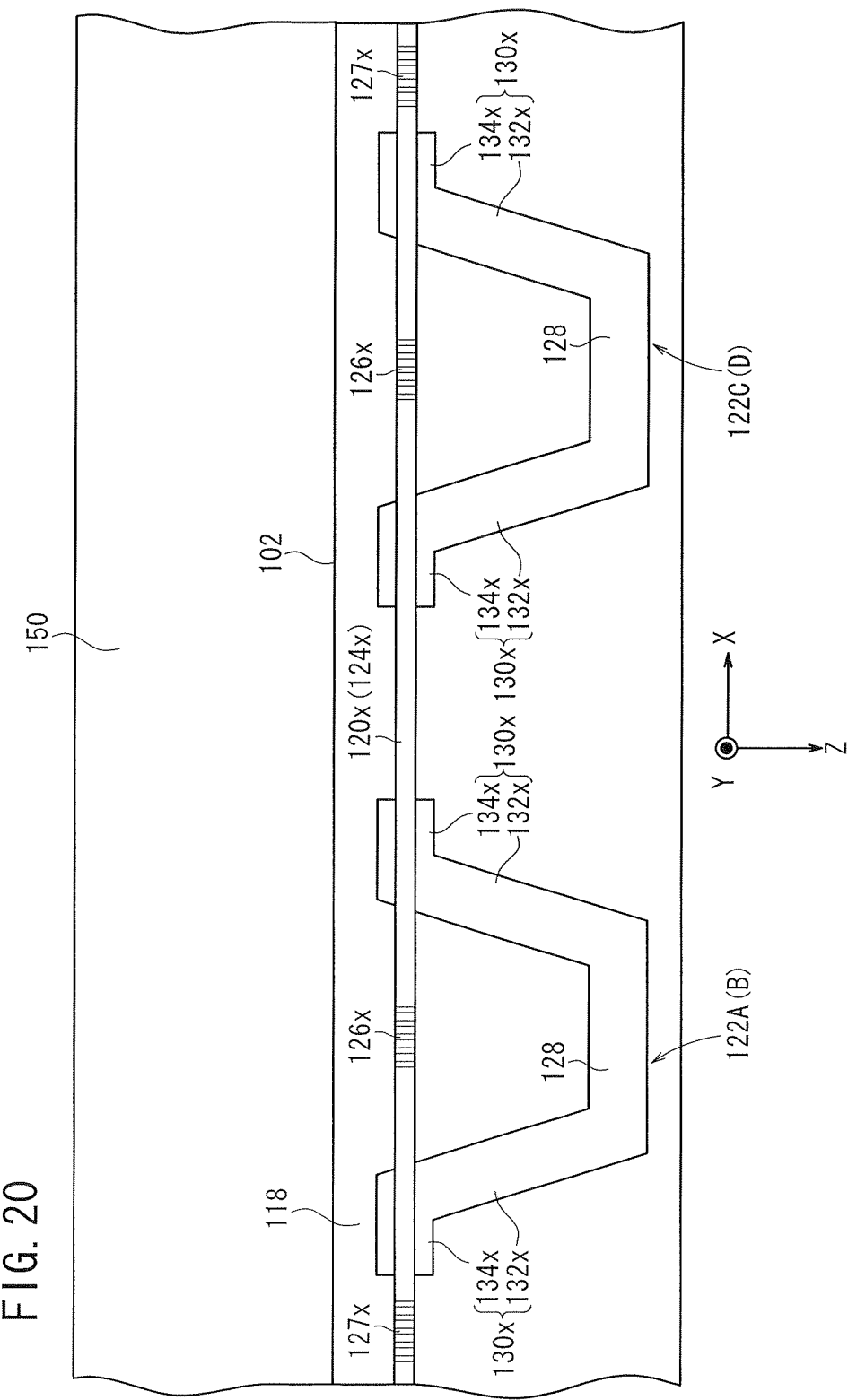
FIG. 20 is an explanatory view of the FBG sensor of FIG. 19 before horizontal stresses are applied thereto.

As shown in FIGS. 17 and 18, the pressure sensor 100 according to the second embodiment is constituted by embedding a single optical fiber cable 120 in a flexible sheet 118 along a surface direction (X-Y plane direction) of the sheet 118, and by disposing (arraying) in a matrix form along the optical fiber cable 120 a plurality of FBG sensors 122, which are made into addresses (i.e., respective addresses are assigned thereto).

More specifically, the optical fiber cable 120 is constituted from an optical fiber (first optical fiber) 120x the longitudinal direction of which is aligned in an X-direction by arranging the optical fiber cable 120 in a serpentine form along the Y-direction, and an optical fiber (second optical fiber) 120y the longitudinal direction of which is aligned in a Y-direction by arranging the optical fiber cable 120 in a serpentine form along the X-direction. In this case, the optical fiber 120x and the optical fiber 120y are arranged in a serpentine fashion at mutually different heights (see FIG. 17), whereas, as viewed in plan, the FBG sensors 122 are disposed at locations where the optical fiber 120x and the optical fiber 120y intersect at right angles (see FIG. 18).

At locations where the optical fiber 120x and the optical fiber 120y intersect at right angles, gratings (first gratings: X-direction) 126x are formed in the core 124x in the X-direction of the optical fiber cable 120, whereas other gratings (first gratings: Y-direction) 126y are formed in the core 124y in the Y-direction of the optical fiber cable 120. Further, in portions of the optical fiber cable 120 that extend externally of later described stress direction converters 116, gratings (second gratings: X-direction) 127x are formed in the core 124x in the X-direction, and other gratings (second gratings: Y-direction) 127y are formed in the core 124y in the Y-direction. In this case, all of the gratings 126, 127 (126x, 126y, 127x, 127y) have mutually different lattice spacings and exhibit mutually different reflected wavelengths.

The FBG sensor 122 has first through fourth stress detection sensors 112x, 114x, 112y, 114y. An optical fiber 120x in which gratings (first gratings) 126x are arrayed so as to serve as the first stress detection sensor 112x, and an optical fiber 120x in which gratings (second gratings) 127x are arrayed so as to serve as the second stress detection sensor 114x are connected mutually together in a straight line. Further, an optical fiber 120y in which gratings (first gratings) 126y are arrayed so as to serve as the third stress detection sensor 112y, and an optical fiber 120y in which gratings (second gratings) 127y are arrayed so as to serve as the fourth stress detection sensor 114y are connected mutually together in a straight line. Further, the FBG sensor 122 comprises a stress direction converter 116 for converting stresses (normal stresses) applied in the Z-direction into stresses (components) of directions along the X-direction and the Y-direction, and for transmitting the converted stresses to the optical fibers 120x, 120y.

In this case, the stress direction converter 116 includes a flat portion 128 and first and second stress transmitting sections 130x, 130y (or 130x, 130y), wherein each of such components can have the same structure as in the first embodiment. When the longitudinal direction of the optical fiber 120x is viewed in the X-direction, the first stress transmitting section 130x is bridged to one end side of the first gratings 126x, and the second stress transmitting section 130x is bridged to other end side of the first gratings 126x. Further, when the longitudinal direction of the optical fiber 120y is viewed in the Y-direction, the first stress transmitting section 130y is bridged to one end side of the first gratings 126y, and the second stress transmitting section 130y is bridged to other end side of the first gratings 126y.

In the interior of the sheet 118, the gratings 127x, 127y are disposed in the vicinity of respective joint sections 134x, 134y that confront the side surface of the sheet 118. As viewed in plan, the gratings 127x disposed externally of the stress direction converter 116 and the gratings 126x surrounded by the stress direction converter 116 are arranged substantially on the same axis, whereas the gratings 127y disposed externally of the stress direction converter 116 and the gratings 126y surrounded by the stress direction converter 116 also are arranged substantially on the same axis.

In the pressure sensor 100 according to the second embodiment, detection principles for detecting normal stresses $F_p$, and detection principles for detecting horizontal stresses $F_h$ that are applied from a body, which, as viewed in plan, is smaller than the measurement area 102, are the same as in the case of the pressure sensor 16 according to the first embodiment.

Accordingly, explanations shall now be given with reference to FIGS. 19 to 22 concerning detection of horizontal stresses $F_h$ that are applied to the measurement area 102 from a body 150, which, as viewed in plan, is larger than the measurement area 102.

Figure 21:
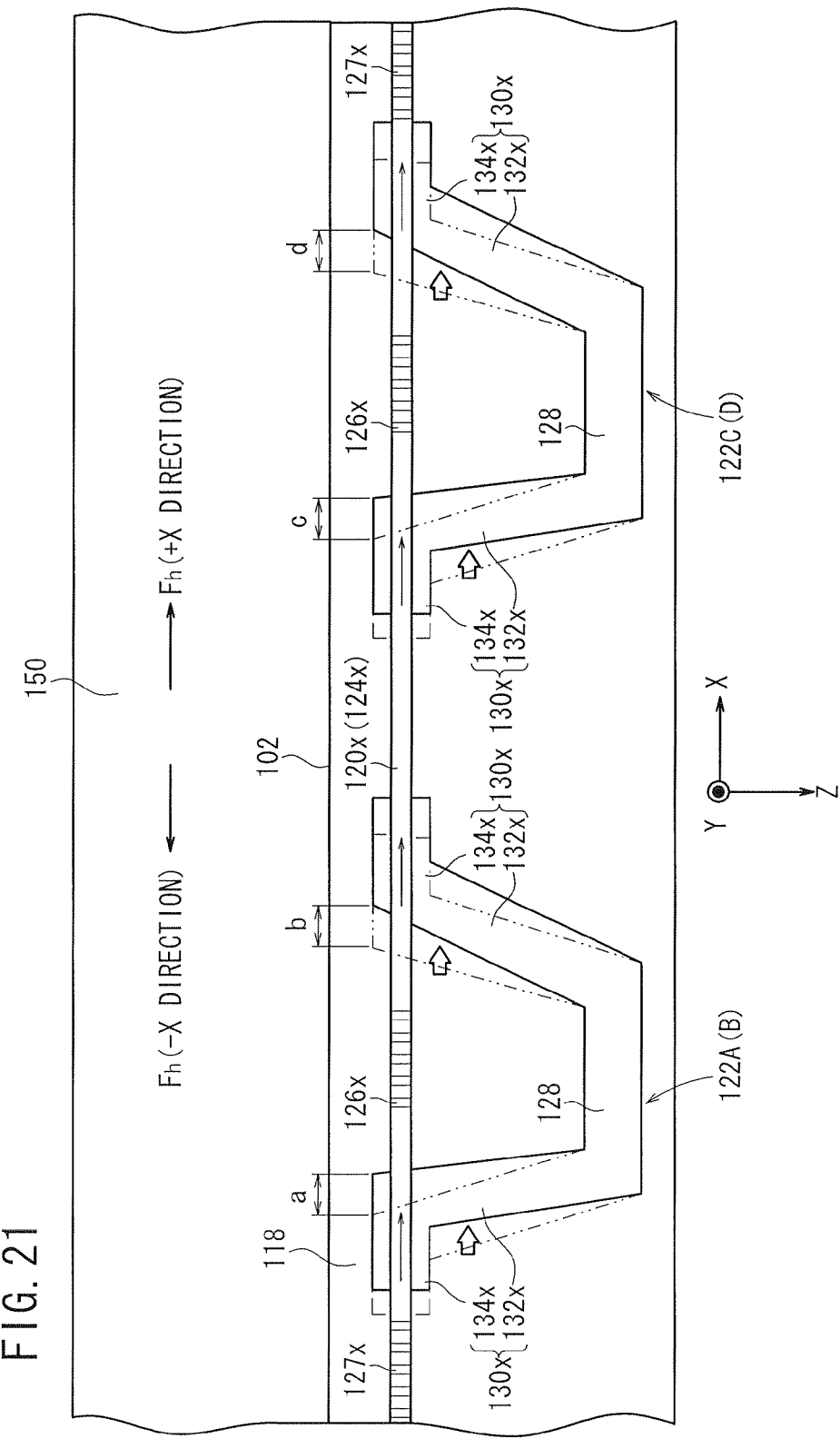
FIG. 21 is a view for explaining principles of detecting horizontal stresses by the FBG sensor of FIG. 20.

When horizontal stresses $F_h$ are applied from a body 150 in the X-direction to the measurement area 102, as already described as a problem to be solved by the second embodiment (see FIGS. 14 to 16), the pressure sensor 100 overall assumes a deformed shape in the direction of application (positive X-direction) of the horizontal stresses $F_h$ (i.e., deformation from the condition shown by the two-dot-dashed line in FIG. 21 to the condition shown by the solid line in FIG. 21).

More specifically, each of the stress transmitting sections 130x is moved to the right side of FIG. 21 by the horizontal stresses $F_h$. In this case, because horizontal stresses $F_h$ are transmitted respectively to the adjoined portions between the joint sections 134x of each of the stress transmitting sections 130x and the optical fiber 20x, the horizontal stresses $F_h$ are applied respectively, and in the gratings 126x of the FBG sensors 122A to 122D, expansions/contractions occur to the same extent, due to the structural change.

With respect thereto, by movement of the adjoined portion between the joint section 134x on the left side of the FBG sensors 122A, 122B and the optical fiber 120x to the right side, the horizontal stress $F_h$ is applied as a pulling force to the gratings 127x that are disposed on the left side of the FBG sensors 122A, 122B. As a result, in the gratings 127x, due to application of horizontal stresses $F_h$, strains develop so as to cause expansion of the lattice spacing.

Thus, if the lattice spacing of the gratings 127x prior to application of the horizontal stress $F_h$ is taken as $\Delta_0''$, the shift amount $\Delta\lambda$ of reflected wavelengths at the gratings 127x before and after application of the horizontal stress $F_h$ is represented by the following equation (45).

$$\Delta\lambda = 2 \times n_{\mathit{eff}} \times (\Delta_0'' + a) \tag{45}$$

In this manner, since the amount of change "a" of the lattice spacing in the gratings 127x is included in equation (45), by determining the difference between the shift amount $\Delta\lambda$ of the reflected wavelengths of the gratings 127x and the shift amount $\Delta\lambda$ of the reflected wavelengths of the gratings 126x as indicated by equation (43) or equation (44), compared to the pressure sensor 16 according to the first embodiment, the difference in the shift amount $\Delta\lambda$ is made sufficiently large, of a degree capable of detecting horizontal stresses $F_h$, and as a result, based on this difference, horizontal stresses $F_h$ can easily be detected.

In the foregoing explanations, as shown in FIG. 21, a case has been explained in which horizontal stresses $F_h$ are detected using a shift amount $\Delta\lambda$ of reflected wavelengths of the left side gratings 127x, when the horizontal stresses $F_h$ are applied to the measurement area 102 along the positive X-direction.

In contrast thereto, in the case that horizontal stresses $F_h$ are applied in the negative X-direction (i.e., in a direction from the right side to the left side of FIG. 21), horizontal stresses $F_h$ may also be detected using a shift amount $\Delta\lambda$ of reflected wavelengths of the right side gratings 127x. In this case, the change amount "a" of the lattice spacing in equation (45) may be replaced by "d".

Figure 22:
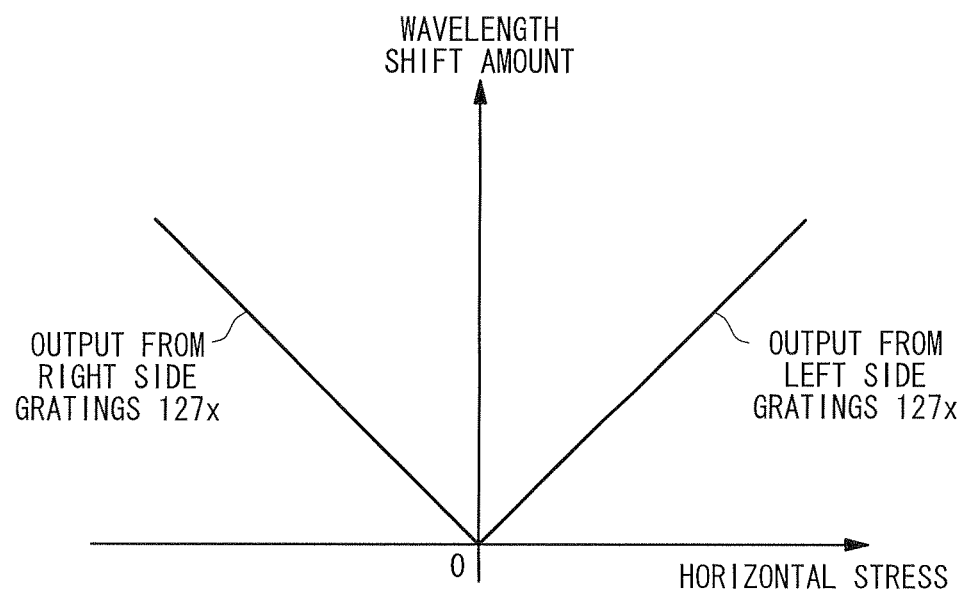
FIG. 22 is a graph showing outputs from gratings that are disposed externally of a stress direction converter shown in FIGS. 17 to 21.

FIG. 22 is a graph showing the relationship between horizontal stresses $F_h$ and the shift amount $\Delta\lambda$ of reflected wavelengths in each of the left and right side gratings 127x of FIG. 21. As easily understood from the figure, when horizontal stresses $F_h$ (positive direction horizontal stresses) are applied along the positive X-direction, the shift amount $\Delta\lambda$ of reflected wavelengths of the left side gratings 127x increases, while on the other hand, when horizontal stresses $F_h$ (negative direction horizontal stresses) are applied along the negative X-direction, the shift amount Δλ of reflected wavelengths of the right side gratings 127x increases.

Further, in the case that normal stresses $F_p$ are applied to the measurement area 102, at the stress direction converter 116, due to different structural changes that occur in the right and left stress transmitting sections 30x with respect to the flat portion 28, the lattice spacing of the gratings 126x changes. However, the influence of this structural change is not felt at each of the gratings 127x, which are arranged externally of the stress direction converter 116. Accordingly, in the pressure sensor 100, even if normal stresses $F_p$ are applied to the measurement area 102, the lattice spacings in each of the gratings 127x are not changed (i.e., they are non-responsive).

Further, in the foregoing explanation, a case has been explained in which horizontal stresses $F_h$ are detected using the gratings 127x positioned along the X-direction. However, in the case that horizontal stresses $F_h$ are applied along the Y-direction as well, similar to the gratings 127x, shift amounts Δλ of reflected wavelengths as shown by equation (45) are generated in each of the gratings 127y, and it is a matter of course that such horizontal stresses $F_h$ can also easily be detected.

Furthermore, even in the case that horizontal stresses $F_h$ of any arbitrary direction are applied along the measurement area 102, using the aforementioned gratings 127x, 127y, by detecting respective X-direction and Y-direction components, the horizontal stresses $F_h$ can be segregated by each of such components and detected.

Figure 23:
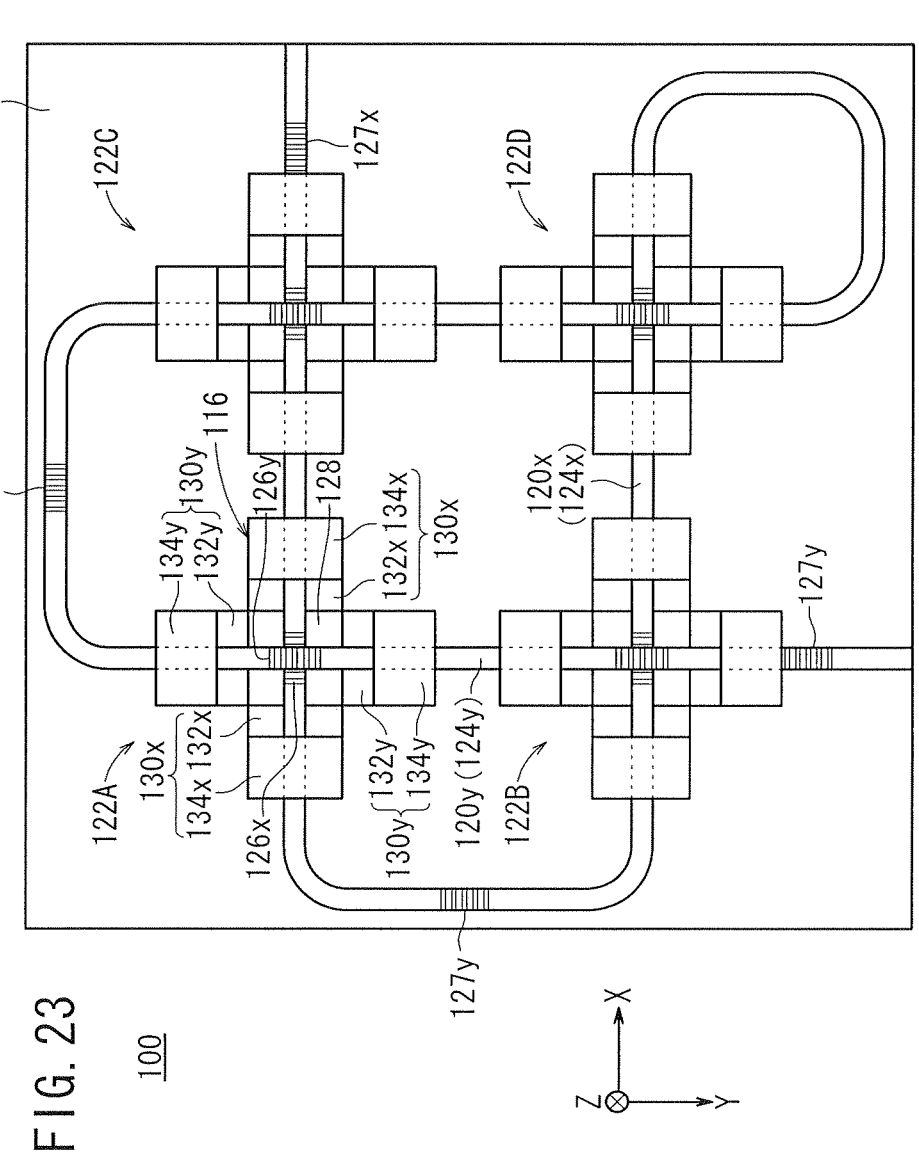
FIG. 23 is a plan view showing a modified example of the pressure sensor of FIGS. 17 to 22.
Figure 24:
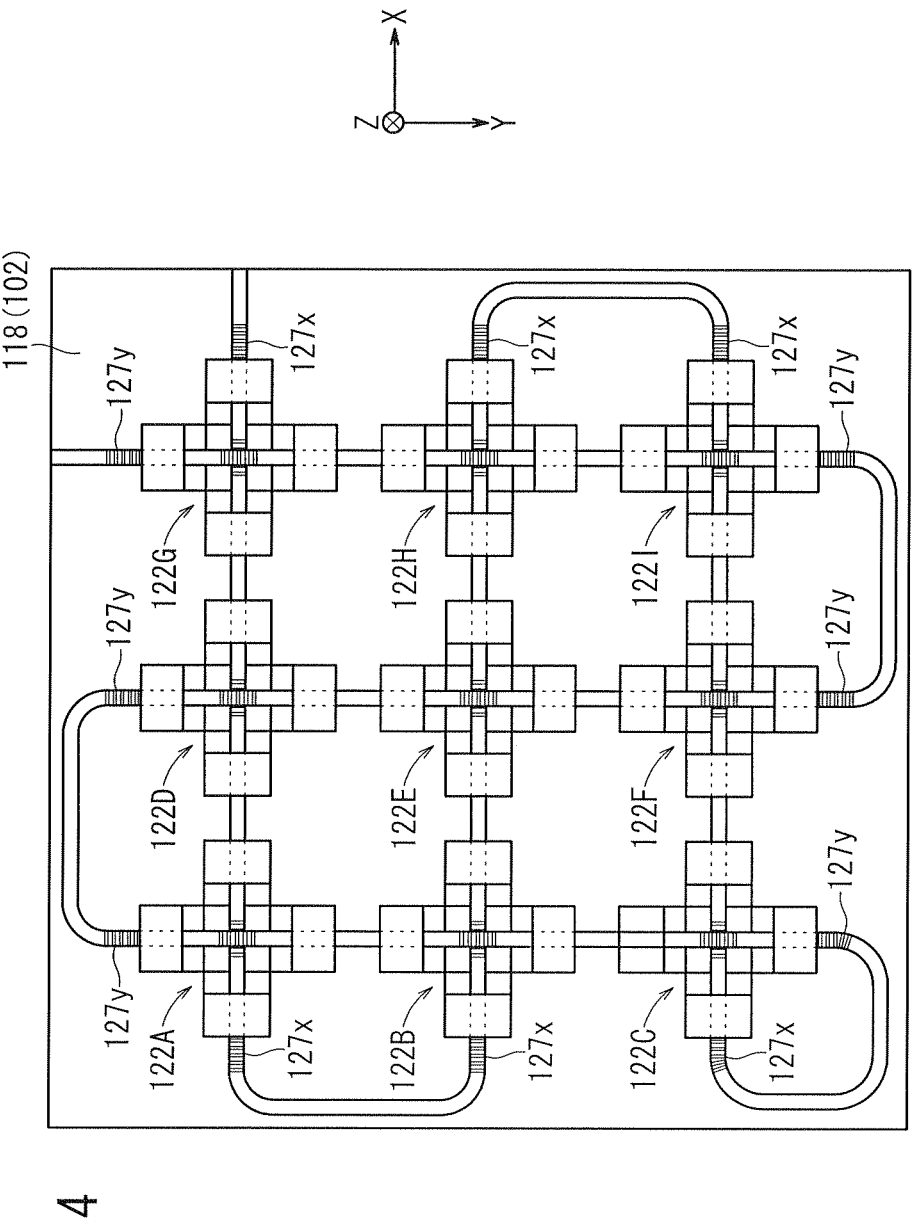
FIG. 24 is a plan view showing a modified example of the pressure sensor of FIGS. 17 to 22.
Figure 25:
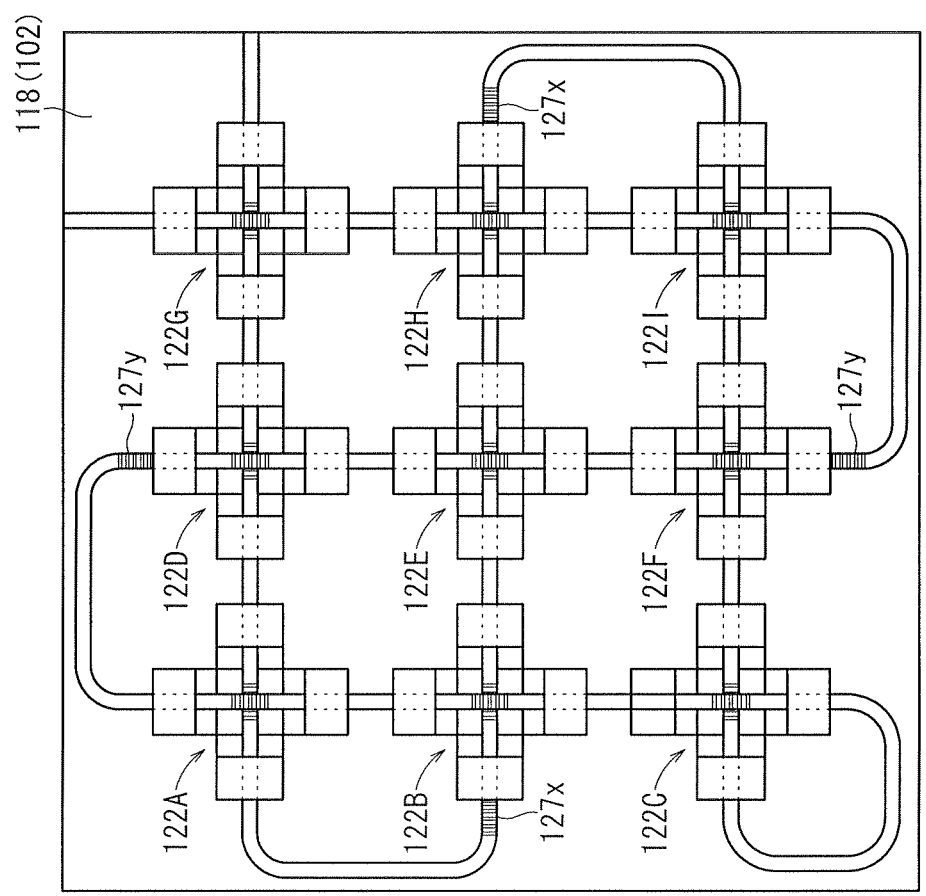
FIG. 25 is a plan view showing a modified example of the pressure sensor of FIGS. 17 to 22.

Further, the second embodiment is not limited to the structure shown in FIGS. 17 to 22, but the structure of FIGS. 23 to 25 can also be adopted.

In FIG. 23, four respective gratings 127x, 127y are arranged inside the sheet 118. More specifically, two gratings 127x, 127y are disposed respectively between the side surface of the sheet 118 and the joint sections 134x, 134y. Further, with respect to the remaining two gratings 127x, 127y, one of such gratings 127x is disposed along the X-direction at a location proximate the side surface of the sheet 118 within a curved portion of the optical fiber cable 120 between the two joint sections 134y, and the other one of such gratings 127y is disposed along the Y-direction at a location proximate the side surface of the sheet 118 within a curved portion of the optical fiber cable 120 between the two joint sections 134x.

Owing thereto, in the case that horizontal stresses $F_h$ are applied along the X-direction, values of the horizontal stresses $F_h$ are detected using the shift amount Δλ of reflected wavelengths of at least one of the gratings 127x among the two gratings 127x, whereas, in the case that horizontal stresses $F_h$ are applied along the Y-direction, values of the horizontal stresses $F_h$ are detected using the shift amount Δλ of reflected wavelengths of at least one of the gratings 127y among the two gratings 127y. Accordingly, using a smaller number of gratings 127x, 127y, values of horizontal stresses $F_h$ can be detected with good efficiency.

Further, in FIG. 24, nine individual FBG sensors 122A to 122I are disposed in a matrix form in the interior of the sheet 118, and gratings 127x, 127y are disposed between each of the side surfaces of the sheet 18 and all of the joint sections 34x, 34y that confront each of the side surfaces of the sheet 118. Owing thereto, the distribution of horizontal stresses $F_h$ applied to the measurement area 102 can be detected with good accuracy.

Furthermore, in FIG. 25, nine individual FBG sensors 122A to 122I are disposed in a matrix form in the interior of the sheet 118, with two gratings 127x being disposed coaxially, and with two gratings 127y being disposed coaxially. In this case as well, values of the horizontal stresses $F_h$ can be detected efficiently using a smaller number of gratings 127x, 127y.

As described above, in the pressure sensors 100, and the FBG sensors 122A to 122I of the pressure sensors 100 according to the second embodiment, gratings (first gratings) 126x and gratings 126y of first and third stress detection sensors 112x, 112y are provided such that the gratings 126x, 126y are surrounded by the stress direction converter 116, together with gratings (first gratings) 127x and gratings 127y of second and fourth stress detection sensors 114x, 114y disposed externally of the stress direction converters 116. Owing thereto, in the case that horizontal stresses $F_h$ are applied as external stresses from the body 150 to the measurement area 102, the gratings 126x, 126y expand and contract responsive to horizontal stresses $F_h$ at the stress direction converter 116, whereas the gratings 127x, 127y, because they are disposed externally of the stress direction converter 116, expand and contract differently from the gratings 126x, 126y.

In accordance therewith, between the gratings 126x, 126y and the gratings 127x, 127y, since the amounts of strains and the shift amounts Δλ of reflected wavelengths of the gratings 126x, 126y, 127x, 127y are mutually different from each other, differences in the amount of strain and differences in the shift amount Δλ become clear enough to detect horizontal stresses $F_h$. As a result, even if horizontal stresses $F_h$ are applied over the entire measurement area 102, the position, size and direction of such horizontal stresses $F_h$ can be detected.

In this manner, according to the second embodiment, in the measurement area 102, by disposing the first (third) stress detection sensors 112x (112y) so as to be surrounded by the stress direction converter 116, and by disposing the second (fourth) stress detection sensors 114x (114y) externally of the stress direction converter 116, even in the case that the body 150 contacts the entire measurement area 102 that forms a contact surface with the body 150, and horizontal stresses $F_h$ are applied thereto, the horizontal stresses $F_h$ are capable of being detected.

Further, since the optical fibers 120x, 120y are arranged along the measurement area 102 so as to penetrate through the stress direction converters 116, when horizontal stresses $F_h$ are applied to the measurement area 102, since the gratings 127x, 127y expand and contract simultaneously with expansion and contraction of the gratings 126x, 126y caused by the horizontal stresses $F_h$, detection of horizontal stresses $F_h$ can be performed with better efficiency.

Furthermore, if the gratings 127x, 127y are arranged in the vicinity of the joint sections 134x, 134y of the stress transmitting sections 130x, 130y at the optical fiber cable 120, since the arrayed directions of the gratings 126x, 126y and the arrayed directions of the gratings 127x, 127y can substantially coincide with each other, when horizontal stresses $F_h$ are applied to the measurement area 102, the gratings 126x, 126y and the gratings 127x, 127y are capable of being subjected to strains substantially on the same axis. Accordingly, the amount of horizontal stress $F_h$ can easily be calculated from the strain amounts and the reflected wavelength shift amounts Δλ in each of the gratings 126x, 126y, 127x, 127y.

Further, in the stress direction converter 116, since the optical fibers 120x, 120y are perpendicular to each other as viewed in plan, and the gratings 126x, 126y are arranged at a location where the optical fibers intersect at right angles, whereas the gratings 127x, 127y are arranged respectively externally of the stress direction converter 116 in the optical fibers 120*x*, 120*y*, it becomes possible for the horizontal stresses $F_h$ to be segregated into X-direction and Y-direction components and detected.

As noted above, according to the second embodiment, in the pressure sensor 100 and FBG sensor 122, or in an end effector and robot system (sensor signal processing apparatus) to which the pressure sensor 100 is applied, a comparatively simple structure is enabled, while additionally, the detection accuracy of stresses applied from a body can easily be improved.

Third Embodiment

Next, a pressure sensor 200 according to a third embodiment, and an FBG sensor 222 incorporated into such a pressure sensor 200, shall be explained with reference to FIGS. 26 through 31.

Figure 26:
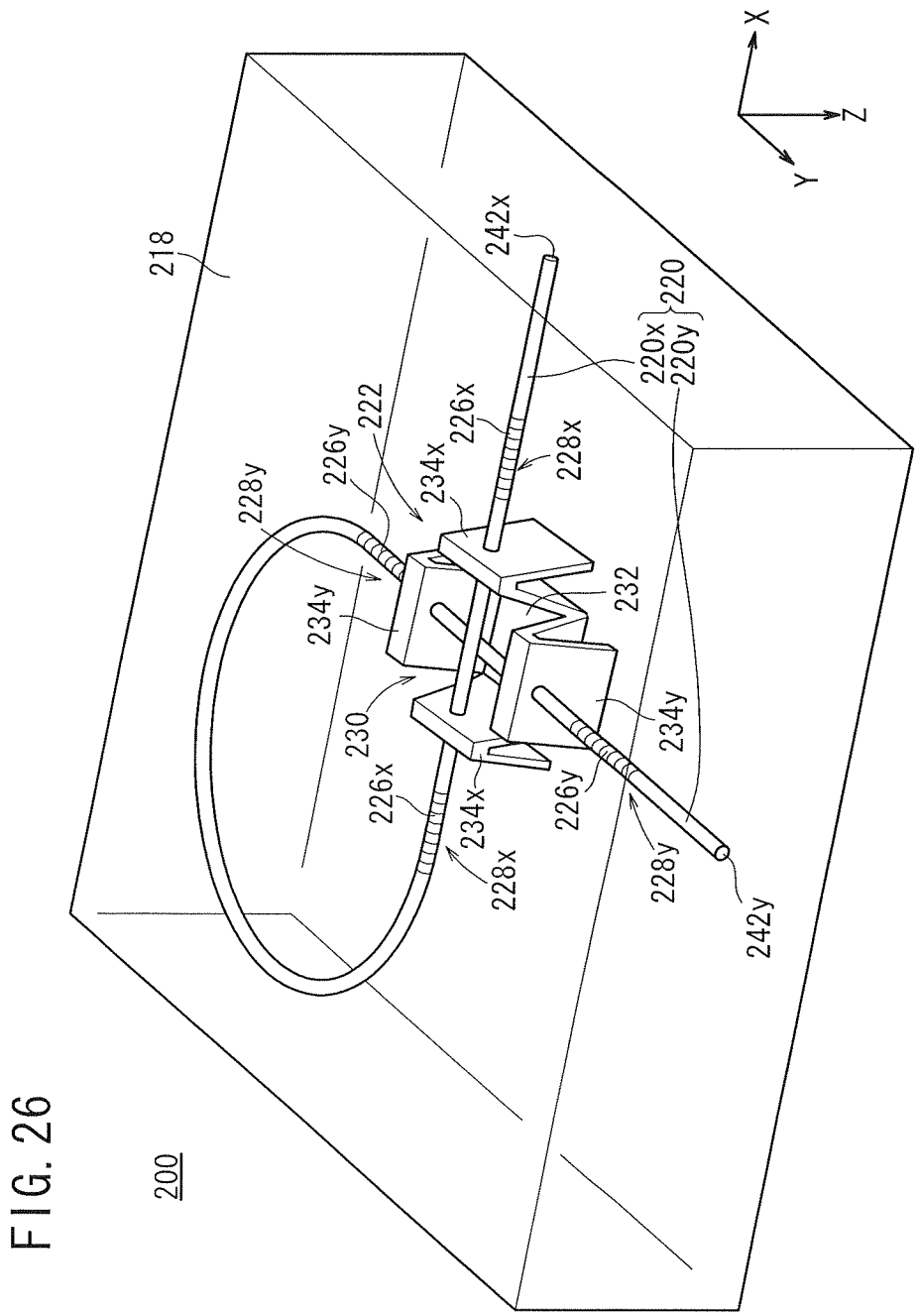
FIG. 26 is a perspective view of a pressure sensor, in which an FBG sensor according to a third embodiment is disposed in a sheet.

As shown in FIG. 26, the pressure sensor (distribution type pressure sensor) 200 is constituted by embedding a single optical fiber cable 220 along a surface direction (X-Y direction) of a flexible sheet 218, and disposing an FBG sensor 222 along the optical fiber cable 220.

More specifically, the optical fiber cable 220 is constituted from an optical fiber (first optical fiber 220*x*) the longitudinal direction of which is arranged in the X-direction, and an optical fiber (second optical fiber 220*y*) the longitudinal direction of which is arranged in the Y-direction. In this case, although the optical fiber 220*x* and the optical fiber 220*y* are disposed at mutually different heights (see FIGS. 26 and 28), as viewed in plan, the optical fiber 220*x* and the optical fiber 220*y* intersect at right angles (see FIG. 27), with the FBG sensor 222 being disposed at the location of intersection. In addition, in the sheet 218, the optical fiber cable 220 and the FBG sensor 222 are formed therein by molding, using a material such as plastic or the like having a certain flexibility.

Further, the FBG sensor 222 is fixed in the interior of the sheet 218, and the sheet 218 is formed to protect the FBG sensor 222 from excessive stresses or heat, etc., applied from the exterior. Further, although in FIG. 26 a case is shown in which a single FBG sensor 22 is provided, the number of FBG sensors 222 embedded in the sheet 218 is not limited to one, but may be increased as needed. Furthermore, although in FIGS. 26 to 28 a case is shown in which the optical fiber 220*y* is disposed beneath the optical fiber 220*x*, it is a matter of course that the optical fiber 220*y* could be disposed above the optical fiber 220*x*. Also, as shown in FIG. 26, in the sheet 218, on one side surface perpendicular to the X-direction, an input/output terminal 242*x* of the optical fiber 220*x* capable of receiving and outputting light is exposed to the exterior, and in another side surface perpendicular to the Y-direction, an input/output terminal 242*y* of the optical fiber 220*y* capable of receiving and outputting light is exposed to the exterior.

Figure 27:
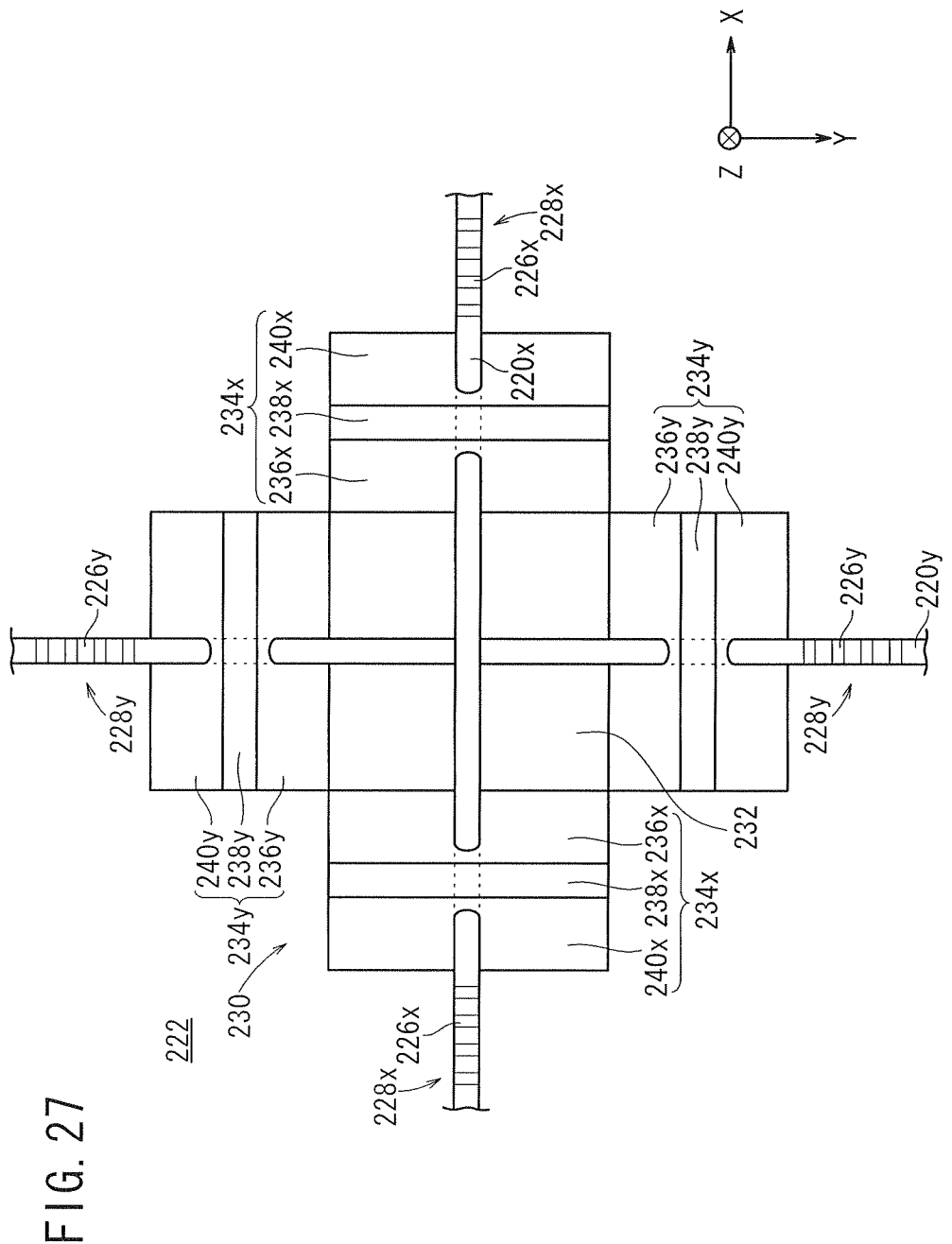
FIG. 27 is a plan view showing the FBG sensor of FIG. 26.

Next, the FBG sensor 222 according to the third embodiment shall be explained in detail below with reference to FIGS. 26 through 28.

At a location where the optical fiber 220*x* and the optical fiber 220*y* intersect at right angles, a stress direction converter 230 is disposed. Further, in a core 224*x* of the optical fiber 220*x*, two gratings (first and second gratings) 226*x*, 226*x* are formed respectively, sandwiching the stress direction converter 230 therebetween, whereas in a core 224*y* of the optical fiber 220*y*, two gratings (third and fourth gratings) 226*y*, 226*y* are formed respectively, sandwiching the stress direction converter 230 therebetween. As a result thereof, surrounding the stress direction converter 230, two stress detection sensors (first and second stress detection sensors) 228*x*, 228*x* including gratings 226*x*, 226*x* are disposed respectively along the X-direction, and together therewith, two stress detection sensors (third and fourth stress detection sensors) 228*y*, 228*y* including gratings 226*y*, 226*y* are disposed respectively along the Y-direction. All of the gratings 226 (226*x*, 226*y*) have lattice spacings and produce reflected wavelengths, which differ mutually from each other.

In this manner, the FBG sensor 222 is equipped with four stress detection sensors 228*x*, 228*x*, 228*y*, 228*y* and one stress direction converter 230.

The stress direction converter 230, which acts as a reception sensitive element with respect to external stresses, is made from an elastic material such as rubber, resin or the like. In this case, the stress direction converter 230 includes a rectangular flat portion 232 that extends in parallel along the X-Y direction, two stress transmitting sections 234*x*, 234*x* that are bridged respectively from two confronting sides of the flat portion 232 respectively to each end on respectively sides of the stress direction converter 230 at the two gratings 226*x*, 226*x*, and two stress transmitting sections 234*y*, 234*y* that are bridged respectively from two other confronting sides of the flat portion 232 respectively to each end on respective sides of the stress direction converter 230 at the two gratings 226*y*, 226*y*.

In this manner, in the stress direction converter 230, two stress transmitting sections 234*x*, 234*x* extend along the X-direction from two sides of the flat portion 232, and two stress transmitting sections 234*y*, 234*y* extend along the Y-direction from two other sides of the flat portion 232. Therefore, the stress direction converter 230 is constructed with rotational symmetry about the center of the flat portion 232 (see FIG. 27). Further, as shown in FIGS. 26 and 28, the flat portion 232 is disposed at a portion lower than the optical fibers 220*x*, 220*y* in the interior of the sheet 218.

The two stress transmitting sections 234*x*, 234*x*, which are formed in mutually confronting relation to each other, each include respectively an inclined section 236*x* that connects to the flat portion 232 and is inclined toward the optical fiber 220*x*, a joint section 238*x* that connects to the inclined section 236*x* and surrounds a portion of an outer circumferential surface of the optical fiber 220*x* to support and/or fix the optical fiber 220*x*, and another inclined section 240*x*, which is connected to the joint section 238*x* and is inclined so as to separate away from the optical fiber 220*x*.

Further, two stress transmitting sections 234*y*, 234*y*, which are formed in mutually confronting relation to each other, are equipped with the same structure as the two stress transmitting sections 234*x*, 234*x* each including respectively an inclined section 236*y* that connects to the flat portion 232 and is inclined toward the optical fiber 220*y*, a joint section 238*y* that connects to the inclined section 236*y* and surrounds a portion of an outer circumferential surface of the optical fiber 220*y* to support and/or fix the optical fiber 220*y*, and another inclined section 240*y*, which is connected to the joint section 238*y* and is inclined so as to separate away from the optical fiber 220*y*.

More specifically, in the interior of the sheet 218, the optical fiber 220*x* penetrates through the respective joint sections 238*x*, 238*x* so as to bridge the two gratings 226*x*, 226*x*, and the optical fiber 220*y* penetrates through the respective joint sections 238*y*, 238*y* so as to bridge the two gratings 226*y*, 226*y* at a position lower than the optical fiber 220*x*. Accordingly, the joint sections 238*x* support and/or fix the portion of the optical fiber 220*x* at a position higher than the joint sections 238*y*, whereas the joint sections 238*y* support and/or fix the portion of the optical fiber 220*y* at a position lower than the optical fiber 220*x*.

Figure 28:
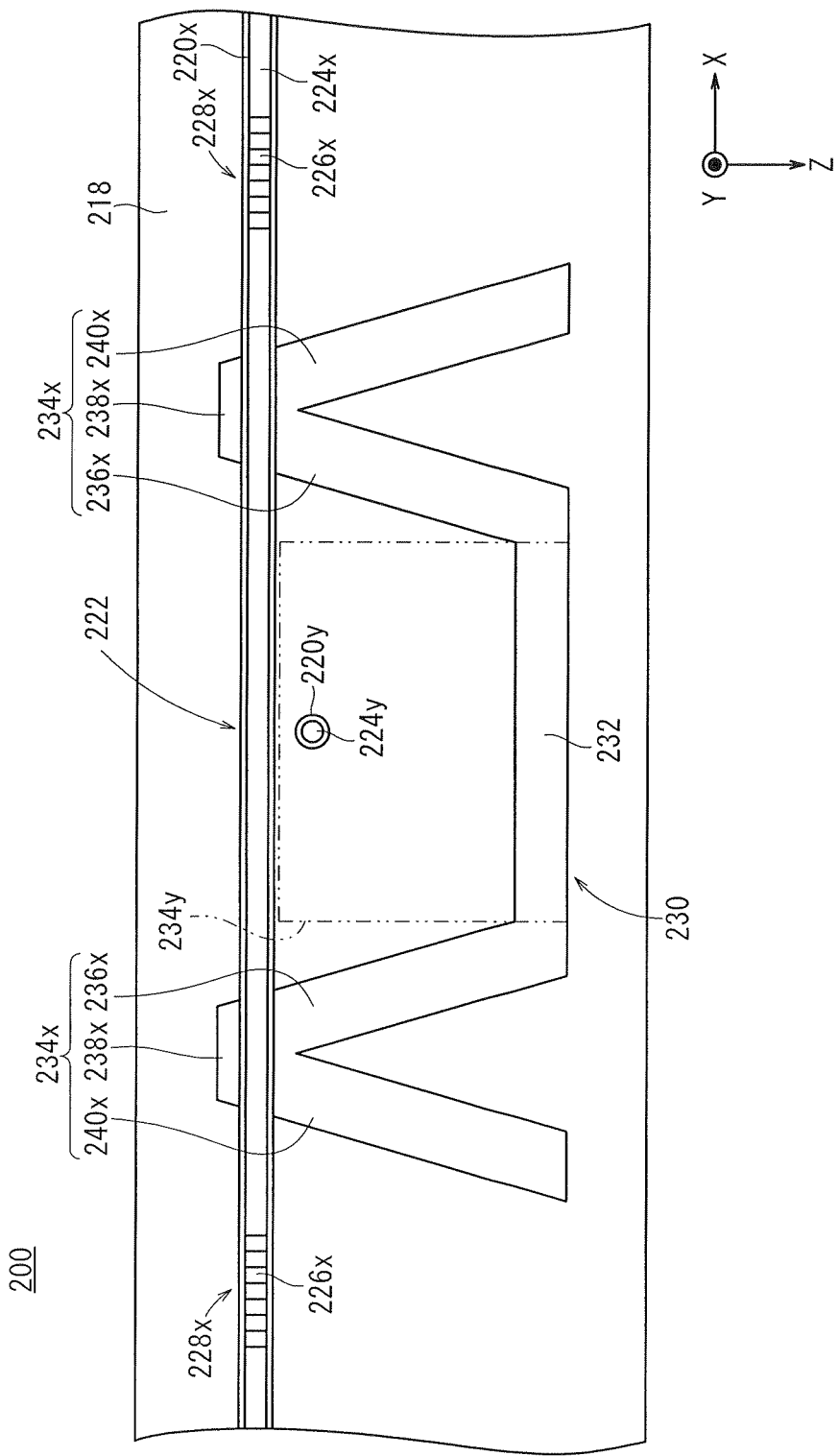
FIG. 28 is an outline explanatory view showing the FBG sensor of FIG. 26.

In this case, as shown in FIGS. 26 and 28, prior to application of stresses, the angle defined by the inclined sections 236x, 236x and each of the joint sections 238x, 238x, or the angle defined by each of the joint sections 238x, 238x and each of the inclined sections 240x, 240x, are set mutually equal to one another. Further, prior to application of stresses, the angle defined by each of the inclined sections 236y, 236y and each of the joint sections 238y, 238y, or the angle defined by each of the joint sections 238y, 238y and each of the inclined sections 240y, 240y, are set mutually equal to one another.

Figure 29:
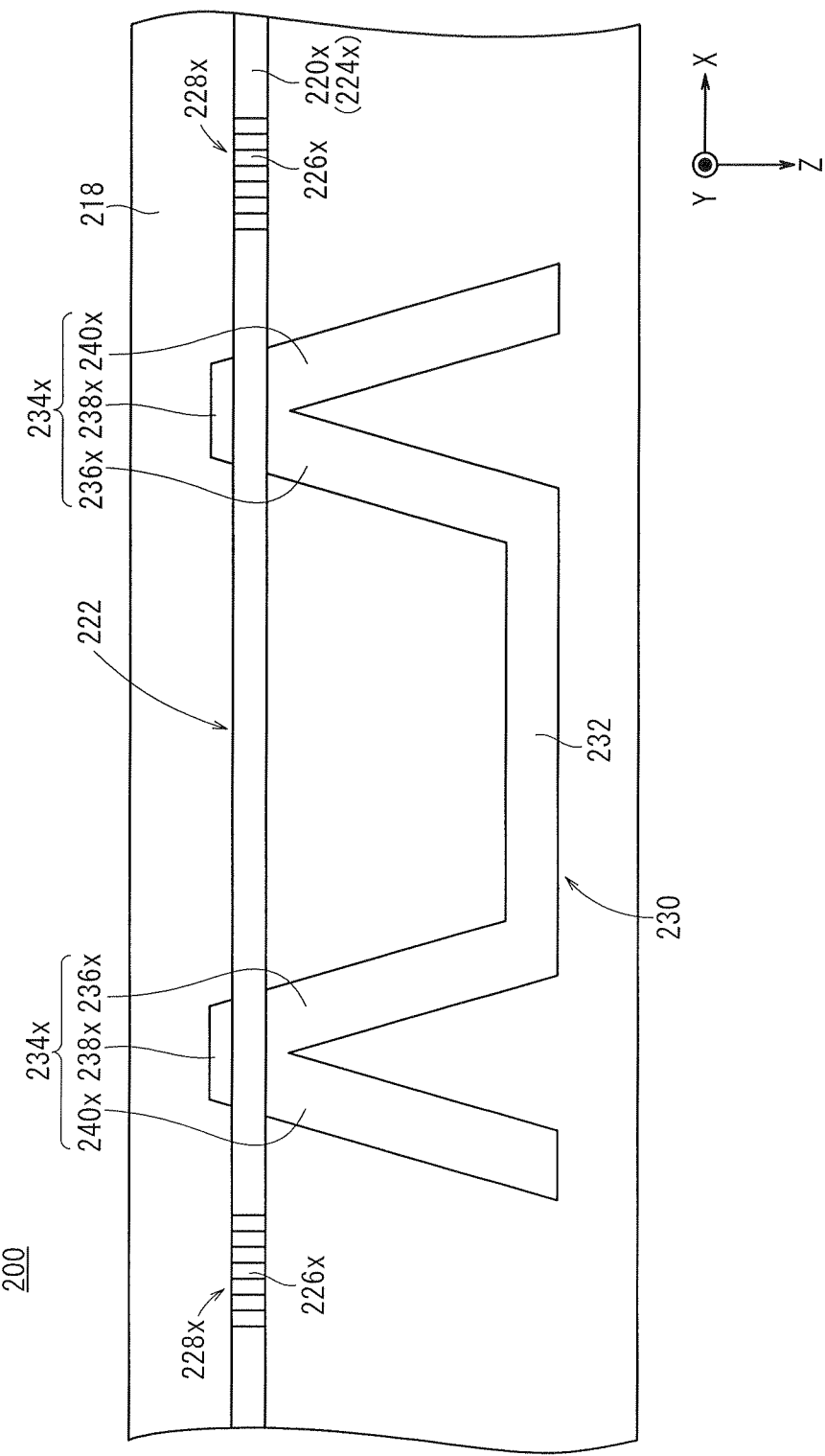
FIG. 29 is an explanatory view showing the FBG sensor of FIG. 26 prior to application of stresses thereto.
Figure 30:
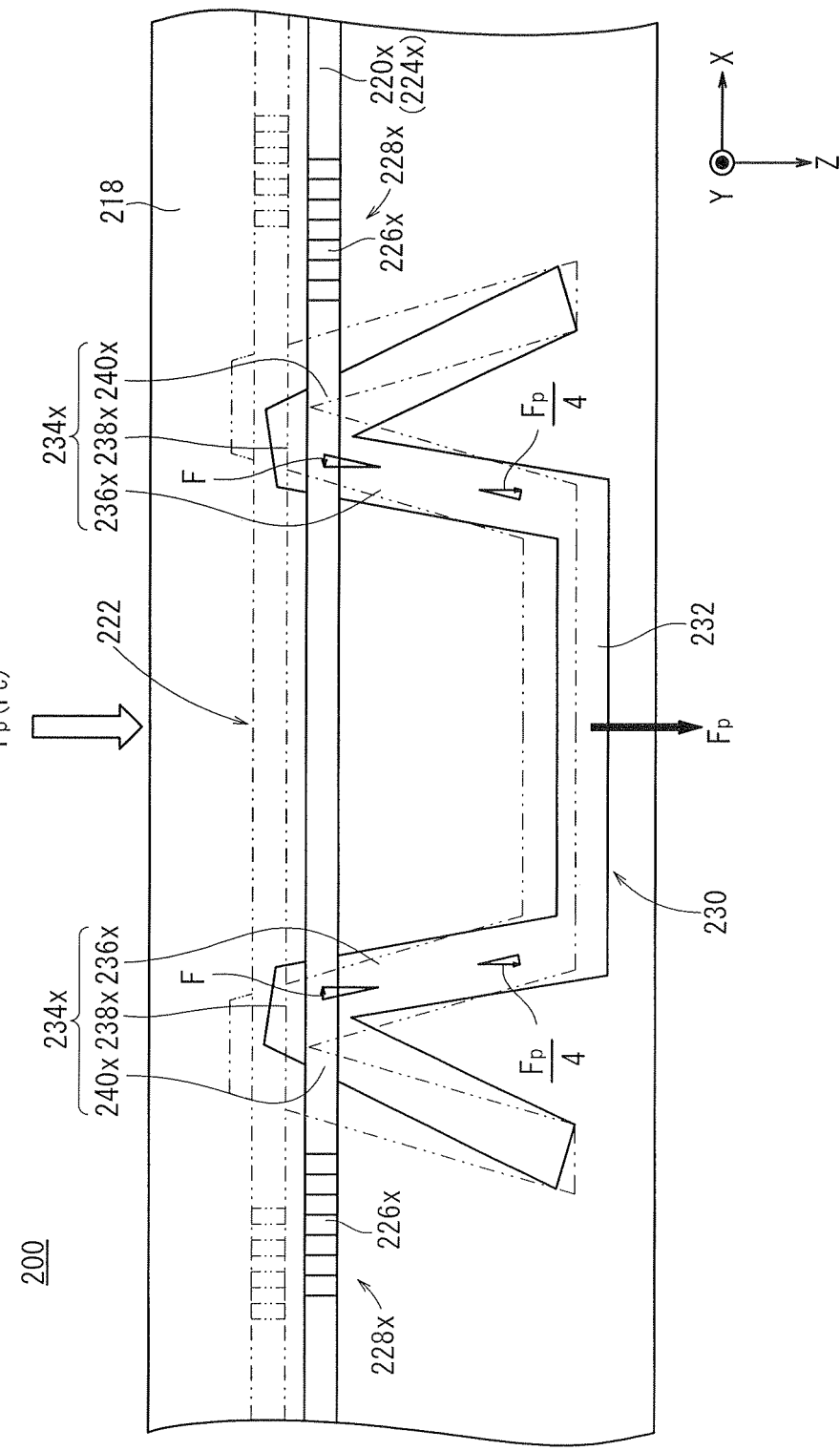
FIG. 30 is a view for explaining principles of detecting normal stresses by the FBG sensor of FIGS. 26 to 28.

Next, explanations shall be given with reference to FIGS. 29 and 30 concerning detection of normal stresses (stresses along the Z-direction) $F_p$ when a non-illustrated body comes into contact with a surface of the sheet 218 above the FBG sensor 222, and normal stresses $F_p$ are applied as stresses $F_C$ from the body with respect to the FBG sensor 222.

Explanations shall be made concerning a case of detecting normal stresses $F_p$ using the two stress detection sensors (first and second stress detection sensors) 238x that are arranged along the X-direction. For simplifying such explanations, in FIGS. 29 and 30, the optical fiber 220y and the two stress transmitting sections 234y arranged along the Y-direction have been omitted from illustration.

As noted above, because the shape of the stress direction converter 230 prior to application of stresses is a rotational symmetrical structure about the center of the flat portion 232 (a structure having left-right symmetry about the center of the flat portion 232 in FIG. 29), when normal stresses $F_p$ are applied from the body along the Z-direction of the sheet 218 and the flat portion 232 of the stress direction converter 230 receives such normal stresses $F_p$, ideally, at each of the stress transmitting section 234x, 234x, stresses $F_p/4$ are received respectively along the Z-direction. More specifically, because four inclined sections 236x, 236x, 236y, 236y extend respectively from each of the sides of the flat portion 232, the stress applied to one of the stress transmitting sections 234x ideally has a size of ¼ of the normal stress $F_p$, i.e., a size of $F_p/4$.

Owing thereto, compared to the shape before application of stresses (the shape shown in FIG. 29 and the shape shown by the two-dot-dashed line in FIG. 30), the shape of the stress direction converter 230 after application of stresses thereto, overall, becomes a largely deformed shape with left-right (lateral) symmetry as a result of the stresses $F_p/4$.

More specifically, the normal stress $F_p$ is received, whereupon the flat portion 232 descends in the Z-direction, and together therewith, directional components (forces) along the inclined sections 236x concerning the stress $F_p/4$ are transmitted respectively to each of the joint sections 238x. Thus, in each of the adjoined portions between the optical fiber 220x and the two joint sections 238x, forces F (components along the X-direction concerning forces having direction along the inclined sections 236x) are applied respectively based on the stress $F_p/4$. Accordingly, as a result of the forces F applied at each of the adjoined portions being imposed respectively on the gratings 226x, 226x, each of the gratings 226x, 226x is subjected to strains (stretched) of substantially the same amount in the X-direction, and together therewith, the lattice spacing in each of the gratings 226x, 226x changes (increases) at substantially the same amount.

Owing thereto, in the condition shown in FIG. 29 in which normal stresses $F_p$ are not applied, the gratings 226x reflect light at a given reflected wavelength (e.g. $\lambda_A$ in FIG. 1C) with respect to incident light, and such reflected light is output externally from the input/output terminal 242x or the input/output terminal 242y. In contrast thereto, in the condition shown in FIG. 30 in which normal stresses $F_p$ are applied, the lattice spacings of the two gratings 226x, 226x are increased by the same amount and the reflected wavelengths are shifted. Therefore, each of the gratings 226x, 226x reflects light at a given reflected wavelength (after being shifted) (e.g. $\lambda_B$ in FIG. 1D) with respect to incident light, and such reflected light is output externally from the input/output terminal 242x or the input/output terminal 242y.

Accordingly, with the FBG sensor 222 and the pressure sensor 216, based on the shift amount of the reflected wavelength, the value of the normal stress $F_p$ applied to the sheet 218 can be detected.

Herein, if the reflected wavelength of the gratings 226x, 226x prior to application of the normal stress $F_p$ is taken as $\lambda_p$, and the lattice spacing is taken as $\Delta_p$, in the same manner as the aforementioned equation (1), the relationship between the reflected wavelength $\lambda_p$ and the lattice spacing $\Delta_p$ is represented by the following equation (46).

$$\lambda_P = 2 \times n_{eff} \times \Delta_P \qquad (46)$$

Further, if the reflected wavelength of the gratings 226x, 226x after application of the normal stress $F_p$ is taken as $\lambda_S$, and the lattice spacing is taken as $\Delta_S$, in the same manner as the aforementioned equation (2), the relationship between the reflected wavelength $\lambda_S$ and the lattice spacing $\Delta_S$ is represented by the following equation (47).

$$\lambda_S = 2 \times n_{eff} \times \Delta_S \qquad (47)$$

In the foregoing manner, as noted previously, although in each of the gratings 226x, 226x, 226y, 226y the reflected wavelengths and lattice spacings are mutually different from each other, in each of the respective gratings 226x, 226x, the relationships shown by the above equations (46) and (47) hold, respectively.

If the reflected wavelength shift amount after application of the normal stress $F_p$ is taken as $\Delta\lambda$, then as noted previously, each of the gratings 226x, 226x are stretched by the same amount in the direction X due to the application of the normal stress $F_p$, and together therewith, the lattice spacing in each of the gratings 226x, 226x increases at substantially the same amount. Therefore, the reflected wavelength shift $\Delta\lambda$ in any one of the gratings is represented by the following equation (48).

$$\Delta\lambda = \lambda_S - \lambda_P = 2 \times n_{eff} \times (\Delta_S - \Delta_P) \qquad (48)$$

In this manner, because in any one of the gratings 226x the shift amount of the reflected wavelengths is given by $\Delta\lambda$, among each of the shift amounts $\Delta\lambda$ detected by the two stress detection sensors 228x, 228x, using either one of these shift amounts $\Delta\lambda$, the normal stress $F_p$ is capable of being detected. More specifically, since an OR operation (not an exclusive OR operation) on the outputs of the two stress detection sensors 228x, 238x yields $\Delta\lambda$, either one of the shift amounts $\Delta\lambda$ can be detected, and based on the detected shift amount $\Delta\lambda$, the value of the normal stress $F_p$ can easily be calculated.

Figure 31:
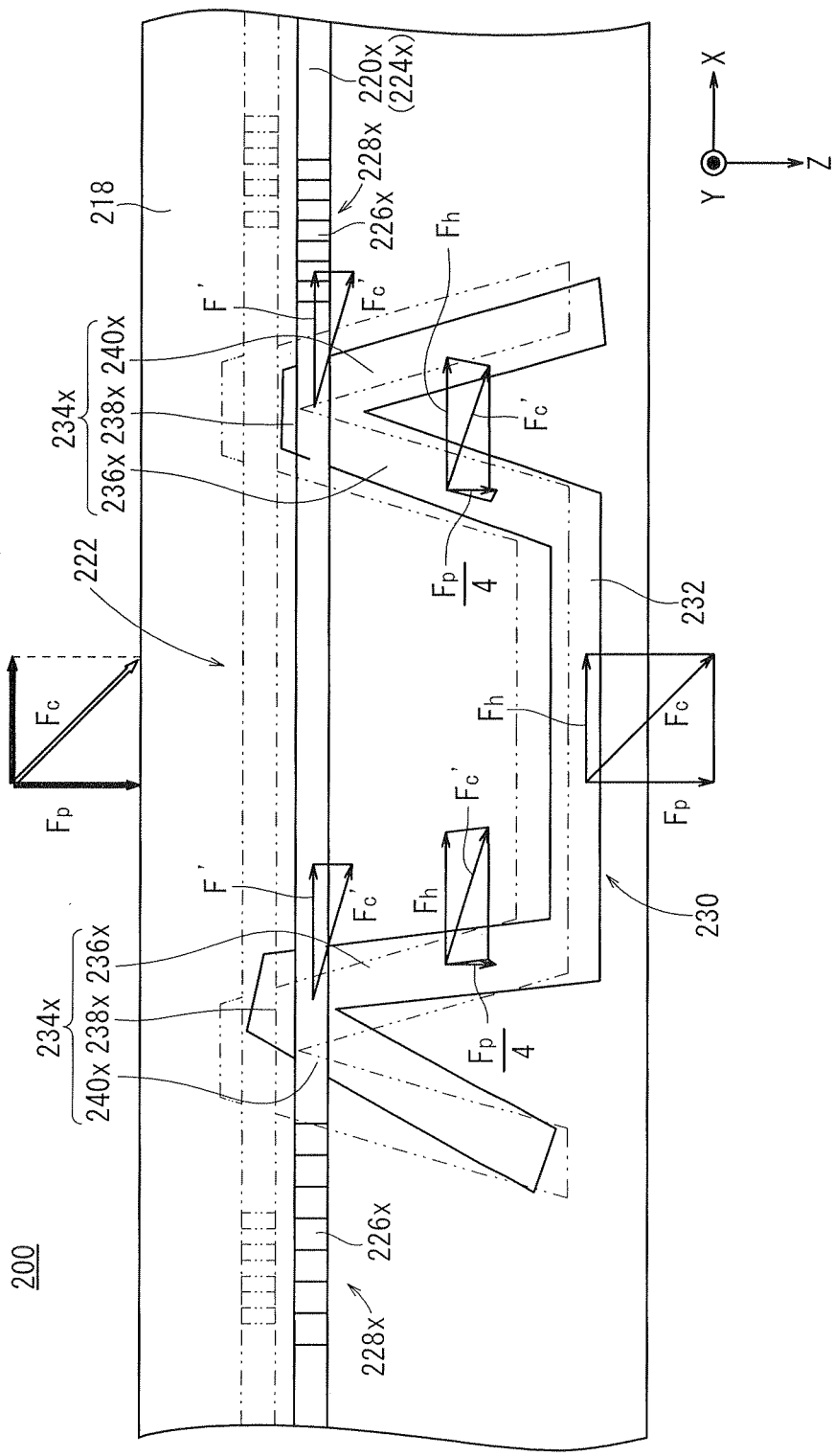
FIG. 31 is a view for explaining principles of detecting normal stresses and horizontal stresses by the FBG sensor of FIGS. 26 to 28.

Next, an explanation shall be given, with reference to FIGS. 29 and 31, of a case in which stresses $F_C$ (i.e., a stress having components in two directions made up of a normal stress $F_p$ and a horizontal stress $F_h$ along the positive X-direction) are segregated into normal stresses $F_p$ and horizontal stresses $F_h$ and are detected, at a time when a non-illustrated body comes into contact with the surface of the sheet 218 above the FBG sensor 222, and the stress $F_C$ is applied from a body with respect to the FBG sensor 222.

In this case as well, a case shall be described of detecting normal stresses $F_p$ and horizontal stresses $F_h$ using two stress detection sensors 228x, 228x, which are arranged along the X-direction.

When a stress $F_C$ is applied to the sheet 218 from the body and the stress $F_C$ is received by the flat portion 232 of the stress direction converter 230, ideally, a stress $F_p/4$ along the Z-direction and a horizontal stress $F_h$ are applied respectively to each of the stress transmitting sections 234x, 234x. As a result, compared to the shape before application of stresses (the shape shown in FIG. 29 and the shape shown by the two-dot-dashed line in FIG. 31), the shape of the stress direction converter 230 after application of stresses thereto, overall, becomes a deformed shape exhibiting left-right (lateral) asymmetry as a result of the stress $F_p/4$ and the horizontal stress $F_h$ (the shape shown by the solid line in FIG. 31).

More specifically, by receiving the stress $F_C$, in the interior of the sheet 218, the flat portion 232 descends in the Z-direction as a result of the normal stress $F_p$, and together therewith, the flat portion 232 is moved to the right side of FIG. 31 by the horizontal stress $F_h$. Further, each of the stress transmitting sections 234x is lowered in the Z-direction by the normal stress $F_p/4$, together with being moved to the right side by the horizontal stress $F_h$.

To the joint section 238x on the left side in FIG. 31, a composite stress $F_C'$ is transmitted, which is a composite of a component (force) concerning the normal stress $F_p/4$ along the direction of the left side inclined section 236x and the horizontal stress $F_h$, and based on the stress $F_C'$, a force F' (a component along the X-direction of the stress $F_C'$) is applied to the adjoined portion between the optical fiber 220x and the left side joint section 238x.

On the other hand, to the joint section 238x on the right side in FIG. 31, a composite stress $F_C''$ is transmitted, which is a composite of a component (force) concerning the normal stress $F_p/4$ along the direction of the right side inclined section 236x and the horizontal stress $F_h$, and based on the stress $F_C''$, a force F''' (a component along the X-direction of the stress $F_C''$) is applied to the adjoined portion between the optical fiber 220x and the right side joint section 238x.

In this case, the horizontal stress $F_h$ imposed on the gratings 226x on the left side of FIG. 31 become stresses that cause the lattice spacing of the gratings 226x on the left side to expand. Further, the horizontal stress $F_h$ imposed on the gratings 226x on the right side of FIG. 31 become stresses that cause the lattice spacing of the gratings 226x on the right side to be compressed.

Owing thereto, the force F' is imposed on the gratings 226x on the left side in FIG. 31, whereas the force F''' is imposed on the gratings 226x on the right side in FIG. 31, whereby each of the gratings 226x, 226x are subjected to strains at mutually differing amounts along the X-direction, and together therewith, the lattice spacings in each of the gratings 226x, 226x change by mutually different amounts. As a result, the shift amounts of reflected wavelengths at each of the gratings 226x, 226x exhibit mutually different values.

If the reflected wavelength is taken as $\lambda_S'$ and the lattice spacing is taken as $\Delta_S'$ for the gratings 226x on the left side of FIG. 31 after application of stresses, whereas the reflected wavelength is taken as $\lambda_S''$ and the lattice spacing is taken as $\Delta_S''$ for the gratings 226x on the right side of FIG. 31 after application of stresses, similar to the above-noted equation (47), the relationships between the reflective wavelengths $\lambda_S'$, $\lambda_S''$ and the lattice spacings $\Delta_S'$, $\Delta_S''$ are represented by the following equations (49) and (50).

$$\lambda_S'=2\times n_{eff}\times\Delta_S' \tag{49}$$

$$\lambda_S''=2\times n_{eff}\times\Delta_S'' \tag{50}$$

Assuming that the shift amount of reflected wavelengths in the gratings 226x on the left side of FIG. 31 after application of the stress $F_C$ is taken as $\Delta\lambda'$, and the shift amount of reflected wavelengths in the gratings 226x on the right side of FIG. 31 is taken as $\Delta\lambda''$, then similar to the above-noted equation (48), the first amounts $\Delta\lambda'$, $\Delta'''$ are represented respectively by the following equations (51) and (52).

$$\Delta\lambda'=\lambda_S'-\lambda_P=2\times n_{eff}\times(\Delta_S'-\Delta_P) \tag{51}$$

$$\Delta\lambda''=\lambda_S''-\lambda_P=2\times n_{eff}\times(\Delta_S''-\Delta_P) \tag{52}$$

As described above, the stress $F_C$ is a stress that is made up from components in two directions of the normal stress $F_p$ and the horizontal stress $F_h$. The wavelength shift amount based on the normal stress $F_p$ is determined by OR-ing the outputs from the two stress detection sensors 228x, 228x. More specifically, the OR operation on the shift amounts $\Delta\lambda'$, $\Delta\lambda''$ of the two gratings 226x, 226x when the stress $F_C$ is applied to the stress direction converter 230 is represented by the following equation (53).

$$(\Delta\lambda')OR(\Delta\lambda'')=\Delta\lambda''=2\times n_{eff}\times(\Delta_S''-\Delta_P) \tag{53}$$

In equation (53), OR is an arithmetic code indicative of a logical OR operation performed on $\Delta\lambda'$ and $\Delta\lambda''$. Further, in the example of FIG. 31, because $\Delta\lambda'>\Delta\lambda''$, in equation (53), the result of equation (52) provides the result of the logical OR operation between $\Delta\lambda'$ and $\Delta\lambda''$.

Accordingly, in the case that stresses $F_C$ including components in two directions are applied to the (FBG sensor 222 in the interior of the) sheet 218, segregating the horizontal stresses $F_h$, based on the logical OR operation of equation (53), normal stress values Fp can be calculated.

On the other hand, in the case that the wavelength shift amount is detected responsive to the horizontal stress $F_h$, it is necessary to eliminate the influence of normal stresses $F_p$ from the shift amounts $\Delta\lambda'$, $\Delta\lambda''$ of the two gratings 226x, 226x. Consequently, an exclusive OR operation on the shift amounts $\Delta\lambda'$, $\Delta\lambda''$, which are output from the two stress detection sensors 228x, 228x, is determined according to the following equation (54).

$$(\Delta\lambda')XOR(\Delta\lambda'')=|\Delta\lambda'-\Delta\lambda''|=|2\times n_{eff}\times(\Delta_S'-\Delta_P)-2\times n_{eff}\times(\Delta_S'-\Delta_P)| \tag{54}$$

In equation (54), XOR is an arithmetic code indicative of an exclusive OR operation performed on $\Delta\lambda'$ and $\Delta\lambda''$.

In the exclusive OR value obtained from equation (54), although the influence of normal stresses $F_p$ is eliminated, because the shift amount corresponding to horizontal stresses $F_h$ is an absolute value, direction is not added. Consequently, in the case that direction also is to be considered, the shift amount corresponding to horizontal stresses $F_h$ may be calculated from the following formula (55), in which the absolute value symbols of equation (54) have been removed.

$$2\times n_{eff}\times(\Delta_S'\Delta_P)-2\times n_{eff}\times(\Delta_S''-\Delta_P) \tag{55}$$

Accordingly, in the case that stresses $F_C$ including components in two directions are applied to the (FBG sensor 222 in the interior of the) sheet 218, segregating the normal stresses $F_p$, based on the logical exclusive OR operation of formula (55), horizontal stress values $F_h$ can be calculated.

In this way, according to the third embodiment, in the case that stresses $F_C$ including components of the normal stresses $F_p$ and horizontal stress values $F_h$ in two directions are applied to the FBG sensor 222, the normal stresses $F_p$ and horizontal stress values $F_h$ can be detected by segregating the normal stresses $F_p$ and horizontal stress values $F_h$ from each other. In the above explanation, as one example, a description was given concerning a case in which detection was carried out by two stress detection sensors 228x, 228x, which are arranged along the X-direction, and wherein values of normal stresses $F_p$ or horizontal stresses $F_h$ were calculated based on shift amounts of two gratings 226x, 226x. In this case, the horizontal stresses $F_h$ are detected as stresses in a direction along the X-direction.

In the third embodiment, two stress detections sensors (third and fourth stress detection sensors) 228y, 228y also are arranged along the Y-direction. Thus, similar to the aforementioned stress detection by means of the aforementioned stress detection sensors 228x, 228x, in the two stress detection sensors 228y, 228y as well, by detecting horizontal stresses $F_h$ along the Y-direction, such horizontal stresses $F_h$ can be detected as respective components in the X-direction and the Y-direction, and owing thereto, horizontal stresses $F_h$ can be detected highly accurately.

Further, in the case that the pressure sensor 200 according to the third embodiment is attached to the robot system 60 shown in FIGS. 11 and 12, the horizontal stress determining unit 82 inside the sensor controller 68 judges whether or not shift amounts of the gratings 226x, 226y of each of the stress detection sensors 228x, 228y are of the same amount, based on electrical signals from the light detector 78, as well as based on peak values of the reflected wavelength intensity.

In the event that the shift amounts are of substantially the same amount, the horizontal stress determining unit 82 judges that only normal stresses $F_p$ are being applied to the pressure sensors 200a, 200b (or to the pressure sensors 16a, 16b in FIG. 11), and outputs electrical signals from the light detector 78 to the normal stress calculator 86. In the case that each of the shift amounts are of different amounts, the horizontal stress determining unit 82 judges that only horizontal stresses $F_h$ are being applied, or alternatively, judges that both horizontal stresses $F_h$ and normal stresses $F_p$ are being applied to the pressure sensors 200a, 200b, and outputs electrical signals from the light detector 78 to both the normal stress calculator 86 and the horizontal stress calculator 84.

The horizontal stress calculator 84 calculates an exclusive OR result for each of the shift amounts based on equation (55), using shift amounts of each of the gratings 226x, 226y, which are indicated by the electrical signals from the light detector 78. From the calculated exclusive OR result, the horizontal stress calculator 84 calculates values of horizontal stresses $F_h$ applied to the FBG sensor 222.

Further, the normal stress calculator 86 calculates a logical OR result for each of the shift amounts based on equations (51) through (53), using shift amounts of each of the gratings 226x, 226y, which are indicated by the electrical signals from the light detector 78. From the calculated OR result, the normal stress calculator 86 calculates values of normal stresses $F_p$ applied to the FBG sensor 222.

In this manner, by calculating values of horizontal stresses $F_h$, a state of slippage of a body 62 in the X-Y plane can be detected. Further, by calculating values of normal stresses $F_p$, a gripping force of the body 62 with respect to the Z-direction can be detected.

As explained above, in accordance with the FBG sensor 222, the pressure sensors 200, 200a, 200b and the end effector 66 (the hand members 66a, 66b shown in FIG. 11) according to the third embodiment, because a plurality of stress detection sensors 228x, 228y are disposed to surround the stress direction converter 230, when stresses $F_C$ (normal stresses $F_p$ and/or horizontal stresses $F_h$) are applied with respect to the FBG sensor 222, the stress direction converter 230 converts the applied stresses $F_C$ into stresses of directions (X-direction, Y-direction) in which the gratings 226x, 226y of each of the stress detection sensors 228x, 228y are arrayed, and then transmits the converted stresses to each of the stress detection sensors 228x, 228y. As a result, from the converted stresses, strains are generated in the gratings 226x, 226y of each of the stress detection sensors 228x, 228y, and the wavelengths (reflected wavelengths) of light reflected by each of the gratings 226x, 226y change respectively. Accordingly, by detecting shift amounts of reflected wavelengths at each of the gratings 226x, 226y, stresses $F_C$ applied to the FBG sensor 222 can be detected.

More specifically, in the case that each of the stress detection sensors 228x, 228y is arranged in surrounding fashion to the stress direction converter 230 along the X-Y direction perpendicular to the normal stresses $F_p$, the stress direction converter 230 converts the normal stresses $F_p$ into stresses of a direction (X-Y direction) at which each of the gratings 226x, 226y are arrayed, and transmits the stresses, after conversion thereof, to each of the stress detection sensors 228x, 228y. As a result thereof, each of the gratings 226x, 226y are subject to strains of substantially the same amount, and as shown by equation (48), shift amounts of reflected wavelengths at the gratings 226x, 226y also change by substantially the same amount.

Accordingly, among each of the stress detection sensors 228x, 228y, if the shift amount of the gratings of any one of the stress detection sensors is detected, the value of the normal stresses $F_p$ can be detected based on the detected shift amount. More specifically, in the case that a normal stress $F_p$ is applied to the stress direction converter 230, the normal stress $F_p$ can be calculated based on an OR operation (according to equation (53)) performed on the shift amounts of each of the gratings 226x, 226y.

Next, in the case that each of the stress detection sensors 228x, 228y are arranged in surrounding fashion to the stress direction converter 230 along an X-Y direction parallel to the horizontal stresses $F_h$, the stress direction converter 230 transmits the horizontal stresses $F_h$ without change to each of the stress detection sensors 228x, 228y. In this case, by means of the direction of application of the horizontal stresses $F_h$ with respect to the stress direction converter 230 and the positions at which each of the stress detection sensors 228x, 228y are disposed, each of the gratings 226x, 226y are subjected to strains of mutually different amounts, and together therewith, as shown by equations (51) and (52), the shift amounts of reflected wavelengths at each of the gratings 226x, 226y also are of mutually different values.

Consequently, among each of the stress detection sensors 228x, 228y that are positioned to surround the stress direction converter 230, if shift amounts from gratings of two stress detection sensors, for which the shift amounts of the gratings 226x, 226y thereof differ mutually from each other, are detected, the value of the horizontal stresses $F_h$ can be detected based on the difference in the two detected shift amounts. More specifically, in the case that a horizontal stress $F_h$ is applied to the stress direction converter 230, the horizontal stress $F_h$ can be calculated based on an exclusive OR operation (according to formula (55)) performed on the shift amounts of the two gratings.

In this manner, according to the third embodiment, by arranging a plurality of stress detection sensors 228x, 228y in surrounding fashion to the stress direction converter 230, with a comparatively simple structure, stresses $F_C$ applied from the body 62 are capable of being segregated into stresses of multiple directions (normal stresses $F_p$, horizontal stresses $F_h$) and detected.

Further, two stress detection sensors 228x, 238x are arranged along the X-direction so as to sandwich the stress direction converter 230 therebetween, and two stress detection sensors 228y, 228y are arranged along the Y-direction, which is perpendicular to the X-direction, so as to sandwich the stress direction converter 230 therebetween.

Owing thereto, when normal stresses $F_p$ are applied to the stress direction converter 230, since the shift amounts of the gratings 226x, 226y of each of the stress detection sensors 228x, 228y are of the same amount mutually, by detecting shift amounts from any one of the gratings, normal stresses $F_p$ can be calculated reliably and with good efficiency.

Further, when horizontal stresses $F_h$ are applied to the stress direction converter 230, the shift amounts of the gratings 226x, 226x of the two stress detection sensors 228x, 238x are of mutually different sizes, and together therewith, the shift amounts of the gratings 226y, 226y of the two stress detection sensors 228y, 228y also are of mutually different sizes. Accordingly, the shift amounts of the gratings 226x, 226x of the two stress detection sensors 228x, 238x disposed co-axially in the X-direction are detected, or alternatively, the shift amounts of the gratings 226y, 226y disposed co-axially in the Y-direction of the two stress detection sensors 228y, 228y are detected, and by performing an exclusive OR operation on the detected two shift amounts, horizontal stresses $F_h$ can be calculated reliably and with good efficiency.

In this manner, by disposing the four stress detection sensors 228x, 228x, 228y, 228y in surrounding fashion to the stress direction converter 230, values of normal stresses $F_p$ and/or horizontal stresses $F_h$ can be calculated (detected) reliably and efficiently, and together therewith, stresses $F_C$ (horizontal stresses $F_h$) applied to the stress direction converter 230 can be detected in the form of components along the X-direction and the Y-direction.

Further, because the two stress detection sensors 228x, 238x are bridged by the optical fiber 220x which extends along the X-direction, and the two stress detection sensors 228y, 228y are bridged by the optical fiber 220y which extends along the Y-direction, in the core 224x of the optical fiber 220x, gratings 226x, 226x of the two stress detection sensors 228x, 238x are arrayed along a common axis, and together therewith, in the core 224y of the optical fiber 220y, gratings 226y, 226y of the two stress detection sensors 228y, 228y are arrayed along a common axis. Owing thereto, at a time when stresses $F_C$ are applied to the stress direction converter 230, the stress direction converter 230 transmits the stresses, after conversion thereof, to the optical fibers 220x, 220y, whereby strains can easily be imposed in each of the gratings 226x, 226y. As a result thereof, detection of stresses $F_C$ in each of the stress direction sensors 228x, 228y can be performed more reliably.

Furthermore, because the stress direction converter 230 includes the flat portion 232 to which stresses $F_C$ are applied, and the stress transmitting sections 234x, 234y, which are bridged respectively from the flat portion 232 to the optical fibers 220x, 220y, stresses $F_C$ applied from a body to the flat portion 232 can be converted efficiently into stresses of directions along which each of the gratings 226x, 226y are arrayed, and the converted stresses can be transmitted respectively and with good efficiency to each of the optical fibers 220x, 220y via the stress transmitting sections 234x, 234y.

Still further, in the case that the flat portion 232 receives normal stresses $F_p$, the position of the flat portion 232 along the direction of application (Z-direction) of the normal stresses $F_p$ is positioned lower than the position (i.e., the position of the joint sections 238x, 238y) at which the optical fibers 220x, 220y are supported and/or fixed to the stress transmitting sections 234x, 234y. Owing thereto, when stresses $F_C$ (normal stresses $F_p$, horizontal stresses $F_h$) are applied to the flat portion 232, the stress direction converter 230 is easily deformed overall in directions in which the gratings 226x, 226y are arrayed. Therefore, strains or shift amounts of each of the gratings 226x, 226y can be made larger, and as a result, the detection sensitivity and detection precision of the stresses $F_C$ can be improved.

Figure 32:
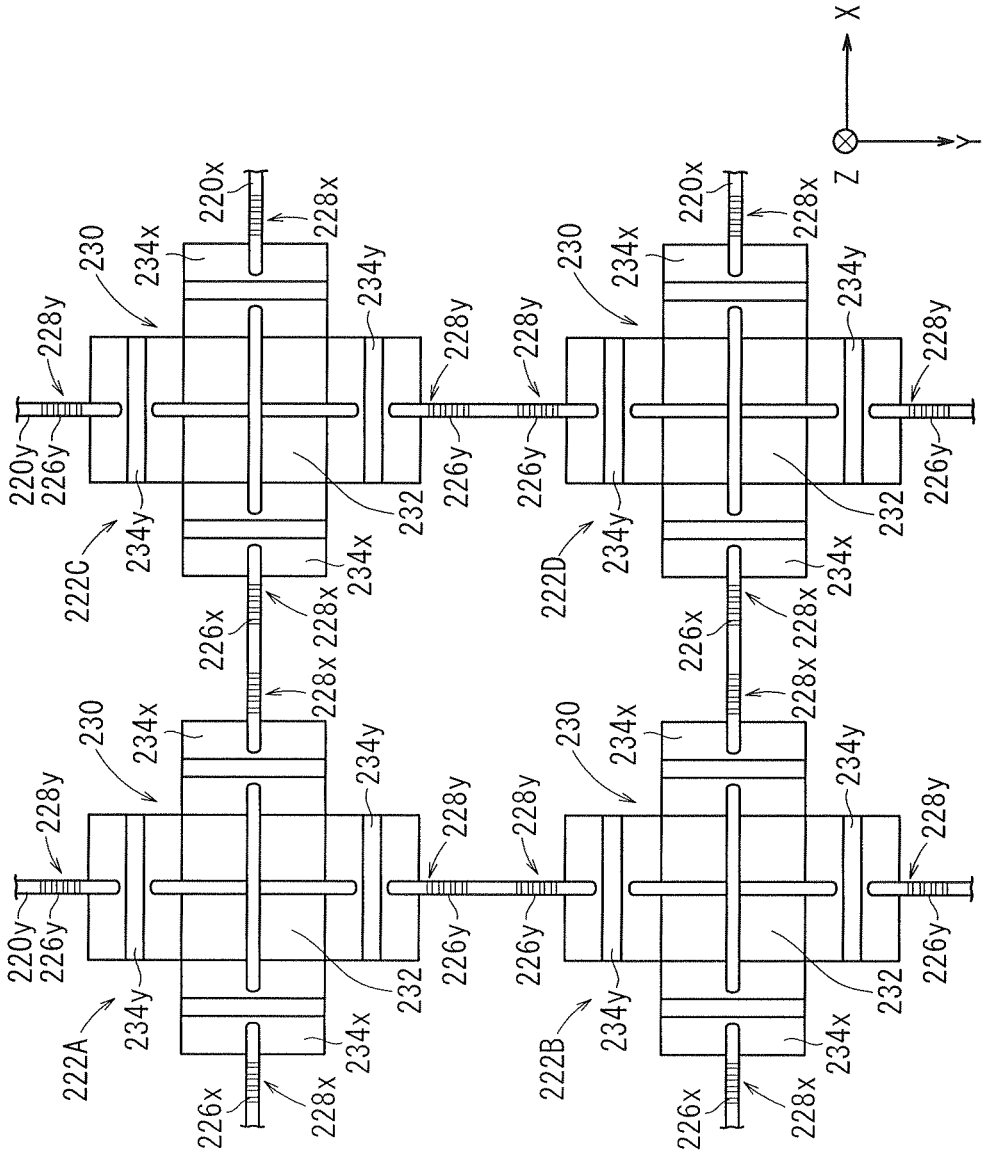
FIG. 32 is a plan view showing a modified example of the pressure sensor of FIG. 26.

The third embodiment is not limited to the descriptions provided above, and can be modified as in the embodiment (modified example) of FIG. 32.

In the modified example of FIG. 32, four FBG sensors 222A to 222D are arranged in a matrix form along the X-Y plane.

In this modified example, a plurality of individual FBG sensors 222A to 222D are disposed in matrix form along the X-Y plane, and stresses $F_C$ (normal stresses $F_p$, horizontal stresses $F_h$) applied to the sheet 218 are detected respectively at each of the FBG sensors 222A to 222D, whereby the distribution of such stresses $F_C$ applied to the sheet 218 can easily be detected.

Further, in FIG. 32, although a case has been explained in which the FBG sensors 222A to 222D are disposed in the form of a 2×2 matrix, the modified example is not limited to the above description, but the FBG sensors 222 may be disposed in the form of a 3×3 matrix, a 4×4 matrix or the like, such that the distribution of stresses $F_C$ applied to the sheet 218 are capable of being detected.

As noted above, in the pressure sensor 200 and the FBG sensor 222 according to the third embodiment, or in an end effector and robot system (sensor signal processing apparatus) to which the pressure sensor 200 is applied, a comparatively simple structure is enabled, while in addition, the detection accuracy of stresses applied from a body can easily be improved.

Fourth Embodiment

Next, a pressure sensor 300 according to a fourth embodiment, and an FBG sensor 322 incorporated in such a pressure sensor 300, shall be described below with references to FIGS. 33 through 36. In the pressure sensor 300 and the FBG sensor 322 according to the fourth embodiment, by means of an end effector equipped with a smaller number of optical fiber sensors (pressure sensors), a structure is provided in which the gripping force of a gripped body (i.e., normal stresses applied to a gripping surface from the body) can easily be detected.

Figure 33:
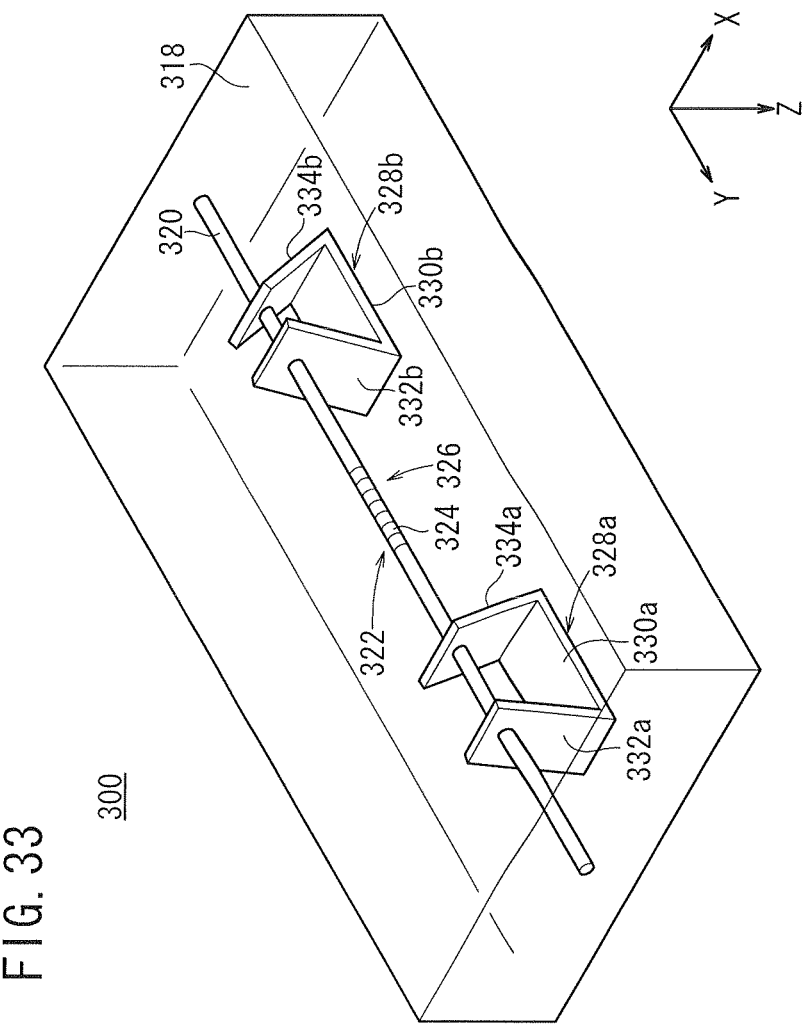
FIG. 33 is a perspective view of a pressure sensor, in which an FBG sensor according to a fourth embodiment is disposed in a sheet.
Figure 34:
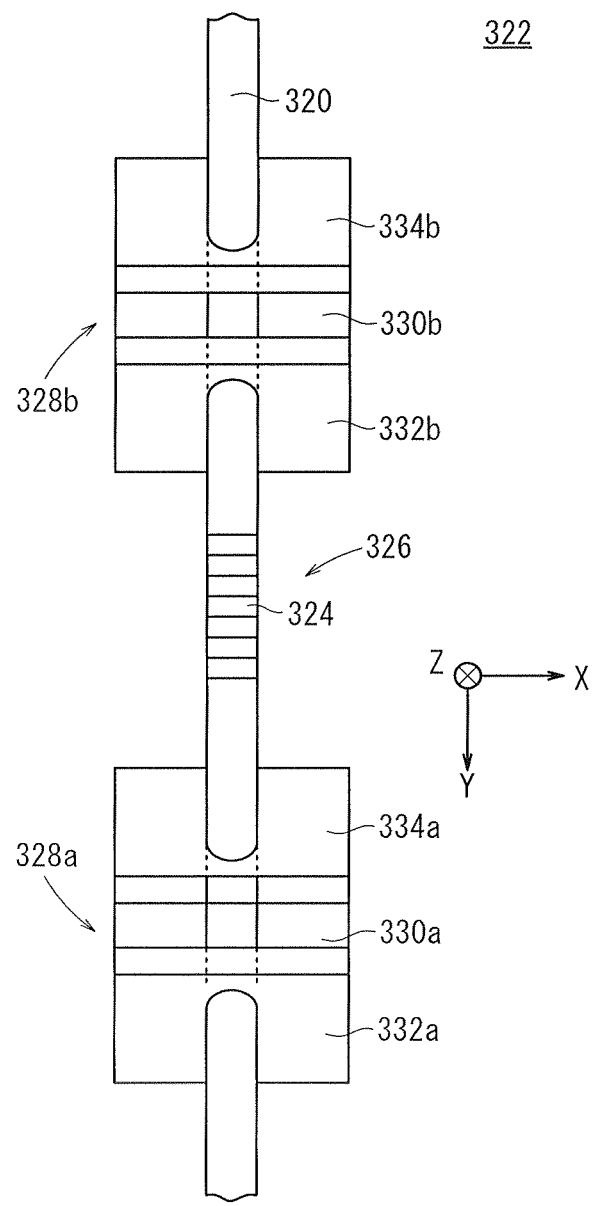
FIG. 34 is a plan view showing the FBG sensor of FIG. 33.

As shown in FIG. 33, the pressure sensor 300 is constituted by a single optical fiber cable 320, the longitudinal dimension of which is defined along the Y-direction, which is embedded inside a flexible sheet 318, and an FBG sensor 322 is formed by the optical fiber cable 320. More specifically, in addition, in the sheet 318, the FBG sensor 322 is formed by molding, using a material such as plastic or the like having a certain flexibility. In this case, the FBG sensor 322 is fixed in the interior of the sheet 318, and the sheet 318 is formed in order to protect the FBG sensor 322 from excessive stresses or heat, etc., which are applied from the exterior.

In FIG. 33, although a case is shown in which the longitudinal direction of the optical fiber cable 320 lies along the Y-direction, the longitudinal direction thereof is not limited to being arranged in the Y-direction, but may also lie in the X-direction as well.

Next, with reference to FIGS. 33 through 36, explanations shall be given in greater detail concerning the FBG sensor 322.

The FBG sensor 322 is disposed inside the sheet 318 and is equipped with a stress detection sensor 326 including an optical fiber cable 320 in which gratings 324 are formed, and stress direction converters 328a, 328b, which receive via the sheet 318 stresses (normal stresses $F_p$) applied to the sheet 318 from the exterior, convert the received stresses into stresses having directions along the longitudinal direction of the optical fiber cable 320 (i.e., Y-directions parallel to the longitudinal direction), and then transmit the converted stresses to the optical fiber cable 320.

In this case, the stress direction converters 328a, 328b, which serve as receptive materials with respect to stresses from the exterior, are made from an elastic material such as rubber, resin, or the like. On the other hand, one of the stress direction converters 328a is disposed on one end side (a forward side along the Y-direction as shown in FIG. 33) of the gratings 324 along the optical fiber cable 320, whereas the other stress direction converters 328b is disposed on another end side (a rearward side along the Y-direction as shown in FIG. 33) of the gratings 324 along the optical fiber cable 320.

The stress direction converter 328a includes a rectangular flat portion 330a that extends substantially parallel to the gratings 324 (optical fiber cable 320) along the X-Y direction, and stress transmitting sections 332a, 334a that are bridged from two opposing sides along the Y-direction on the flat portion 330a to the optical fiber cable 320. Further, the stress direction converter 328b, similar to the stress direction converter 328a, includes a rectangular flat portion 330b that extends substantially parallel to the gratings 324 along the X-Y direction, and stress transmitting sections 332b, 334b that are bridged from two opposing sides along the Y-direction on the flat portion 330b to the optical fiber cable 320.

Figure 35:
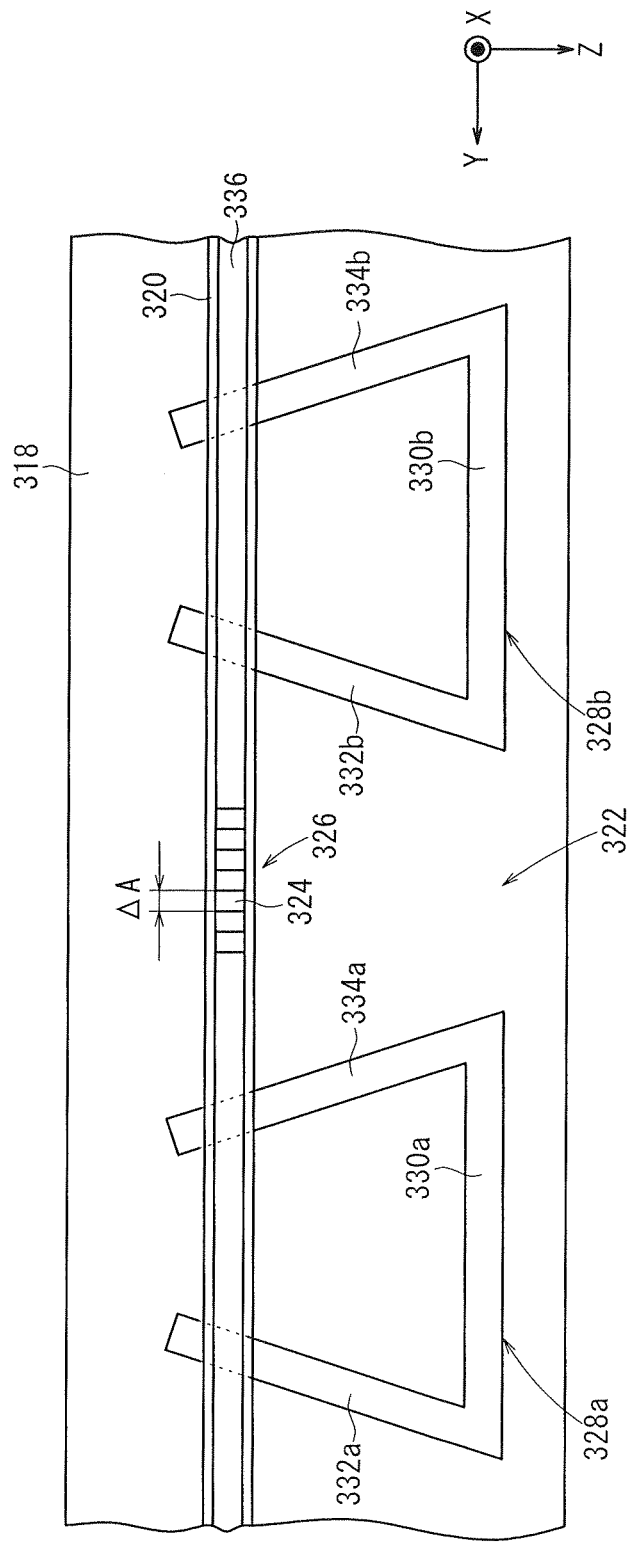
FIG. 35 is an outline explanatory view showing the FBG sensor of FIG. 33.

As shown in FIG. 35, the stress direction converters 328a, 328b are constructed with left-right (lateral) symmetry about the center of the flat portions 330a, 330b. More specifically, the stress transmitting sections 332a, 334a are joined to the flat portion 330a while being inclined toward (one end side of the gratings 324 formed in a core 336 of) the optical fiber cable 320, and ends thereof surround a portion on the outer circumferential surface of the optical fiber cable 320. Further, similar to the stress transmitting sections 332a, 334a, the stress transmitting sections 332b, 334b are joined to the flat portion 330b while being inclined toward (another end side of the gratings 324 formed in the core 336 of) the optical fiber cable 320, and ends thereof surround a portion on the outer circumferential surface of the optical fiber cable 320.

In this case, angles defined by the flat portion 330a and the stress transmitting sections 332a, 334a, as well as angles defined by the flat portion 330b and the stress transmitting sections 332b, 334b are set mutually equal to each other. Further, the angles defined by the stress transmitting sections 332a, 334a and the optical fiber cable 320, as well as the angles defined by the stress transmitting sections 332b, 334b and the optical fiber cable 320 are set mutually equal to each other.

Figure 36:
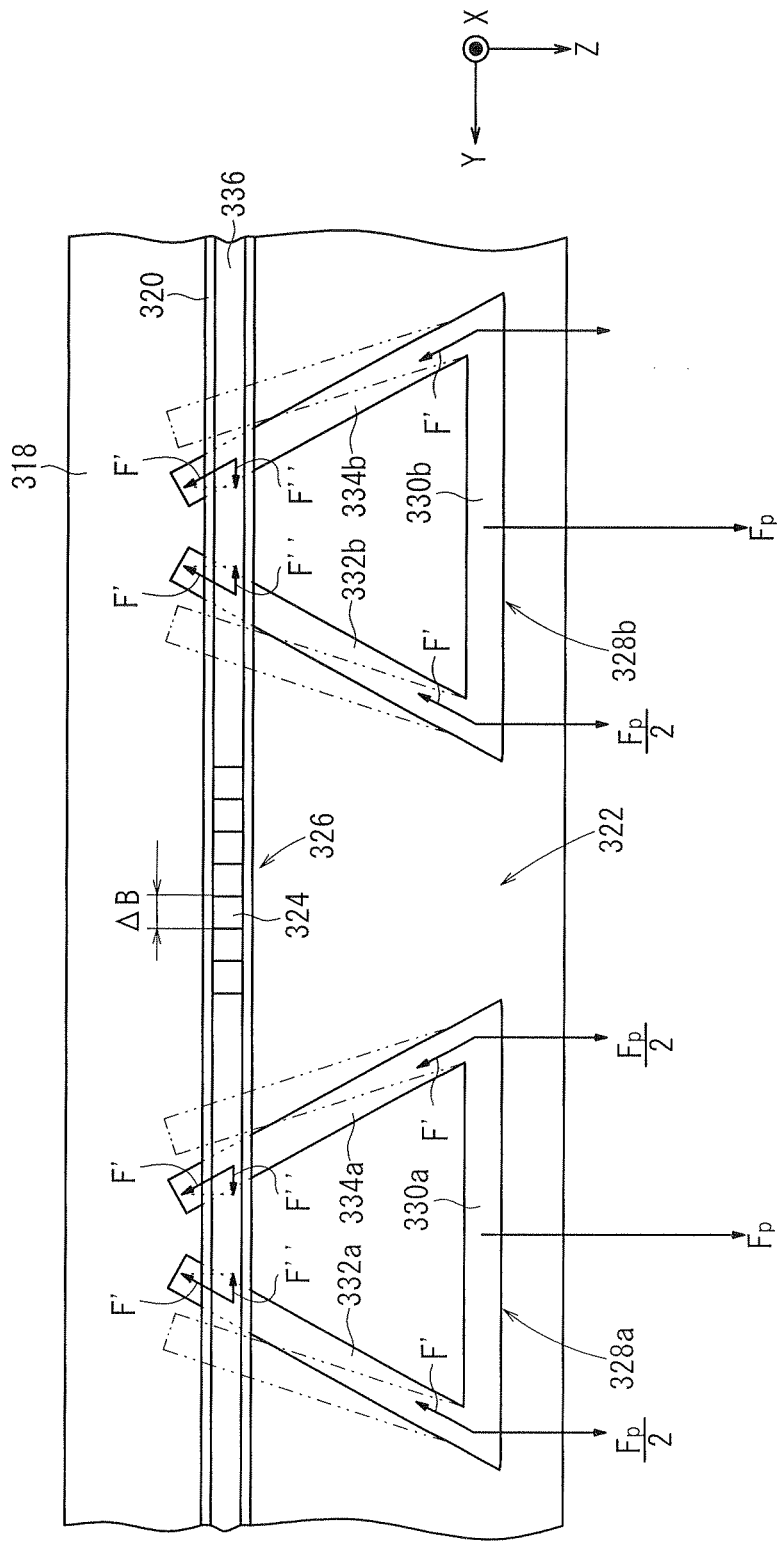
FIG. 36 is a view for explaining principles of detecting normal stresses by the FBG sensor of FIGS. 33 to 35.

Next, with reference to FIG. 36, explanations shall be made concerning detection of normal stresses $F_p$ at a time when a non-illustrated body comes into contact with a surface of the sheet 318 above the FBG sensor 322, and normal stresses $F_p$ (stresses along the Z-direction) are applied to the gratings 324 from the body.

As described above, because the shape of the stress direction converters 328a, 328b prior to application of stresses is of a symmetrical structure about the flat portions 330a, 330b (see FIG. 35), when a normal stress $F_p$ is applied from the body along the Z-direction to the sheet 318, ideally, stresses $F_p/2$ along the Z-direction are applied respectively to each of the stress transmitting sections 332a, 332b, 334a, 334b of each of the stress direction converters 328a, 328a.

In addition, each of the stress transmitting sections 332a, 332b, 334a, 334b resolves the normal stress $F_p/2$ respectively into components (stresses) F' along the stress transmitting sections 332a, 332b, 334a, 334b, and at the adjoined portions between the optical fiber cable 320 and each of the stress transmitting sections 332a, 332b, 334a, 334b, the stresses F' are further resolved respectively into components (stresses) F" along the optical fiber cable 320. Accordingly, at each of the aforementioned adjoined portions of the optical fiber cable 320, stresses F" are applied respectively.

In this case, in the stress transmitting sections 332a, 334a, by application of the stresses F", end portions thereof that make up adjoined portions with the optical fiber cable 320 are displaced mutually to approach one another, about fulcrum points at adjoining locations (base end portions of the stress transmitting sections 332a, 334a) with the flat portion 330a. Further, in the stress transmitting sections 332b, 334b, by application of the stresses F", end portions thereof that make up adjoined portions with the optical fiber cable 320 are displaced mutually to approach one another, about fulcrum points at adjoining locations (base end portions of the stress transmitting sections 332b, 334b) with the flat portion 330b. Furthermore, the stresses F" act on the gratings 324 via the optical fiber cable 320.

As a result, the gratings 324 are subjected to strains (stretching) in the Y-direction, and the lattice spacing of the gratings 324 changes (increases).

Owing thereto, in a state in which normal stresses $F_p$ are not applied, the gratings 324 reflect light at a given reflected wavelength (e.g., $\lambda_A$ in FIG. 1C) with respect to incident light, and the reflected light is output to the exterior. In contrast thereto, in the case that normal stresses $F_p$ are applied, the lattice spacing of the gratings 324 is increased, and since the reflected wavelength is shifted to $\lambda_B$, the gratings 324 reflect light at the wavelength $\lambda_B$ with respect to the incident light, and the reflected light is output to the exterior.

Accordingly, with the FBG sensor 322 and the pressure sensor 300, based on a shift amount $(\lambda_B - \lambda_A)$ of the reflected wavelength from $\lambda_A$ to $\lambda_B$, normal stresses $F_p$ applied to the sheet 318 can be detected.

In the foregoing description, as shown in FIGS. 35 and 36, although an explanation has been made concerning a case in which, by application of normal stresses $F_p$, the lattice spacing changes from $\Delta A$ to $\Delta B$ ($\Delta A < \Delta B$), even in the case that the lattice spacing becomes smaller than $\Delta A$ by application of normal stresses that differ from the normal stresses $F_p$, since the reflected wavelength shift amount corresponds to changes in the lattice spacing, such normal stresses can easily be detected.

Figure 37:
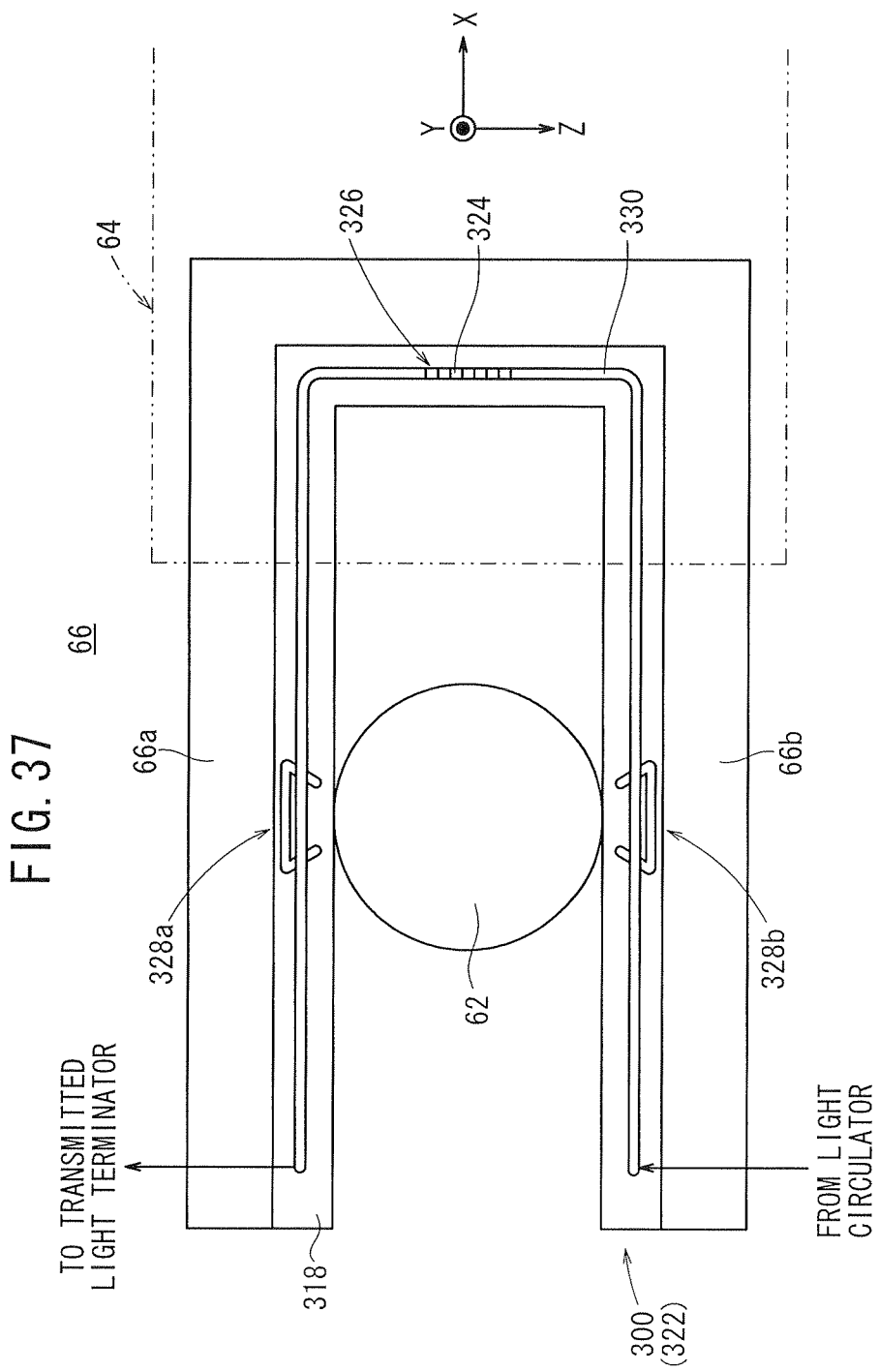
FIG. 37 is an outline explanatory view in which the pressure sensor according to the fourth embodiment is applied to an end effector of the robotic system of FIG. 11.

Next, with reference to FIG. 37, an explanation shall be made concerning a case in which the pressure sensor 300 according to the fourth embodiment is attached to an end effector 66 (hand members 66a, 66b) of the robot system 60 shown in FIGS. 11 and 12.

As shown in lateral plan view in FIG. 37, in an end effector 66 according to the fourth embodiment, the pressure sensor 300 is attached to a gripping surface for gripping a body 62 on U-shaped hand members 66a, 66b. In this case, by disposing the sheet 318 along the gripping surface of the hand members 66a, 66b, the gratings 324 are disposed on a base end side (positive X-direction side) of the end effector 66, while the stress direction converters 328a, 328b are disposed at locations proximate an end of the end effector 66, for which the possibility is high that such locations will actually come into contact with the body 62.

Consequently, the body 62 is gripped by the hand members 66a, 66b via the sheet 318, and as a result, each of the stress direction converters 328a, 328b is capable of converting normal stresses $F_p$ applied from the body 62 to the hand members 66a, 66b into stresses F''' having directions along the optical fiber cable 320.

Accordingly, with the robot system of FIG. 11, based on normal stresses $F_p$ detected by the pressure sensor 300 when the end effector 66 grips the body 62, the gripping force of the body 62 from the hand members 66a, 66b of the end effector 66 can be detected. Owing thereto, by controlling the hand members 66a, 66b according to the detected normal stresses $F_p$, operations can be effected, for example, whereby the body 62 is gripped with an appropriate gripping force and is transferred to a desired position without dropping the body 62.

As shown in FIG. 12, the arithmetic processing unit 80 inside the sensor controller 68 includes the normal stress calculator 86, which is constituted by the CPU of a computer. The normal stress calculator 86 calculates normal stresses $F_p$ applied to the FBG sensor 322, based on signals from the light detector 78 corresponding to the normal stresses $F_p$. Further, as a result of the normal stress calculator 86 calculating values of the normal stresses $F_p$, the gripping force of the body 62 with respect to the Z-direction can be detected.

As described above, in accordance with the FBG sensor 322, the pressure sensor 300, and the end effector 66 according to the fourth embodiment, when normal stresses $F_p$ are applied from the body 62 with respect to the FBG sensor 322 (pressure sensor 300), the stress direction converters 328a, 328b convert the normal stresses $F_p$ into stresses F''' having directions parallel to the longitudinal direction of the optical fiber cable 320, and transmit the converted stresses F''' to the gratings 324. As a result, strains are generated in the gratings 324 due to the stresses F''' whereby the wavelength (reflected wavelength) of light reflected at the gratings 324 changes. Accordingly, such normal stresses $F_p$ can be calculated by detecting the shift amount of the reflected wavelengths at the gratings 324.

In this manner, since normal stresses $F_p$ applied from the body 62 can be detected, if at least one pressure sensor 300 (FBG sensor 322) is attached to the gripping surface that grips the body 62 on the end effector 66 (hand members 66a, 66b), the normal stress $F_p$ (gripping force) applied at the gripping surface can easily be detected. As a result, costs for the end effector 66, as well as the computational processing burden and computational costs related to detection of normal stresses $F_p$, can be reduced.

More specifically, with the fourth embodiment, because normal stresses $F_p$ are capable of being detected using a single pressure sensor 300 (FBG sensor 322), compared to a structure in which multiple FBG sensors are disposed on the gripping surface and normal stresses $F_p$ are detected thereby, the fourth embodiment is excellent from a cost standpoint. Further, using only a single FBG sensor 322, the amount of signals needed for detecting normal stresses $F_p$ becomes less, and as a result, the processing burden and computational costs related to processing of such signals can be reduced.

Further, since normal stresses $F_p$ can easily be detected by mounting only a single pressure sensor 300 (FBG sensor 322) on the end effector 66, even if the end effector 66 is moved by external forces while the body 62 is being gripped thereby, slippage and dropping of the body 62 can reliably be prevented. Owing thereto, the fourth embodiment is effective at enabling automization of assembly procedures and steps, such as those used in assembly operations, like application of external forces between assembled parts, which have been problematic in the conventional art.

Further, in the case that the end effector 66 is equipped with a plurality of claws thereon, and gripping surfaces for the body 62 are formed on each of such claws, since the pressure sensor 300 (FBG sensor 322) is disposed in only one of the gripping surfaces, normal stresses $F_p$ at each of the gripping surfaces are not detected separately. However, with the fourth embodiment, the aforementioned effects can be brought about in particular with respect to controlling gripping forces imposed on the body 62, in a simple end effector 66, which is capable of gripping predetermined bodies 62 (parts).

In this manner, according to the fourth embodiment, by attaching a small number of individual FBG sensors 322 (pressure sensors 316) on the end effector 66, gripping forces (normal stresses $F_p$) of a body 62 that is gripped by the end effector 66 can easily be detected, and together therewith, the end effector 66 can be made lower in cost, and lowering of calculation processing and computational costs related to detecting such gripping forces can be realized.

Furthermore, the stress direction converters 328a, 328b are disposed respectively at locations different from the location where the gratings 324 are arrayed in the optical fiber cable 320, and additionally are disposed respectively at opposite end sides of the gratings 324 so as to sandwich the gratings 324 therebetween. Owing thereto, each of the stress direction converters 328a, 328b converts normal stresses $F_p$ into stresses F''' of a direction parallel to the longitudinal direction of the optical fiber cable 320, whereby the gratings 324 are stretched by the stresses F''', which act on the gratings 324 from opposite end sides thereof. As a result, when normal stresses $F_p$ are applied, generation of strains in the gratings 324 can be caused reliably and with good precision.

Figure 38:
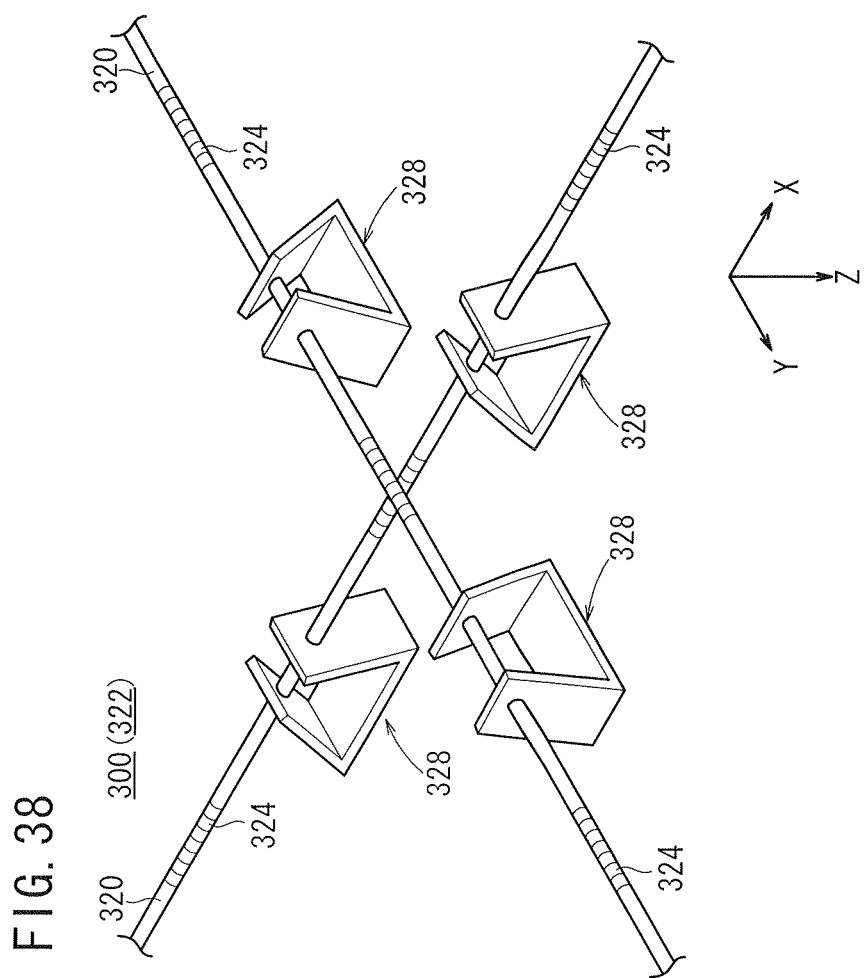
FIG. 38 is a perspective view showing a modified example of the pressure sensor of FIG. 33.
Figure 39:
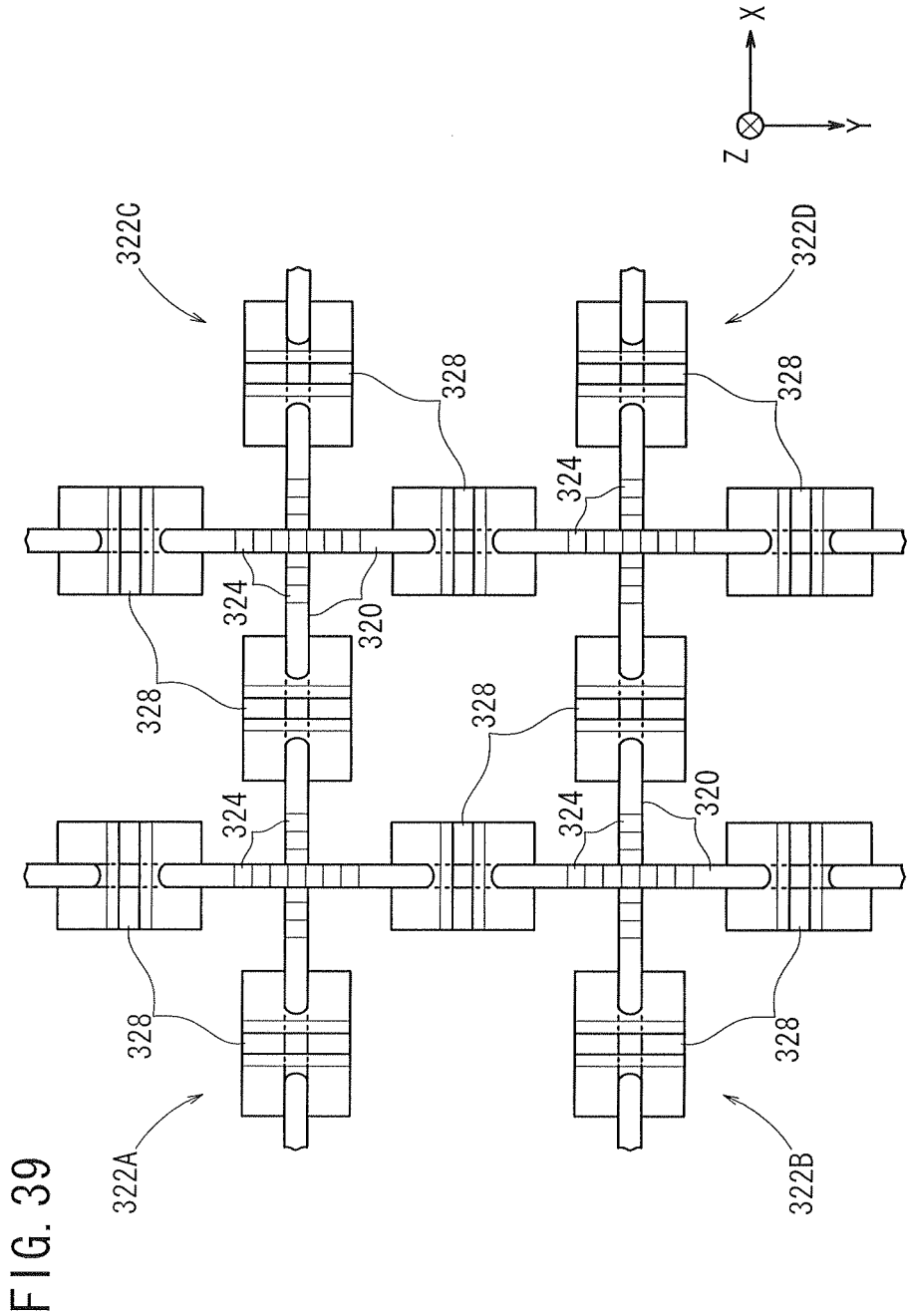
FIG. 39 is a plan view showing a modified example of the pressure sensor of FIG. 33.
Figure 40:
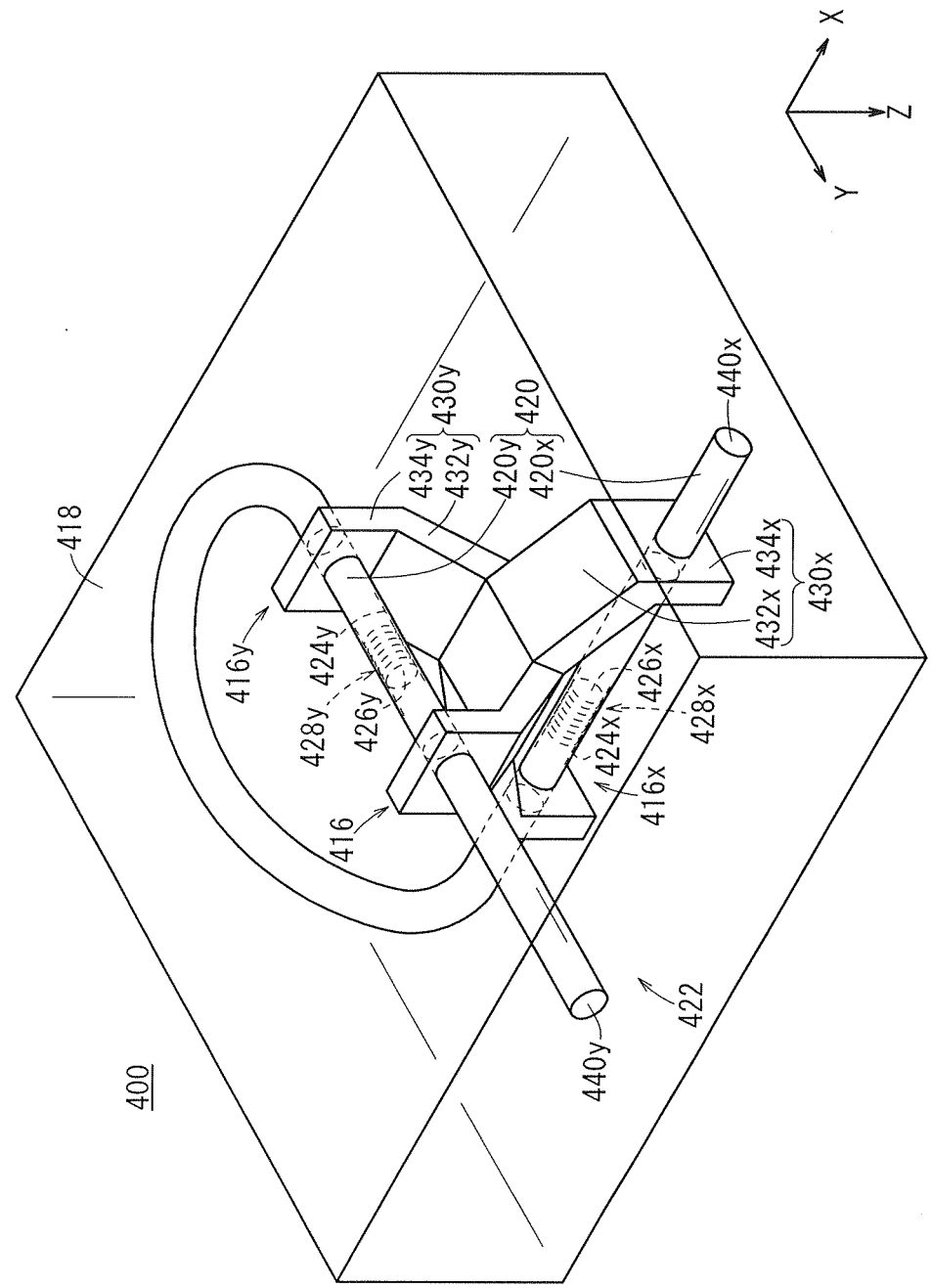
FIG. 40 is a perspective view of a pressure sensor, in which an FBG sensor according to a fifth embodiment is disposed in a sheet.

The fourth embodiment is not limited to the descriptions provided above, and can be modified as in the embodiments (modified examples) of FIGS. 38 and 39.

In the modified example of FIG. 38, two FBG sensors 322 are arranged along the X-Y plane. Further, in the modified example of FIG. 39, four FBG sensors 322A to 322D are arranged along the X-Y plane.

In these modified examples, a plurality of individual FBG sensors 322, 322A to 322D are disposed along the X-Y plane, and normal stresses $F_p$ applied to the sheet 318 are detected respectively at each of the FBG sensors 322, 322A to 322D, whereby such normal stresses $F_p$ can be detected two-dimensionally.

As noted above, in the pressure sensor 300 and FBG sensor 322 according to the fourth embodiment, or in an end effector and robot system (sensor signal processing apparatus) to which the pressure sensor 300 is applied, a comparatively simple structure is enabled, while in addition, the detection accuracy of stresses applied from a body can easily be improved.

Fifth Embodiment

Next, a pressure sensor 400 according to a fifth embodiment, and an FBG sensor 422 incorporated in such a pressure sensor 400, shall be described below with references to FIGS. 40 through 44.

As shown in FIGS. 40 to 43, in the pressure sensor 400 and FBG sensor 422 according to the fifth embodiment differs from the FBG sensor 22 and the pressure sensor 16 according to the first embodiment (see FIGS. 2 and 3), in that a first converter section 416x of a stress direction converter 416 is disposed so as to be directed in a positive Z-direction (first normal direction) from a flat portion 429, which acts as a base point, whereas a second converter section 416y thereof is disposed so as to be directed in a negative Z-direction (second normal direction) from the flat portion 429 that acts as a base point. Moreover, an optical fiber (first optical fiber) 420x is positioned at a location separated in the positive Z-direction from the flat portion 429, whereas an optical fiber (second optical fiber) 420y is positioned at a location separated in the negative Z-direction from the flat portion 429.

In the FBG sensor 422, a plurality of gratings 426 is formed in an optical fiber 420. Further, the FBG sensor 422 comprises a first stress detection sensor 428x having the optical fiber 420x in which gratings 426x are arrayed, a second stress detection sensor 428y made up from the optical fiber 420y in which gratings 426y are arrayed, and the stress direction converter 416 which converts stresses (normal stresses) applied in the Z-direction into stresses (components) of directions along the X-direction and the Y-direction, and transmits the converted stresses to the optical fibers 420x, 420y.

Additionally, in the stress direction converter 416, the first converter section 416x thereof is constructed so as to be reversed vertically, in a state of being rotated 90° about the Z-direction, from the second converter section 416y.

More specifically, the first and second converter sections 416x, 416y of the FBG sensor 422, while sharing the same flat portion 429, are disposed so as to be directed in the positive Z-direction and the negative Z-direction, respectively, in order to avoid generation of positional interference (structural interference) between the optical fibers 420x, 420y, and to avoid positional interference between the first and second converter sections 416x, 416y themselves. Accordingly the first and second converter sections 416x, 416y are capable of being constructed as elements having the same size and shape. Owing thereto, in the pressure sensor 400, the spacing between the optical fibers 420x, 420y along the Z-direction is set to be greater than the spacing between the optical fibers 20x, 20y along the Z-direction in the pressure sensor 16 according to the first embodiment.

Figure 41:
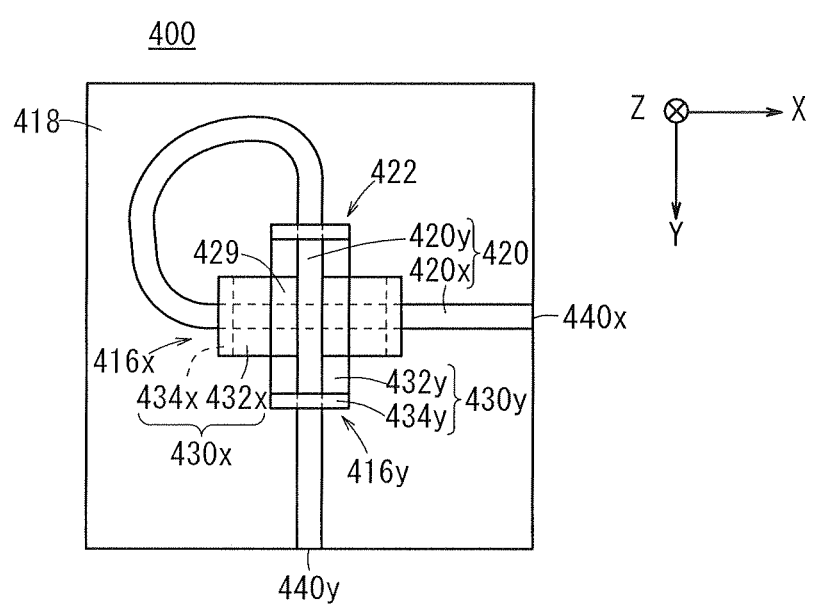
FIG. 41 is a plan view of the pressure sensor shown in FIG. 40.

Further, in the FBG sensor 422 as well, as viewed in plan, the optical fibers 420x, 420y are mutually perpendicular, and the first and second converter sections 416x, 416y also are mutually perpendicular to each other (see FIG. 41). Further, in the FBG sensor 422, the length of an inclined section 432x is defined by "c", whereas the length of an inclined section 432y is defined by "d" (see FIGS. 42A through 43B). Furthermore, in the FBG sensor 422, any of the angles defined by the flat portion 429 and the inclined sections 432x, 432y are defined by θ (see FIGS. 42A and 43A).

Next, with reference to FIGS. 42A through 44, and explanation shall be given concerning prominent effects brought about by the FBG sensor 422 when a non-illustrated body is brought into contact with a surface of the sheet above the FBG sensor 422, and normal stresses $F_p$ are detected at a time when the normal stresses $F_p$ (stresses in the positive Z-direction) are applied from the body with respect to the FBG sensor 422.

In the FBG sensor 422 as well, because the shapes of the first and second converter sections 416x, 416y before application of stresses thereto are structured symmetrically about the center of the flat portion 429, when normal stresses $F_p$ are applied from a body along the positive Z-direction to a sheet 418 (see FIG. 40) and the flat portion 429 receives such normal stresses $F_p$, at each of stress transmitting sections 430x, 430y, ideally, stresses $F_p/4$ are applied respectively in the positive Z-direction. Compared to the shapes prior to application of stresses (the shapes of FIGS. 42A, 43A and the shapes shown by the two-dot-dashed lines in FIGS. 42A, 43B), after application of stresses, the shapes of the first and second converter sections 416x, 416y become significantly deformed overall while maintaining lateral symmetry, as a result of the stresses $F_p/4$ applied thereto (the shapes shown by the solid lines in FIGS. 42B and 43B).

As a result thereof, components (forces) of the stresses $F_p/4$ in directions along the inclined sections 432x, 432y are trans-mitted respectively to each of joint sections 434x, 434y, and at each of adjoined portions between the optical fibers 420x, 420y and the joint sections 434x, 434y, forces are applied respectively based on the stresses $F_p/4$.

Figure 42A:
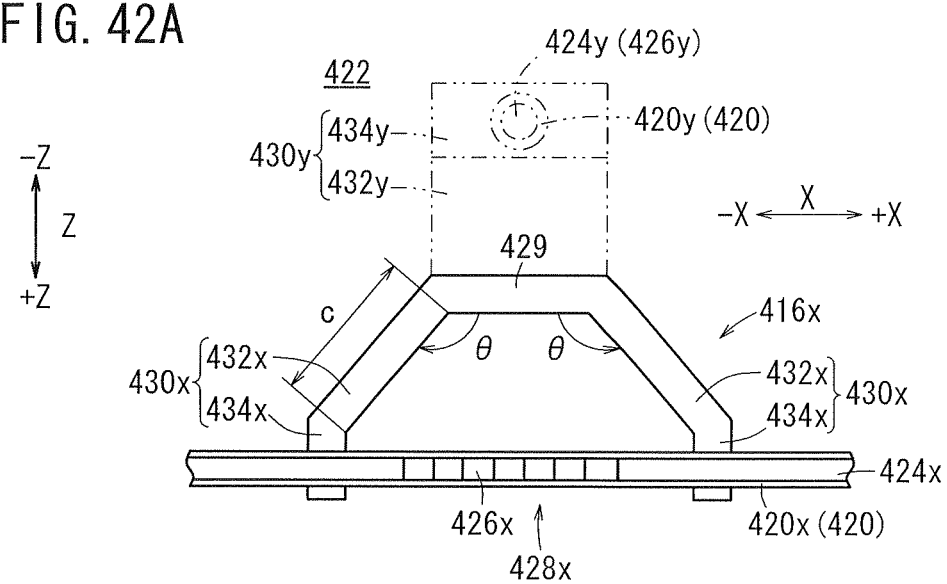
FIG. 42A and FIG. 42B are explanatory views explaining principles of detection of normal stresses by the stress detection sensor and the stress direction converter of the pressure sensor of FIG. 40, which are arranged along an X-direction.
Figure 42B:
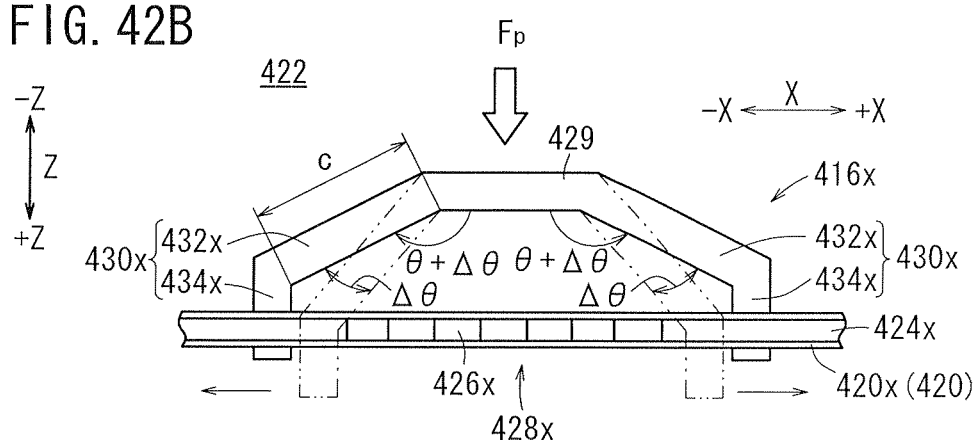
Figure 43A:
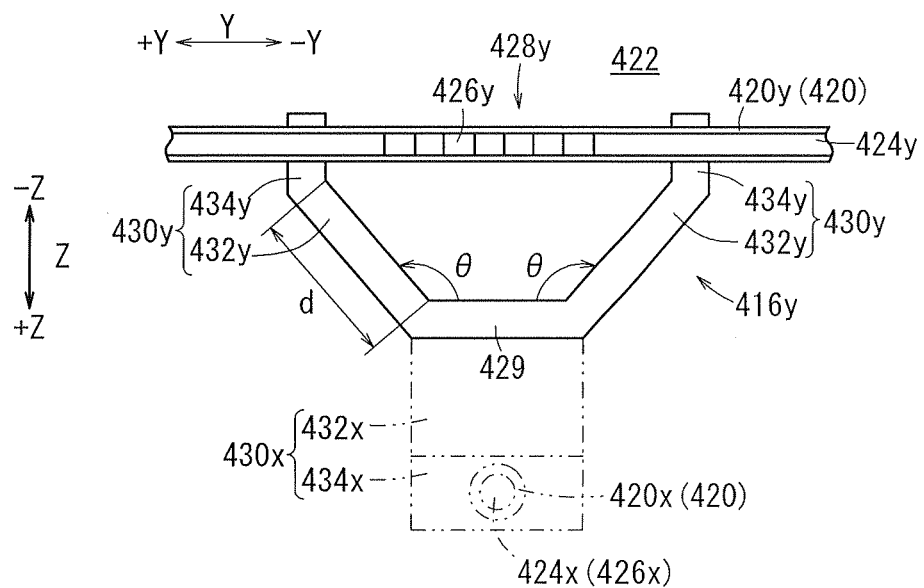
FIG. 43A and FIG. 43B are explanatory views explaining principles of detection of normal stresses by the stress detection sensor and the stress direction converter of the pressure sensor of FIG. 40, which are arranged along a Y-direction.
Figure 43B:
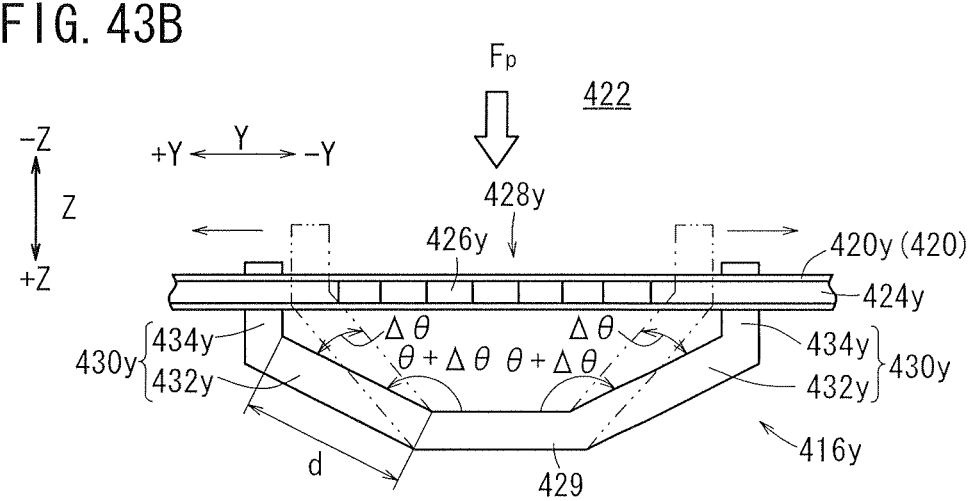

More specifically, in FIG. 42B, at the adjoined portion between the optical fiber 420x and the negative X-direction side joint section 434x, a force component is applied along the negative X-direction, whereas at the adjoined portion between the optical fiber 420x and the positive X-direction side joint section 434x, a force component is applied along the positive X-direction. Further, in FIG. 43B, at the adjoined portion between the optical fiber 420y and the positive Y-direction side joint section 434y, a force component is applied along the positive Y-direction, whereas at the adjoined portion between the optical fiber 420y and the negative Y-direction side joint section 434y, a force component is applied along the negative Y-direction.

As a result, the stress transmitting sections 430x, 430y become enlarged outwardly with respect to the flat portion 429, and the angle defined by the flat portion 429 and the inclined sections 432x, 432y increases from its initial value θ to (θ+Δθ), where Δθ represents the portion by which the angle θ increases.

Additionally, in FIG. 42B, by imposition of each of the aforementioned forces, which are applied to each of the adjoined portions, to the gratings (first gratings) 426x, the gratings 426x are subjected to strains (stretched) of substantially the same amount in positive and negative X-directions, and together therewith, the lattice spacings of the gratings 426x are changed (increased) by substantially the same amount. Further, in FIG. 43B as well, similar to the case of the gratings 426x, the gratings (second gratings) 426y are subjected to strains (stretched) of substantially the same amount in positive and negative Y-directions, and together therewith, the lattice spacings of the gratings 426y are changed (increased) by substantially the same amount.

If the strain amount along the X-direction of the gratings 426x when normal stresses $F_p$ are applied to the sheet 418 is taken as $\rho_c$, while the strain amount along the Y-direction of the gratings 426y is taken as $\rho_d$, then the strain amounts $\rho_c$, $\rho_d$ are represented respectively by the following equations (56) and (57).

$$\rho_c = c \times \cos(\pi - \Delta\theta) \tag{56}$$

$$\rho_d = d \times \cos(\pi - \Delta\theta) \tag{57}$$

In this case, since the first and second converter sections 416x, 416y of the FBG sensor 422 are substantially of the same size and have substantially the same shape, between c and d, the following relationship of equation (58) is held, and accordingly, between $\rho_c$ and $\rho_d$, the following relationship of equation (59) is held.

$$c = d \tag{58}$$

$$\rho_c = \rho_d \tag{59}$$

If the amount of change in the lattice spacing of the gratings 426x caused by the strain amount $\rho_c$ is taken as $\Delta_{\rho c}$, while the amount of change in the lattice spacing of the gratings 426y caused by the strain amount $\rho_d$ is taken as $\Delta_{\rho d}$, the following relationship shown by equation (60) is held between $\Delta_{\rho c}$ and $\Delta_{\rho d}$.

$$\Delta_{\rho d} = \Delta_{\rho d} \tag{60}$$

Accordingly, if the wavelength shift amounts in the gratings 426x, 426y of the FBG sensor 422 are taken as $\Delta\lambda_c$ and $\Delta\lambda_d$, then each of the shift amounts $\Delta\lambda_c$, $\Delta\lambda_d$ is represented respectively by the following equations (61) and (62).

$$\Delta\lambda_c = 2 \times n_{\mathit{eff}} \times \Delta_{\rho c} \quad (61)$$

$$\Delta\lambda_d = 2 \times n_{\mathit{eff}} \times \Delta_{\rho d} \quad (62)$$

In this case, from equations (60) through (62), the following relationship of equation (63) is held between $\Delta\lambda_c$ and $\Delta\lambda_d$.

$$\Delta\lambda_c = \Delta\lambda_d \quad (63)$$

Figure 44:
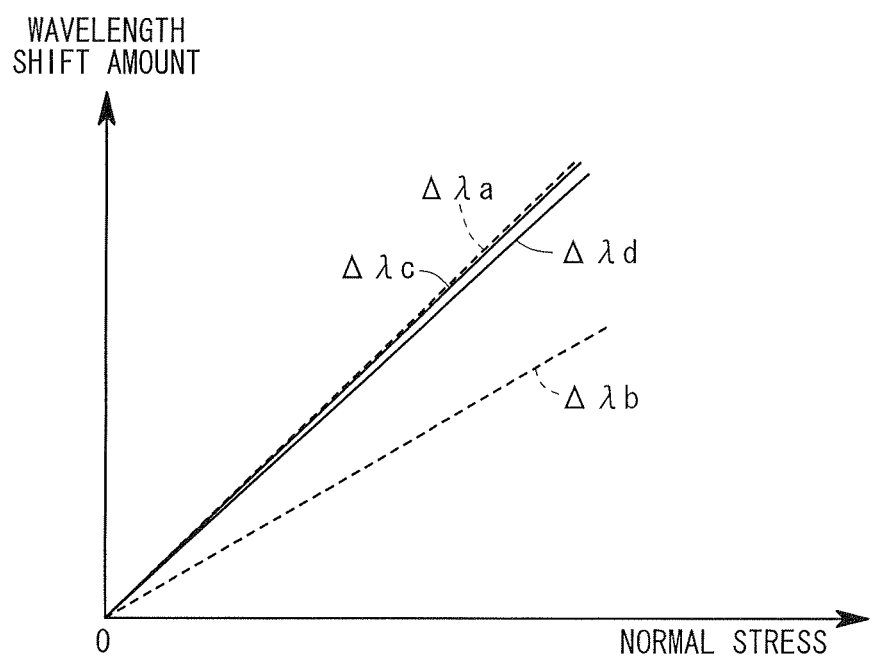
FIG. 44 is a graph showing the relationship between normal stresses and a shift amount of reflected wavelengths by the pressure sensor of FIG. 40.

FIG. 44 is a graph showing the relationship between normal stresses $F_p$ in the FBG sensor 422 and wavelength shift amounts $\Delta\lambda_c$, $\Delta\lambda_d$.

As discussed previously, with the FBG sensor 422 according to the fifth embodiment, in order that generation of positional interference between the optical fibers 420x, 420y, as well as generation of positional interference between the first and second converter sections 416x, 416y are avoided, the first and second converter sections 416x, 416y share the common flat portion 429, and the first converter section 416x is disposed so as to be directed in a positive Z-direction from the flat portion 429, which acts as a base point, whereas the second converter section 416y is disposed so as to be directed in a negative Z-direction from the flat portion 429, which acts as a base point. Owing thereto, inside the FBG sensor 422, the first and second converter sections 416x, 416y are capable of being constructed as elements having the same size and shape without causing mutual interference therebetween.

Owing thereto, even in the case that normal stresses $F_p$ are applied from the exterior to the FBG sensor 422, the difference between wavelength shift amounts $\Delta\lambda_c$, $\Delta\lambda_d$ of the gratings 426x, 426y can be alleviated (made small) (see FIG. 44). As a result, values of the normal stresses $F_p$ can be calculated, without carrying out corrective processing with respect to each of the wavelength shift amounts $\Delta\lambda_c$, $\Delta\lambda_d$. Moreover, in FIG. 44, for purposes of comparison with the fifth embodiment, results of the FBG sensor 22 according to the first embodiment also are shown by dashed lines, in which the wavelength shift amounts $\Delta\lambda_a$, $\Delta\lambda_b$ in FIG. 44 correspond to $\Delta\lambda_{ax}$, $\Delta\lambda_{ay}$ shown in FIG. 6, and an error in the wavelength shift amounts $\Delta\lambda_{ax}$, $\Delta\lambda_{ay}$ is shown.

In addition, with the FBG sensor 422 according to the fifth embodiment, the stress detection sensors 428x, 428y (optical fibers 420x, 420y) are disposed respectively at a location separated from the flat portion 429 along the positive Z-direction, and at a location separated from the flat portion 429 along the negative Z-direction. Owing thereto, the first and second converter sections 416x, 416y can be constructed easily as elements having the same size and shape, and together therewith, the difference between the wavelength shift amounts $\Delta\lambda_c$, $\Delta\lambda_d$ of the gratings 426x, 426y can further be alleviated. Further, by bridging the interval between the flat portion 429 and the optical fibers 420x, 420y by the stress transmitting sections 430x, 430y, normal stresses $F_p$ are can be converted efficiently into stresses in the X-direction and the Y-direction, and the converted stresses can be transmitted effectively to each of the gratings 426x, 426y.

As noted above, in the pressure sensor 400 and FBG sensor 422 according to the fifth embodiment, or in an end effector and robot system (sensor signal processing apparatus) to which the pressure sensor 400 is applied, a comparatively simple structure is enabled, while in addition, the detection accuracy of stresses applied from a body can easily be improved.

Sixth Embodiment

A pressure sensor 500 according to a sixth embodiment, and an FBG sensor 522 incorporated in such a pressure sensor 500, shall be described below with references to FIGS. 45 through 47.

In the pressure sensor 500 and FBG sensor 522 according to the sixth embodiment, the shape of a stress direction converter 530 is different from the shape of the stress direction converter 29 of the pressure sensor 16 and FBG sensor 22 according to the first embodiment. The stress direction converter 530, in a condition of being disposed in a sheet 518, is reversed vertically (in the Z-direction) from the stress direction converter 29 of the first embodiment (see FIG. 45). However, in the event that stresses F are applied to the stress direction converter 530 via the sheet 518, it is a matter of course that the direction and size of the stresses F that are converted is the same as in the stress direction converter 29 of the first embodiment.

Figure 45:
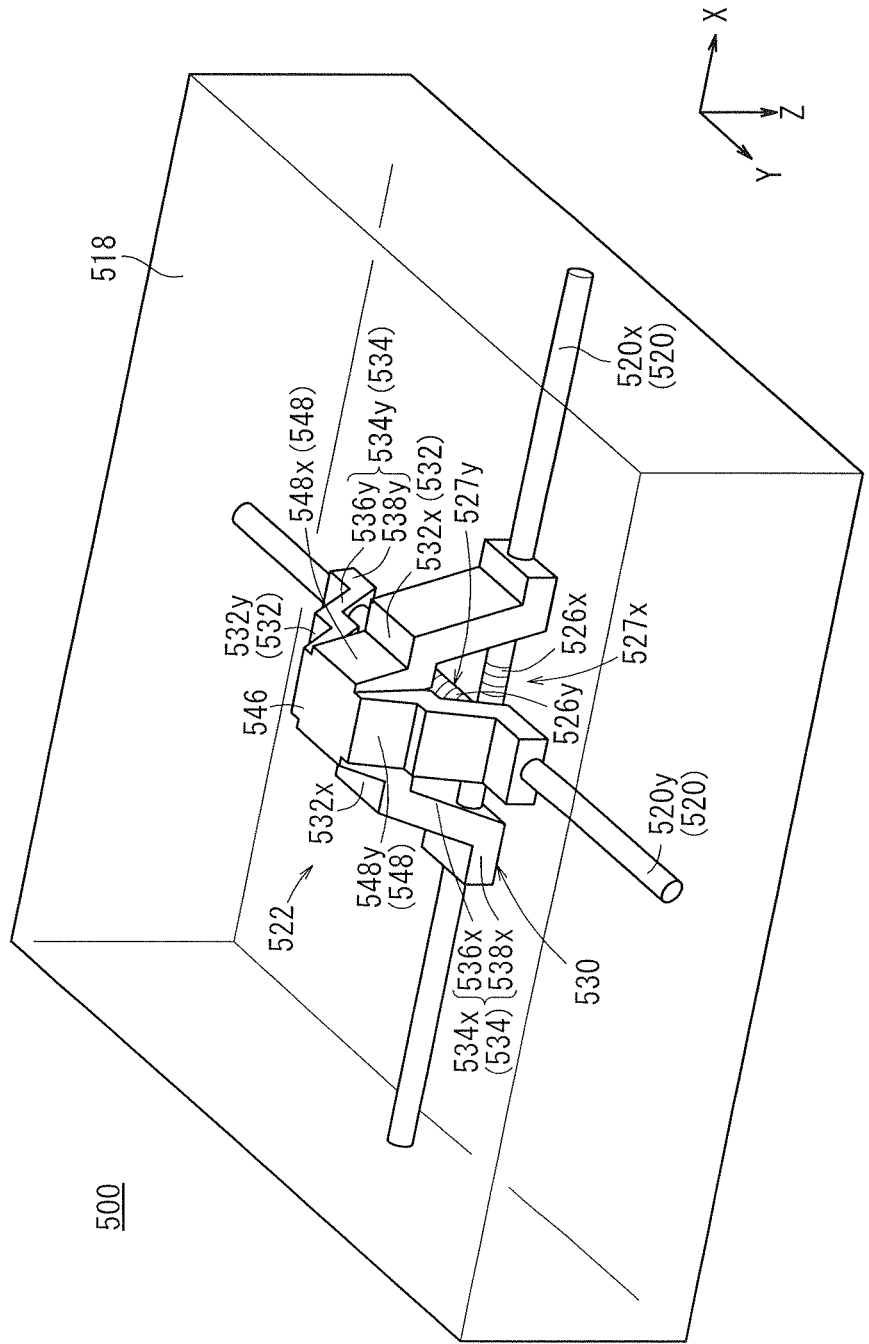
FIG. 45 is a perspective view of a pressure sensor, in which an FBG sensor according to a sixth embodiment is disposed in a sheet.

As shown in FIG. 45, in the pressure sensor 500, an optical fiber cable 520 (first and second optical fibers 520x, 520y) is embedded inside a flexible sheet 518 along a surface direction (X-Y direction) of the sheet 518. In this case, the optical fiber 520x and the optical fiber 520y extend along the X-direction and the Y-direction respectively at mutually different heights. On the other hand, as viewed in plane, an FBG sensor 522 is disposed at a location where the optical fiber 520x and the optical fiber 520y intersect at right angles. More specifically, in the sheet 518, the optical fiber cables 520 and the FBG sensor 522 are formed by molding from materials having flexibility such as plastics or the like.

Further, in FIG. 45, although a case is shown in which a single FBG sensor 522 is arranged in the sheet 518, the number of FBG sensors 522 embedded in the sheet 518 is not limited to one.

Multiple gratings 526 (526x, 526y) having mutually different lattice spacings and reflective wavelengths are formed in a core 524 of the optical fiber cable 520. With the sixth embodiment, at the location where the FBG sensor 522 is disposed, the optical fiber cable 520 is embedded inside the sheet 518 such that, as viewed in plan, one of the gratings 526x and one of the gratings 526y intersect each other at right angles.

The FBG sensor 522 comprises a first stress detection sensor 527x including an optical fiber 520x in which gratings 526x are arrayed, a second stress detection sensor 527y including an optical fiber 520y in which gratings 526y are arrayed, and a stress direction converter 530 for converting stresses (normal stresses) applied in the Z-direction into stresses (components) of directions along the X-direction and the Y-direction, and transmitting the converted stresses to the optical fibers 520x, 520y.

The stress direction converter 530 is made from an elastic body of rubber, resin or the like, and comprises a first flat portion 546 that extends in a direction parallel to the longitudinal directions (X-Y directions) of the optical fiber cable 520 and to which stresses are applied in directions that are different from the longitudinal directions of the optical fiber cables 520, second flat portions 532 having planes that differ in height from the plane of the first flat portion 546, first stress transmitting sections 548 that are bridged from the first flat portion 546 to the second flat portion 532, and second stress transmitting section 534 that are bridged from the second flat portions 532 to the optical fiber cables 520.

Further, the second flat portions 532, the first stress transmitting sections 548, and the second stress transmitting section 534 include second flat portions 532x, first stress transmitting sections 548x, and second stress transmitting sections 534x, which collectively are bridged from two confronting sides of the first flat portion 546 to respective ends of the gratings 526x, and further include second flat portions 532y, first stress transmitting sections 548y, and second stress transmitting sections 534y, which collectively are bridged from two other confronting sides of the first flat portion 546 to respective ends of the gratings 526y.

The mutually confronting two second stress transmitting sections 534x each include respectively an inclined section 536x joined to the second flat portion 532x and which is inclined toward the optical fiber 520x, and a joint section 538x connected to the inclined section 536x and which partially surrounds an outer circumferential surface of the optical fiber 520x. In this case, as shown in FIG. 46, the angles formed by each of the inclined sections 536x and each of the joint sections 538x are set equal to each other.

On the other hand, similar to the second stress transmitting sections 534x, the mutually confronting two second stress transmitting sections 534y each include respectively an inclined section 536y joined to the second flat portion 532y and which is inclined toward the optical fiber 520y, and a joint section 538y connected to the inclined section 536y and which partially surrounds an outer circumferential surface of the optical fiber 520y. Also, the angles formed by each of the inclined sections 536y and each of the joint sections 538y are set equal to each other.

Figure 46:
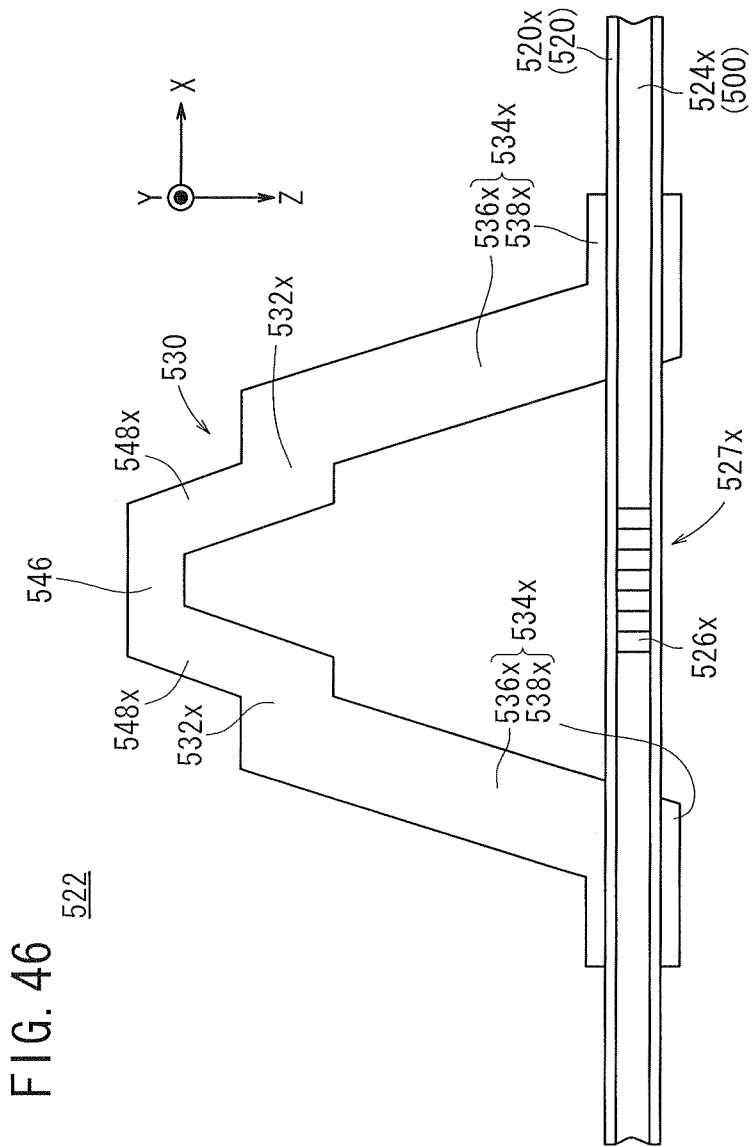
FIG. 46 is an outline explanatory view of the FBG sensor of FIG. 45.
Figure 47:
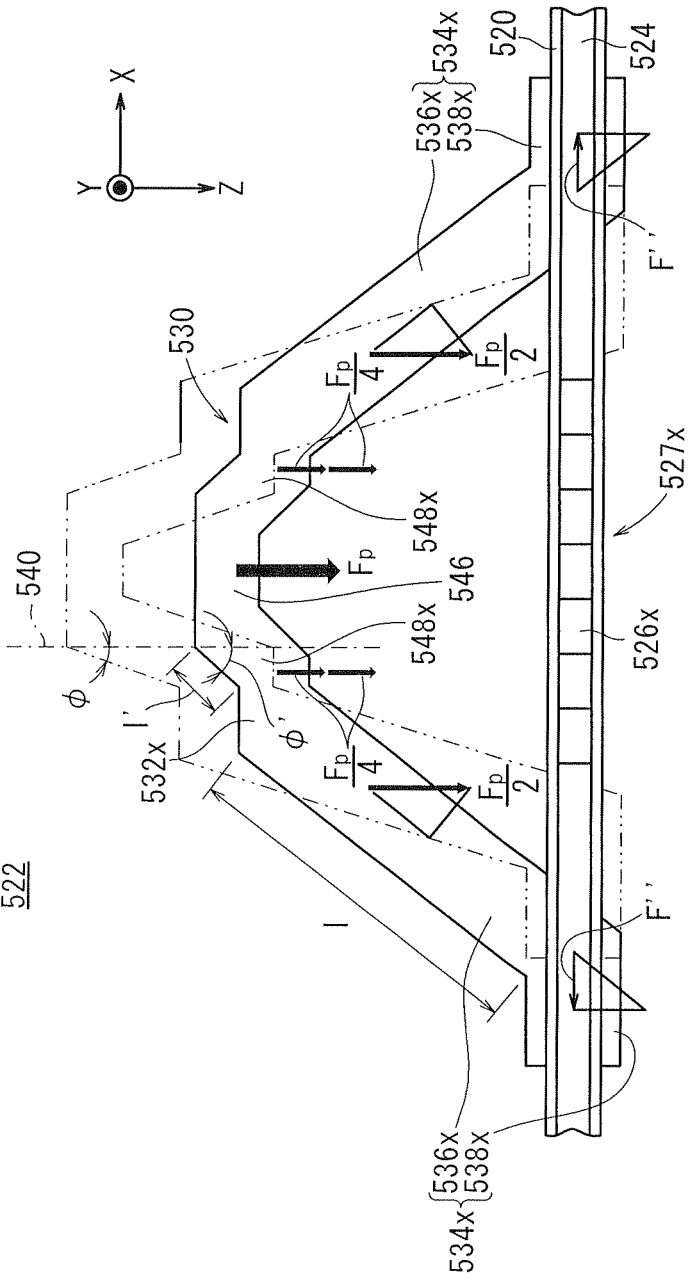
FIG. 47 is an explanatory view for explaining principles of detection of normal stresses by the FBG sensor of FIGS. 45 and 46.

Next, with reference to FIGS. 46 and 47, explanations shall be given concerning detection of normal stresses when a non-illustrated body comes into contact with a surface of the sheet 518 above the FBG sensor 522, and normal stresses (stresses along the Z-direction) are imposed on the gratings 526 from the body with respect to the FBG sensor 522. Below, for purposes of simplification, detailed explanations shall be given only concerning imposition of normal stresses with respect to the gratings 526x of the first optical fiber 520x. Thus, in FIGS. 46 and 47, the optical fiber 520y disposed along the Y-direction, the second flat portion 532y, the first stress transmitting section 548y, and the second stress transmitting section 534y have been omitted from illustration.

As shown in FIGS. 45 through 47, since the shape of the stress direction converter 530 prior to application of stresses is of a structure having right-left (lateral) symmetry about the center of the gratings 526x or the gratings 526y, when normal stresses $F_p$ are applied from a body along the Z-direction to the sheet 518, the normal stresses $F_p$ are received respectively by the first flat portion 546 and the second flat portions 532 of the stress direction converter 530.

Consequently, at the first stress transmitting sections 548x, ideally, stresses $F_p/4$ along the Z-direction are applied, which are caused by the normal stress $F_p$ applied to the first flat portion 546. As a result, compared to the shape prior to application of stresses (i.e., the shape shown in FIG. 46 and shown by the two-dot-dashed line of FIG. 47), after application of stresses, the shape of the stress direction converter 530 acquires a laterally symmetric modified shape (i.e., as shown by the solid lines in FIG. 47) due to the stresses $F_p/4$. Additionally, components (forces) of the stresses $F_p/4$ along the first stress transmitting sections 548x are transmitted respectively to the inclined sections 536x of the second stress transmitting sections 534x.

Further, since the normal stress $F_p$ also is applied to the second flat portions 532x, to each of the second stress transmitting sections 534x, a stress $F_p/4$ along the Z-direction caused by the normal stress $F_p$ applied to the second flat portion 532x, and a stress $F_p/4$ along the Z-direction caused by a force having a direction along the first stress transmitting section 548x are applied respectively. Stated otherwise, at the second stress transmitting sections 534x, ideally, stresses $F_p/2$ (=$F_p/4+F_p/4$) along the Z-direction are applied, respectively.

In this manner, by providing the first and second flat portions 546, 532, the shape of the stress direction converter 530 after application of stresses thereto, in comparison with the shape prior to application of stresses (i.e., the shape shown in FIG. 46 and shown by the two-dot-dashed line of FIG. 47), the stress F, which is due to the stresses $F_p/4$ caused by the normal stress $F_p$ applied to the second flat portions 532 as well as the stresses $F_p/4$ caused by the normal stress $F_p$ applied to the first flat portion 546, acts on the stress direction converter 530, whereby a laterally symmetric largely deformed shape results (i.e., the shape shown by the solid lines in FIG. 47). More specifically, compared to the FBG sensor 22 according to the first embodiment, because the stresses in the Z-direction applied to the second stress transmitting sections 534x ideally are increased by two times from $F_p/4$ to $F_p/2$, overall, the stress direction converter 530 can be deformed more significantly.

Components (forces) of the stress $F_p$ along the Z-direction, in directions along the inclined sections 536x, are transmitted to the joint sections 538x, whereby in each of the adjoined portions between the optical fiber cable 520 and each of the joint sections 538x, forces F" (i.e., components along the X-direction of forces having directions along the inclined sections 536x) based on the stress $F_p$ are applied respectively. Accordingly, the forces F" applied to each of the adjoined sections are imposed on the gratings 526x, whereby the gratings 526x are subjected to large strains (stretching) in the X-direction, and the lattice spacing of the gratings 526x is increased to a large degree.

Accordingly, with the pressure sensor 500 and the FBG sensor 522 according to the sixth embodiment, compared to the pressure sensor 16 and the FBG sensor 22 according to the first embodiment, the reflected wavelength shift amount from $\lambda_A$ to $\lambda_B$ in the gratings 526x can reliably be made greater.

Next, using mathematical formulas, explanations shall be made in greater detail concerning the increase in the shift amount according to the sixth embodiment.

If the angle defined by a straight line 540 along the direction of the arrow Z and the first stress transmitting section 548x prior to application of stresses is taken as φ, whereas the angle defined by the straight line 540 and the first stress transmitting section 548x after application of stresses is taken as φ', then the increment 4 in the angle due to application of normal stresses $F_p$ to the first flat portion 546 is represented by the following equation (64).

$$\Delta\phi=\phi'-\phi \tag{64}$$

Further, if the length of the first stress transmitting sections 548 is taken as l', the deformation amount in the X-direction of the FBG sensor 522 to which the angle increment Δφ is imparted is represented by the following formula (65).

$$2\times l'\times\sin(\Delta\phi) \tag{65}$$

Furthermore, if the grating number of the gratings 526x is taken as N, the increment Δλ' in the reflected wavelength shift amount from $\lambda_A$ to $\lambda_B$ due to the angle increment Δφ is represented by the following equation (66).

$$\Delta\lambda'=\lambda'_B-\lambda_A=2\times n_{\text{eff}}\times\{2\times l'\times\sin(\Delta\phi)/N\} \tag{66}$$

Accordingly, the reflected wavelength shift amount from $\lambda_A$ to $\lambda_B$ in the sixth embodiment is represented by the following formula (67).

$$\Delta\lambda+\Delta\lambda' \tag{67}$$

More specifically, by providing the first and second flat portions 546, 532x, because the shift amount in the gratings 526x is increased by Δλ', the detection sensitivity with respect to normal stresses $F_p$ can be enhanced.

As described above, in accordance with the pressure sensor 500 and the FBG sensor 522 according to the sixth embodiment, in the case that stresses (normal stresses $F_p$ applied in the Z-direction) of a direction different from the longitudinal direction (X-direction) of the optical fiber 520*x* are applied from a body to the stress direction converter 530, such normal stresses $F_p$ are applied respectively to the first and second flat portions 546, 532*x*. Owing thereto, a stress direction converter 530*x* overall is deformed to a large degree by the normal stress $F_p$ applied to the first flat portion 546, and the normal stress $F_p$ applied to the second flat portions 532*x*.

Further, the normal stress $F_p$, which is applied respectively to the first and second flat portions 546, 532*x*, is converted into stresses in the X-direction by the stress direction converter 530*x*, and the stresses after conversion (the forces F") are transmitted to the gratings 526 via the second stress transmitting sections 534*x*.

As a result thereof, because large strains are generated in the gratings 526*x*, and the wavelength of light (reflected wavelength) reflected by the gratings 526*x* changes to a large degree, by detecting the reflected wavelength shift amount of the gratings 526*x*, normal stresses $F_p$ can easily be detected.

Further, in the above explanations, it has been described that normal stresses $F_p$ are detected by the second flat portion 532*x*, the first stress transmitting sections 548*x* and the second stress transmitting sections 534*x*, which are bridged over respective ends of the gratings 526*x*. However, it is a matter of course that detection of normal stresses $F_p$ can also be performed by the second flat portion 532*y*, the first stress transmitting sections 548*y* and the second stress transmitting sections 534*y*, which are bridged over respective ends of the gratings 526*y*.

In this manner, with the sixth embodiment, by forming the first and second flat portions 546, 532 in the stress direction converter 530, compared to the stress direction converter 29 of the first embodiment, the amount at which the stress direction converter 530 is deformed can be made large, and strains in the gratings 526 also can be made large. As a result, the reflected wavelength shift amount can be increased to a large degree, and detection sensitivity of normal stresses $F_p$ can easily be improved.

As noted above, in the pressure sensor 500 and FBG sensor 522 according to the sixth embodiment, or in an end effector and robot system (sensor signal processing apparatus) to which the pressure sensor 500 is applied, a comparatively simple structure is enabled, while in addition, the detection accuracy of stresses applied from a body can easily be improved.

Seventh Embodiment

Next, a pressure sensor 600 according to a seventh embodiment, and an FBG sensor 622 incorporated in such a pressure sensor 600, shall be described below with references to FIGS. 48 through 50.

Figure 48:
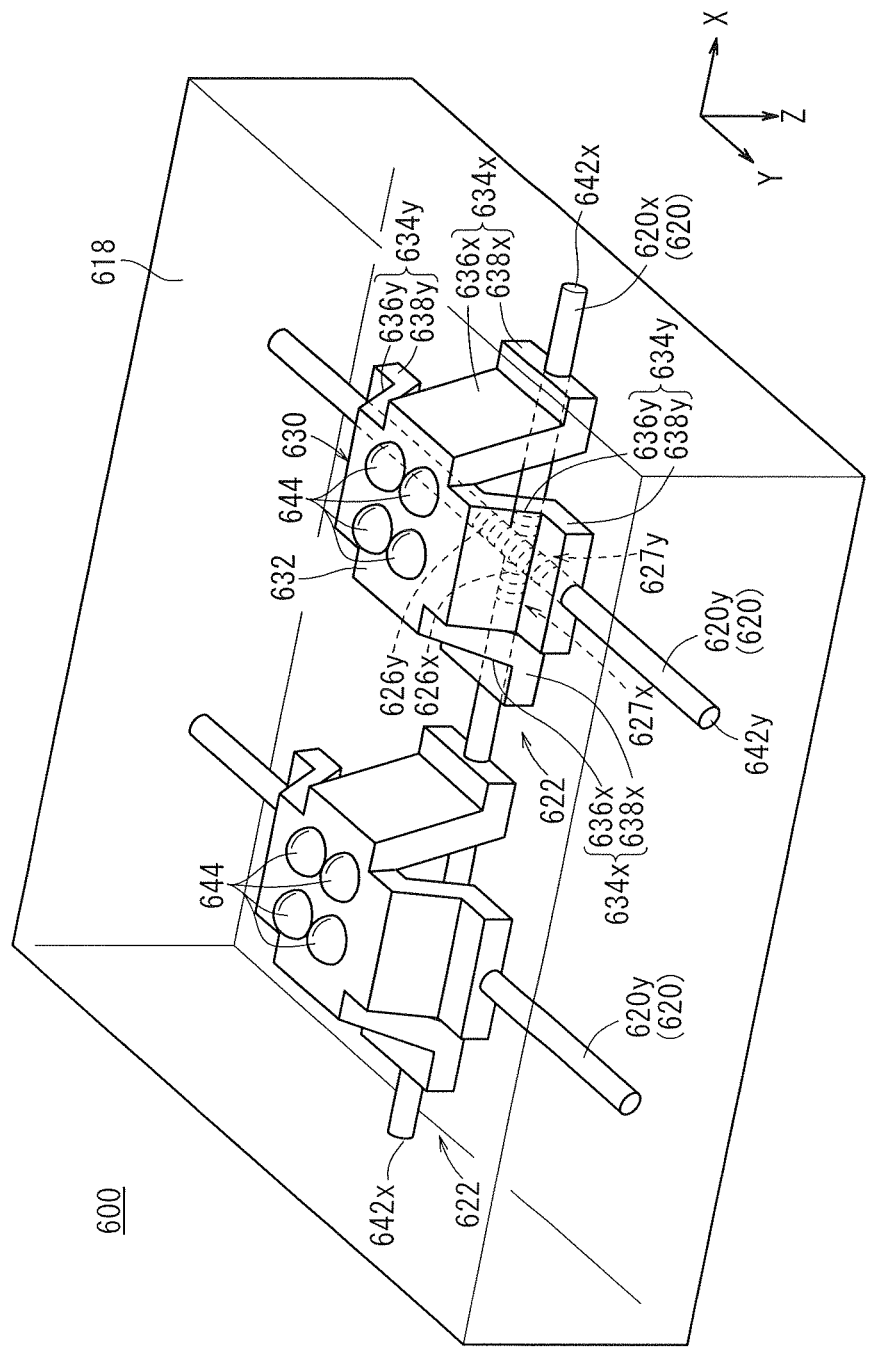
FIG. 48 is a perspective view of a pressure sensor, in which FBG sensors according to a seventh embodiment are disposed in a sheet.

As shown in FIG. 48, in the pressure sensor 600, a single optical fiber 620*x* having a longitudinal direction in the X-direction, and a single optical fiber 620*y* having a longitudinal direction in the Y-direction are embedded in a flexible sheet 618. In this case, concerning the optical fibers 620 (620*x*, 620*y*), the optical fiber 620*x* and the optical fiber 620*y* extend in the X-direction and the Y-direction at mutually different heights. However, on the other hand, as viewed in plan, an FBG sensor 622 is disposed at a location where the optical fiber 620*x* and the optical fiber 620*y* intersect at right angles. More specifically, the sheet 618 is formed by molding the FBG sensor 622 from materials having flexibility, such as plastics or the like.

Further, although in FIG. 48 a case is shown in which two FBG sensors 622 are disposed in the sheet 618, the number of FBG sensors 622 embedded in the sheet 618 is not limited to two.

A plurality of gratings 626 (626*x*, 626*y*) having lattice spacings and reflective wavelengths mutually different from each other are formed in a core 624 of the optical fibers 620*x*, 620*y*. With the seventh embodiment, the optical fibers 620*x*, 620*y* are embedded in the interior of the sheet 618, such that at a location where the FBG sensor 622 is disposed, one of the gratings 626*x* and one of the gratings 626*y* intersect each other at right angles as viewed in plan.

The FBG sensor 622 comprises a first stress detection sensor 627*x* having the optical fiber 620*x* in which the gratings 626*x* are arrayed, a second stress detection sensor 627*y* having the optical fiber 620*y* in which the gratings 626*y* are arrayed, and a stress direction converter 630 for converting stresses (normal stresses) applied in the Z-direction into stresses (components) of directions along the X-direction and the Y-direction, and transmitting the converted stresses to the optical fibers 620*x*, 620*y*.

In this case, the stress direction converter 630, which acts as a reception sensitive material with respect to external stresses, is made from an elastic material such as rubber, resin or the like, and includes a rectangular flat portion 632 that extends in parallel to the gratings 626*x*, 626*y* along the X-Y direction, stress transmitting sections 634*x* that are bridged respectively from two confronting sides of the flat portion 632 in the X-direction to each of ends of the gratings 626*x*, and stress transmitting sections 634*y* that are bridged respectively from two other confronting sides of the flat portion 632 in the Y-direction to each of ends of the gratings 626*y*.

A plurality of hemispherical shaped projections 644 is formed on the upper surface of the flat portion 632. Each of the projections 644 is arranged in a state of being separated predetermined intervals from each other in the X-direction and the Y-direction.

Figure 49:
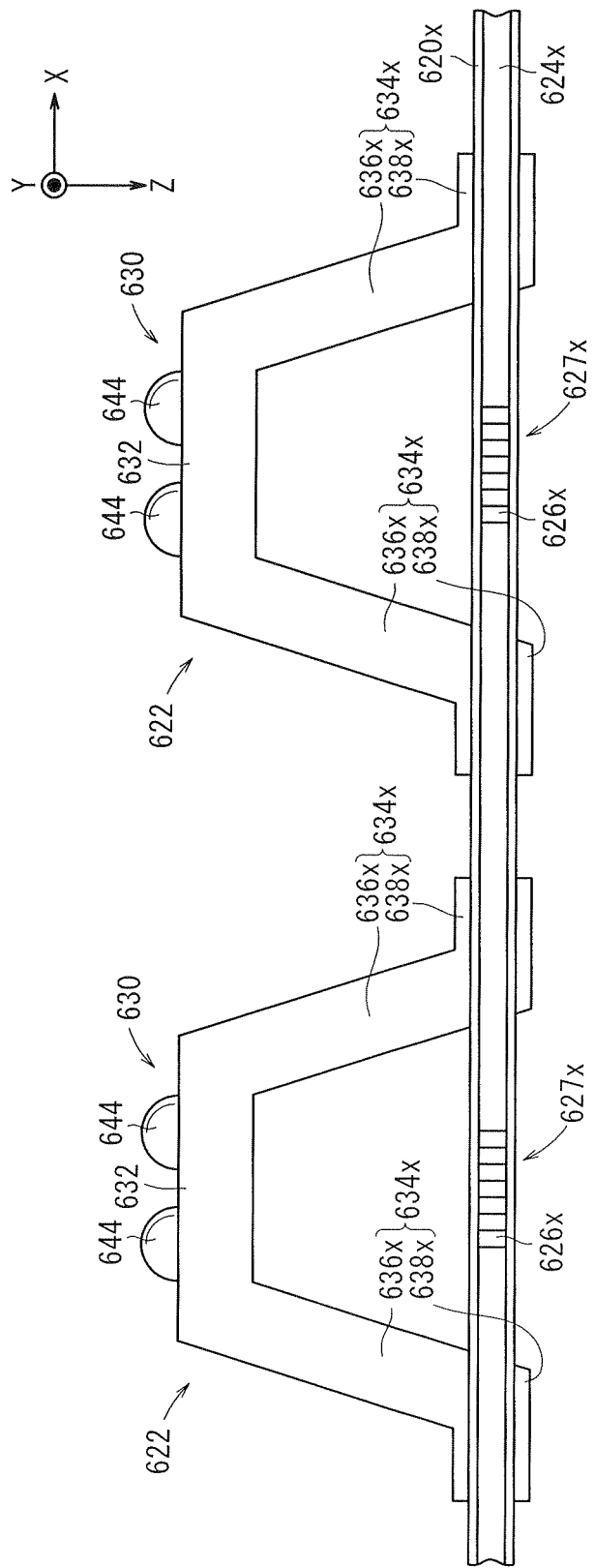
FIG. 49 is an outline explanatory view of the FBG sensor of FIG. 48.
Figure 50:
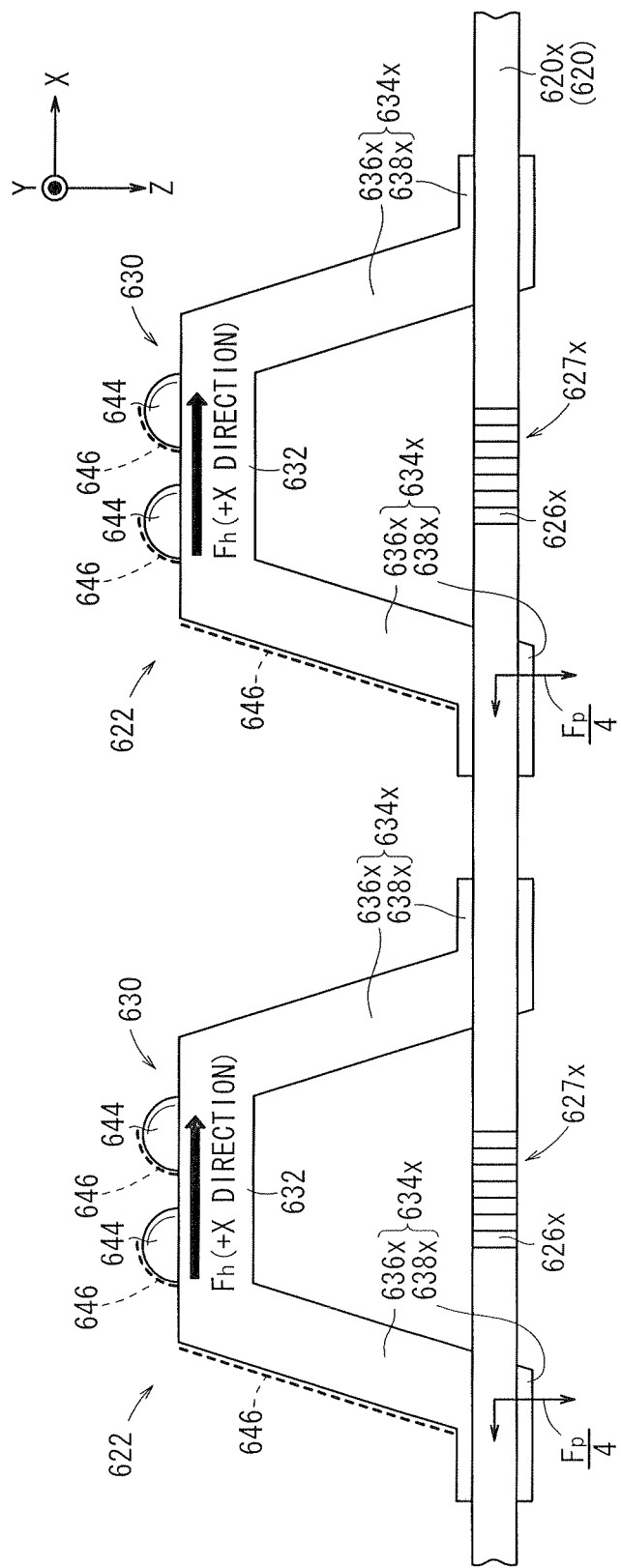
FIG. 50 is an explanatory view for explaining principles of detection of horizontal stresses by the FBG sensor of FIGS. 48 and 49.

In FIGS. 48 to 50, four hemispherical shaped projections 644 are formed on the flat portion 632. However, the present invention is not limited to this example, and the number of projections 644 may be less than or greater than four.

In a state when stresses are not applied thereto, the stress direction converter 630 is constructed with right-left (lateral) symmetry, and the gratings 626*x*, 626*y* are disposed centrally therein. More specifically, the stress transmitting sections 634*x* each include, respectively, an inclined section 636*x*, which is joined to the flat portion 632 and inclined toward the optical fiber 620*x* (in the vicinity of both end sides of the gratings 626*x*), and a joint section 638*x* connected to the inclined section 636*x* and which surrounds a portion of the outer circumferential surface of the optical fiber 620*x*. On the other hand, the stress transmitting sections 634*y* each include, respectively, an inclined section 636*y*, which is joined to the flat portion 632 and inclined toward the optical fiber 620*y* (in the vicinity of both end sides of the gratings 626*y*), and a joint section 638*y* connected to the inclined section 636*y* and which surrounds a portion of the outer circumferential surface of the optical fiber 620*y*.

Further, as shown in FIGS. 49 and 50, the angles defined between the flat portion 632 and each of the inclined sections 636*x* are set equal to each other, and also, the angles defined between each of the inclined sections 636*x* and the joint sections 638*x* are set equal to each other. Similarly, the angles defined between the flat portion 632 and each of the inclined sections 636*y* are set equal to each other, and also, the angles defined between each of the inclined sections 636*y* and the joint sections 638*y* are set equal to each other. (In FIGS. 49 and 50, the optical fiber 620y disposed along the Y-direction and the stress transmitting sections 634y have been omitted from illustration.)

As shown in FIG. 48, on two opposing side surfaces of the sheet 618 in the X-direction, input/output terminals 642x of the optical fiber 620x, which are capable of receiving light incident thereon as well as emitting light, are exposed respectively to the exterior. Also, on two opposing side surfaces of the sheet 618 in the Y-direction, input/output terminals 642y of the optical fiber 620y, which are capable of receiving light incident thereon as well as emitting light, are exposed respectively to the exterior.

When a non-illustrated body comes into contact via the sheet 618 with respect to the pressure sensor 600 and the FBG sensor 622, and normal stresses (stresses along the Z-direction) are applied from the body to the gratings 626, the normal stresses can be detected by means of the same method for detecting normal stresses of the FBG sensor 22 according to the first embodiment. Thus, in the FBG sensor 622 of the seventh embodiment, explanations concerning the detection of normal stresses have been omitted.

Further, when a non-illustrated body comes into contact via the sheet 618 with respect to the pressure sensor 600 and the FBG sensor 622, and horizontal stresses (stresses in the X-direction) are applied from the body to the two gratings 626, such horizontal stresses can also be detected by means of the same method for detecting horizontal stresses of the two FBG sensors 22A, 22C according to the first embodiment.

However, the stress direction converter 630 of the seventh embodiment differs from the stress direction converter 29 of the first embodiment, in that the aforementioned projections 644 are provided. The projections 644 can improve the detection sensitivity of horizontal stresses $F_h$. More specifically, in the case that stresses, which are applied from the body to the sheet 618, are detected by the FBG sensor 622 and the pressure sensor 600, if the detection area and deformation amount of the detection surface (reaction surface) with respect to such stresses is made greater, then the detection sensitivity of the stresses is improved.

In the case that normal stresses $F_p$ applied to the sheet 618 are detected on a detection surface (i.e., an upper surface or the like of the flat portion 632 on the stress direction converter 630), which is perpendicular to the normal stresses $F_p$, because the detection surface for the normal stresses $F_p$ is formed along a surface direction (X-Y direction) of the sheet 618, the detection area and deformation amount of the detection surface can easily be made large.

In contrast thereto, in the case that horizontal stresses $F_h$ applied to the sheet 618 are detected on the flat portion 632, because the detection surface (a side surface of the like of the flat portion 632) for the horizontal stresses $F_h$ is formed along the thickness direction of the sheet 618, in comparison with the detection surface for normal stresses $F_p$, the detection area and deformation amount cannot easily be made large. Accordingly, it is problematic to improve the detection sensitivity of horizontal stresses $F_h$.

Consequently, in the seventh embodiment, multiple hemispherical shaped projections 644 are formed on the upper surface of the flat portion 632, whereby, for example, as shown in FIG. 50, in the case that horizontal stresses $F_h$ in a positive X-direction are applied to the flat portion 632, not only the left side surfaces (side surfaces that confront the horizontal stresses $F_h$) of the flat portion 632 and the inclined section 636, but also left side surfaces of each of the projections 644 can be utilized as detection surfaces 646 with respect to such horizontal stresses $F_h$. As a result, the detection area and deformation amount with respect to horizontal stresses $F_h$ is made greater, and detection sensitivity can be enhanced.

As described above, according to the FBG sensor 622 and pressure sensor 600 of the seventh embodiment, when horizontal stresses $F_h$ are applied from the body to the flat portion 632 via the sheet 618, the flat portion 632 is displaced in a direction along the flat portion 632 (e.g., an X-direction along which the gratings 626x are arrayed) by the horizontal stresses $F_h$. Since the stress transmitting sections 634x bridge between the flat portion 632 and the optical fiber 620x, at least on the flat portion 632 side of the stress transmitting sections 634x, the stress transmitting sections 634x are displaced together with the flat portion 632 by application of the horizontal stresses $F_h$ with respect to the flat surface 632.

Additionally, by providing the projections 644 on the flat portion 632 to which horizontal stresses $F_h$ are applied, compared to not providing such projections 644, the detection area and deformation amount of the detection surface (reaction surface) 646 for the horizontal stresses $F_h$, which is perpendicular to the direction (e.g., the direction along which the gratings 626x are arrayed) in which the horizontal stresses $F_h$ are applied, can be made large. As a result, in the stress direction converter 630, the detection sensitivity for horizontal stresses $F_h$ can be enhanced, and together therewith, the detection accuracy of horizontal stresses $F_h$ can be heightened.

Further, by making the projections hemispherical, because there are no sharp angled portions with respect to the sheet, the durability of the FBG sensor 622 and pressure sensor 600 can be enhanced.

In the FBG sensor 622 and the pressure sensor 600 according to the seventh embodiment, not only the projections 644, but hemispherical shaped grooves may also be provided on the flat portion 632, or such grooves may be provided alone without any projections 644.

Figure 51:
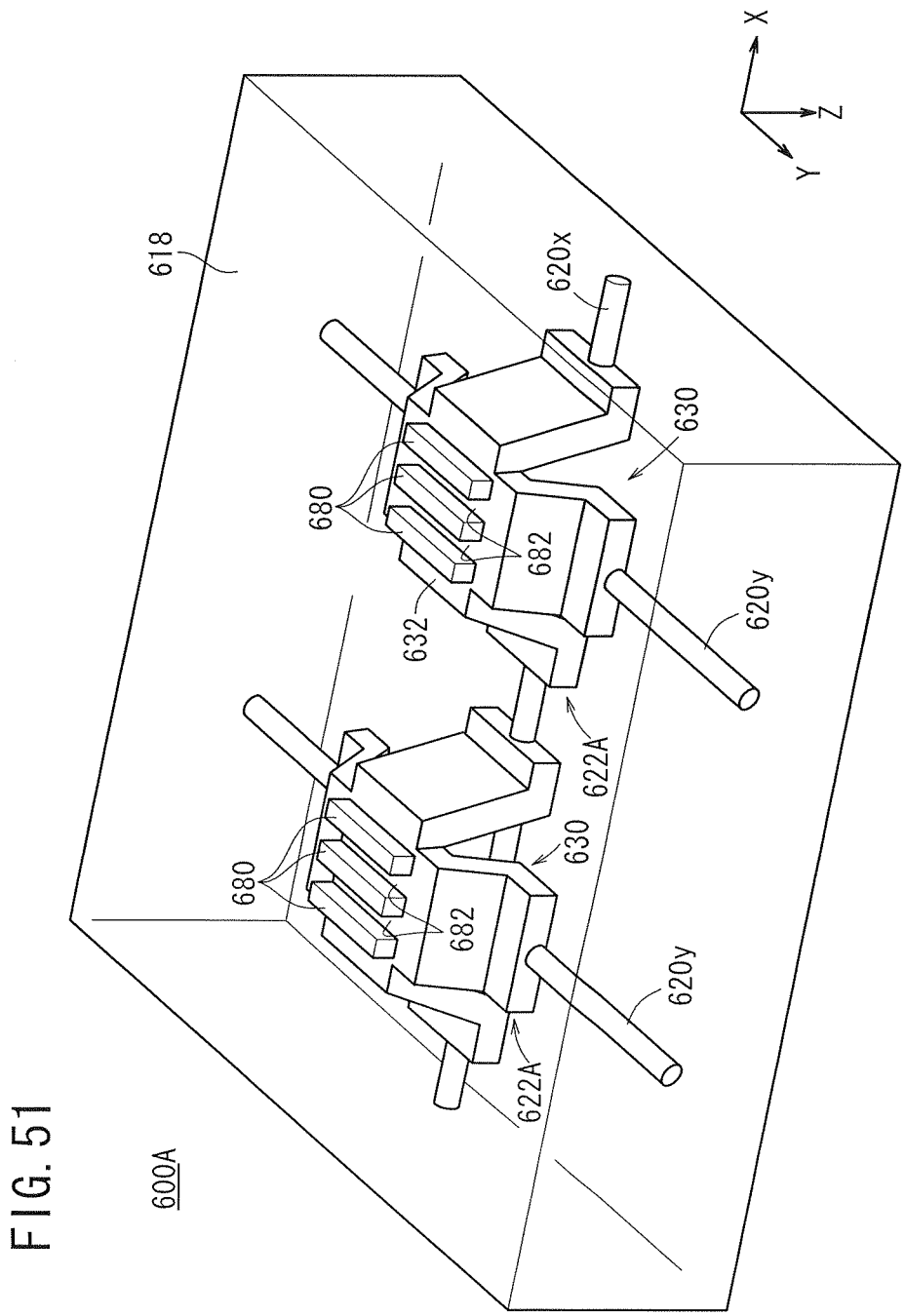
FIG. 51 is a perspective view showing a modified example of the pressure sensor of FIGS. 48 to 50.
Figure 52:
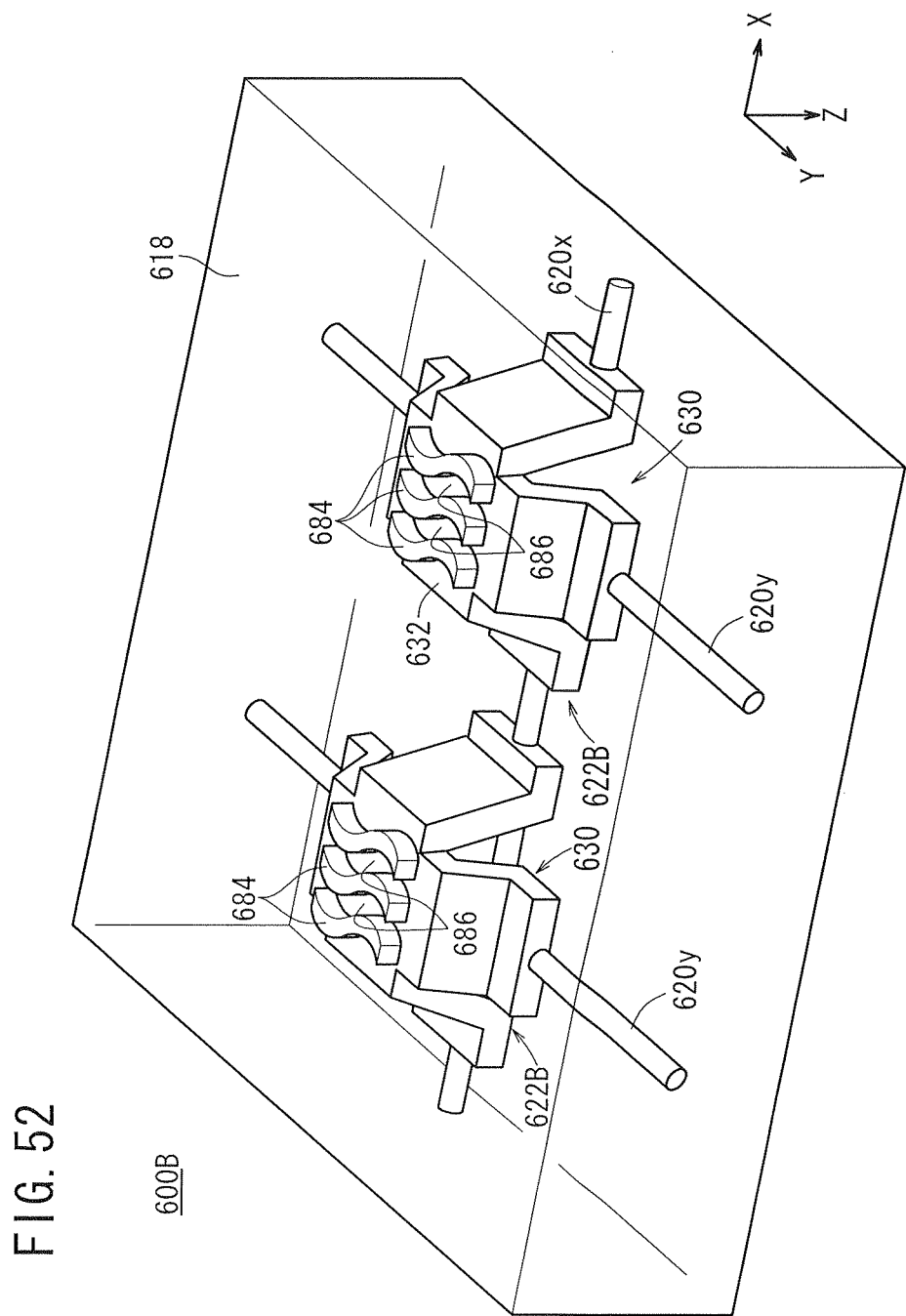
FIG. 52 is a perspective view showing a modified example of the pressure sensor of FIGS. 48 to 50.

Further, the seventh embodiment is not limited to the structure shown in FIGS. 48 through 50, but for example, when the direction at which the horizontal stresses $F_h$ are applied is specified beforehand (e.g., in the arrayed direction of the gratings 626x: the X-direction), the structures shown in FIGS. 51 and 52 can be adopted.

The FBG sensor 622A and pressure sensor 600A shown in FIG. 51 differs from the FBG sensor 622 and pressure sensor 600 of the seventh embodiment in that multiple columnar shaped projections 680 are formed on the upper surface of the flat portion 632. Each of the projections 680 is disposed in a state of being separated by predetermined intervals along the X-direction. Further, each of the projections 680 extends respectively along the Y-direction, whereby grooves 682 are formed between the projections 680. Each of the grooves 682 is provided by forming the plurality of projections 680 on the upper surface of the flat portion 632. Alternatively, the flat portion 632 and the projections 680 may be provided by forming the plurality of grooves 682 on a single rectangular shaped material.

In this case as well, similar to the seventh embodiment (see FIGS. 48 through 50), when horizontal stresses $F_h$ are applied in the positive X-direction, because left side surfaces on each of the projections 680 can serve as detection surfaces 646 for the horizontal stresses $F_h$, the detection area and deformation amount of the horizontal stresses $F_h$ can be made larger, and the detection sensitivity and detection accuracy of the horizontal stresses $F_h$ can be increased.

Further, the FBG sensor 622B and pressure sensor 600B shown in FIG. 52 differs from the FBG sensor 622 and pressure sensor 600 of the seventh embodiment in that projections

684 having curved shapes (wavy shapes) are disposed in plurality on the upper surface of the flat portion 632, with grooves 686 being formed between the projections 684.

In this case as well, similar to the seventh embodiment (see FIGS. 48 through 50), when horizontal stresses $F_h$ are applied in the positive X-direction, because left side surfaces on each of the projections 684 shown in FIG. 52 can serve as detection surfaces 646 for the horizontal stresses $F_h$, the detection area and deformation amount of the horizontal stresses $F_h$ can be made larger, and the detection sensitivity and detection accuracy of the horizontal stresses $F_h$ can be increased.

As described above, a case has been explained in which horizontal stresses $F_h$ are applied in the positive X-direction. However, in the case that horizontal stresses $F_h$ are applied in the negative X-direction as well, it is a matter of course that each of the aforementioned effects of the seventh embodiment can be obtained. In this case, the flat portion 632, and the right side surface of the inclined section 636 or the right side surfaces of the projections 644, 680, 684 serve as detection surfaces with respect to the horizontal stresses $F_h$.

As noted above, in the pressure sensor 600 and FBG sensor 622 according to the seventh embodiment, or in an end effector and robot system (sensor signal processing apparatus) to which the pressure sensor 600 is applied, a comparatively simple structure is enabled, while in addition, the detection accuracy of stresses applied from a body can easily be improved.

The present invention is not limited to the aforementioned embodiments, and it goes without saying that various modified or additional structures could be adopted therein without deviating for the essence and gist of the present invention as set forth in the appended claims.

What is claimed is:

1. An optical fiber sensor comprising:
  a plurality of stress detection sensors made up from optical fibers in which gratings are arrayed that reflect light of a specified wavelength; and
  a stress direction converter for converting external stresses applied from an exterior into stresses of a direction in which the gratings are arrayed, and transmitting the stresses to each of the gratings,
  wherein the plurality of stress detection sensors are arranged in surrounding fashion to the stress direction converter.

2. The optical fiber sensor according to claim 1, wherein the stress direction converter comprises an elastic body.

3. An optical fiber sensor comprising:
  a plurality of stress detection sensors made up from optical fibers in which gratings are arrayed that reflect light of a specified wavelength; and
  a stress direction converter for converting external stresses applied from an exterior into stresses of a direction in which the gratings are arrayed, and transmitting the stresses to each of the gratings, wherein:
  the plurality of stress detection sensors include a first stress detection sensor disposed parallel to a direction of application of a horizontal stress and along a plane perpendicular to a direction of application of a normal stress and having a first optical fiber in which first gratings are arrayed, and a second stress detection sensor that extends in a direction different from a longitudinal direction of the first optical fiber and having a second optical fiber in which second gratings are arrayed; and
  the stress direction converter converts the normal stress into a stress of a direction along the plane.

4. The optical fiber sensor according to claim 3, wherein when viewed in plan, the first optical fiber and the second optical fiber are arranged respectively such that the first gratings and the second gratings are perpendicular to each other, at mutually different heights along a direction of application of the normal stress.

5. The optical fiber sensor according to claim 3, wherein the stress direction converter includes a flat portion extending in a direction along the plane, a first stress transmitting section that bridges from the flat portion to the first optical fiber, and a second stress transmitting section that bridges from the flat portion to the second optical fiber.

6. An optical fiber sensor comprising:
  a plurality of stress detection sensors made up from optical fibers in which gratings are arrayed that reflect light of a specified wavelength; and
  a stress direction converter for converting external stresses applied from an exterior into stresses of a direction in which the gratings are arrayed, and transmitting the stresses to each of the gratings, wherein:
  each of the stress detection sensors and the stress direction converter are disposed in a measurement area that receives the external stresses; and
  the plurality of stress detection sensors comprise:
  first stress detection sensors which, as viewed in plan, are disposed so as to be surrounded by the stress direction converter, and in which the gratings expand and retract by stresses transmitted from the stress direction converter; and
  second stress detection sensors, which are disposed externally of the stress direction converter within the measurement area.

7. The optical fiber sensor according to claim 6, wherein:
  the optical fiber is arranged along the measurement area so as to penetrate through the stress direction converter; and
  the first stress detection sensors include first gratings which are disposed in the optical fiber, and the second stress detection sensors include second gratings which are disposed in the optical fiber.

8. The optical fiber sensor according to claim 7, wherein the stress direction converter includes a flat portion extending in a direction along the measurement area, a first stress transmitting section that bridges from the flat portion to one end side of the first gratings in the optical fiber, and a second stress transmitting section that bridges from the flat portion to another end side of the first gratings in the optical fiber.

9. The optical fiber sensor according to claim 8, wherein the second gratings are disposed in the vicinity of the first stress transmitting section or in the vicinity of the second stress transmitting section in the optical fiber.

10. The optical fiber sensor according to claim 7, wherein:
  a first optical fiber is disposed along the measurement area so as to penetrate through the stress direction converter;
  a second optical fiber is disposed along the measurement area so as to penetrate through the stress direction converter, while being arranged perpendicular to the first optical fiber when viewed in plan;
  the first gratings are arranged respectively in the first optical fiber and the second optical fiber; and
  the second gratings are arranged in at least one of the first optical fiber and the second optical fiber.

11. An optical fiber sensor comprising:
  a plurality of stress detection sensors made up from optical fibers in which gratings are arrayed that reflect light of a specified wavelength; and
  a stress direction converter for converting external stresses applied from an exterior into stresses of a direction in which the gratings are arrayed, and transmitting the stresses to each of the gratings, wherein a first stress detection sensor and a second stress detection sensor are arranged along a first direction that passes through the stress direction converter while sandwiching the stress direction converter therebetween, and a third stress detection sensor and a fourth stress detection sensor are arranged along a second direction that passes through the stress direction converter and which differs from the first direction while sandwiching the stress direction converter therebetween.

12. The optical fiber sensor according to claim 11, wherein:
the first stress detection sensor and the second stress detection sensor are bridged by a first optical fiber that extends along the first direction; and
the third stress detection sensor and the fourth stress detection sensor are bridged by a second optical fiber that extends along the second direction.

13. The optical fiber sensor according to claim 12, wherein the stress direction converter includes a flat portion to which stresses are applied from the exterior, a first stress transmitting section that bridges from the flat portion to the first optical fiber, and a second stress transmitting section that bridges from the flat portion to the second optical fiber.

14. The optical fiber sensor according to claim 13, wherein, in the case that the flat portion receives a normal stress from the exterior, a position of the flat portion along a direction of application of the normal stress is at a position lower than a position at which the first optical fiber is supported and/or fixed on the first stress transmitting section, and lower than a position at which the second optical fiber is supported and/or fixed on the second stress transmitting section.

15. An optical fiber sensor comprising:
a plurality of stress detection sensors made up from optical fibers in which gratings are arrayed that reflect light of a specified wavelength; and
a stress direction converter for converting external stresses applied from an exterior into stresses of a direction in which the gratings are arrayed, and transmitting the stresses to each of the gratings, wherein:
the plurality of stress detection sensors include a first stress detection sensor having a first optical fiber in which first gratings are arrayed, and a second stress detection sensor having a second optical fiber in which second gratings are arrayed;
the stress direction converter includes a first converter section for converting stresses, which are applied in a direction different from the arrayed direction of the first gratings, into stresses in the arrayed direction, and transmitting the stresses to the first gratings, and a second converter section for converting stresses, which are applied in a direction different from the arrayed direction of the second gratings, into stresses in the arrayed direction, and transmitting the stresses to the second gratings;
the first and second converter sections share a common flat portion; and
the first converter section is disposed on the flat portion while being directed in a first normal direction perpendicular to the flat portion, and the second converter section is disposed on the flat portion while being directed in a second normal direction perpendicular to the flat portion and which is opposite to the first normal direction.

16. The optical fiber sensor according to claim 15, wherein:
the flat portion is arranged along a direction in which the first and second gratings of the first and second stress detection sensors are arrayed;
the first optical fiber is disposed at a location separated from the flat portion along the first normal direction, and the second optical fiber is disposed at a location separated from the flat portion along the second normal direction;
the first and second converter sections are disposed substantially perpendicular to each other when viewed in plan, and comprise, respectively, the flat portion, and stress transmitting sections, which are bridged from the flat portion to the first and second optical fibers.

17. An optical fiber sensor comprising:
a plurality of stress detection sensors made up from optical fibers in which gratings are arrayed that reflect light of a specified wavelength; and
a stress direction converter for converting external stresses applied from an exterior into stresses of a direction in which the gratings are arrayed, and transmitting the stresses to each of the gratings,
wherein the stress direction converter includes a first flat portion that extends in a direction parallel to a longitudinal direction of the optical fiber, and to which stresses are applied in a direction different from the longitudinal direction of the optical fiber, a second flat portion having a plane that differs in height from a plane of the first flat portion, a first stress transmitting section, which is bridged from the first flat portion to the second flat portion, and a second stress transmitting section, which is bridged from the second flat portion to the optical fiber.

18. The optical fiber sensor according to claim 1, wherein:
the stress direction converter includes a flat portion to which stresses are applied from the exterior, and a stress transmitting section, which is bridged from the flat portion to the optical fiber; and
at least one of projections and grooves are formed on the flat portion.

19. An optical fiber sensor comprising:
a plurality of stress detection sensors made up from optical fibers in which gratings are arrayed that reflect light of a specified wavelength; and
a stress direction converter for converting external stresses applied from an exterior into stresses of a direction in which the gratings are arrayed, and transmitting the stresses to each of the gratings, wherein:
the stress direction converter includes a flat portion to which stresses are applied from the exterior, and a stress transmitting section, which is bridged from the flat portion to the optical fiber;
at least one of projections and grooves are formed on the flat portion; and
the at least one of projections and grooves are columnar shaped, shaped as points, formed along a direction that is substantially perpendicular to a direction in which the gratings are arrayed or disposed in a plurality on the flat portion.

* * * * *